(12) United States Patent
Jeong

(10) Patent No.: US 8,856,832 B2
(45) Date of Patent: Oct. 7, 2014

(54) DISPLAY APPARATUS AND METHOD FOR CONTROLLING THE DISPLAY APPARATUS

(75) Inventor: Young Ho Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 13/029,278

(22) Filed: Feb. 17, 2011

(65) Prior Publication Data

US 2012/0090004 A1  Apr. 12, 2012

Related U.S. Application Data

(60) Provisional application No. 61/391,091, filed on Oct. 8, 2010.

(30) Foreign Application Priority Data

Nov. 16, 2010  (KR) .................. 10-2010-0113792

(51) Int. Cl.
| | | |
|---|---|---|
| *H04N 5/445* | (2011.01) | |
| *H04N 21/485* | (2011.01) | |
| *H04N 21/488* | (2011.01) | |
| *G06F 9/00* | (2006.01) | |
| *H04N 21/431* | (2011.01) | |
| *G06F 11/30* | (2006.01) | |
| *H04N 21/443* | (2011.01) | |
| *G06F 9/44* | (2006.01) | |
| *H04N 21/482* | (2011.01) | |

(52) U.S. Cl.
CPC ......... *H04N 5/44513* (2013.01); *H04N 21/485* (2013.01); *H04N 21/4882* (2013.01); *G06F 9/00* (2013.01); *H04N 21/4312* (2013.01); *G06F 11/30* (2013.01); *H04N 21/4438* (2013.01); *G06F 8/38* (2013.01); *H04N 21/482* (2013.01)
USPC ............. 725/43; 725/47; 725/100; 725/110

(58) Field of Classification Search
None
See application file for complete search history.

(56) References Cited

U.S. PATENT DOCUMENTS

| | | | | |
|---|---|---|---|---|
| 2001/0055465 | A1* | 12/2001 | Inoue .............................. | 386/46 |
| 2003/0103088 | A1 | 6/2003 | Dresti et al. | |
| 2003/0149988 | A1* | 8/2003 | Ellis et al. ....................... | 725/87 |
| 2004/0064834 | A1* | 4/2004 | Kuwata et al. .................. | 725/86 |
| 2004/0078814 | A1* | 4/2004 | Allen .............................. | 725/47 |

(Continued)

FOREIGN PATENT DOCUMENTS

| | | |
|---|---|---|
| CN | 1371573 A | 9/2002 |
| EP | 1 742 391 A1 | 1/2007 |

(Continued)

OTHER PUBLICATIONS

XP-002646090, Teksoft—Future Teknology, http://www.teksoftco.com/index.php?section=smartbar@tab=int, (Jun. 29, 2011) 5 pages.

(Continued)

Primary Examiner — Cai Chen
(74) Attorney, Agent, or Firm — Ked & Associates, LLP

(57) ABSTRACT

A multifunctional display device includes a processor to control simultaneously display of visual information and monitoring information on a same screen. The monitoring information provides an indication of status of one or more applications executed at a same time the visual information is displayed, and the visual information corresponds to one of content provider, broadcast signal, or website information.

8 Claims, 46 Drawing Sheets

(56) References Cited

U.S. PATENT DOCUMENTS

| | | | |
|---|---|---|---|
| 2005/0060663 A1* | 3/2005 | Arkeketa et al. | 715/810 |
| 2006/0048184 A1* | 3/2006 | Poslinski et al. | 725/45 |
| 2007/0067801 A1* | 3/2007 | Monta et al. | 725/44 |
| 2009/0063978 A1 | 3/2009 | Dawson et al. | |

FOREIGN PATENT DOCUMENTS

| | | |
|---|---|---|
| WO | WO 01/82598 A2 | 11/2001 |
| WO | WO 02/069636 A1 | 9/2002 |
| WO | WO 2008/091248 A1 | 7/2008 |

OTHER PUBLICATIONS

European Search Report dated Jul. 11, 2011.

Chinese Office Action dated Nov. 11, 2013 for corresponding Application No. 201110077398.5.

* cited by examiner

FIG. 17
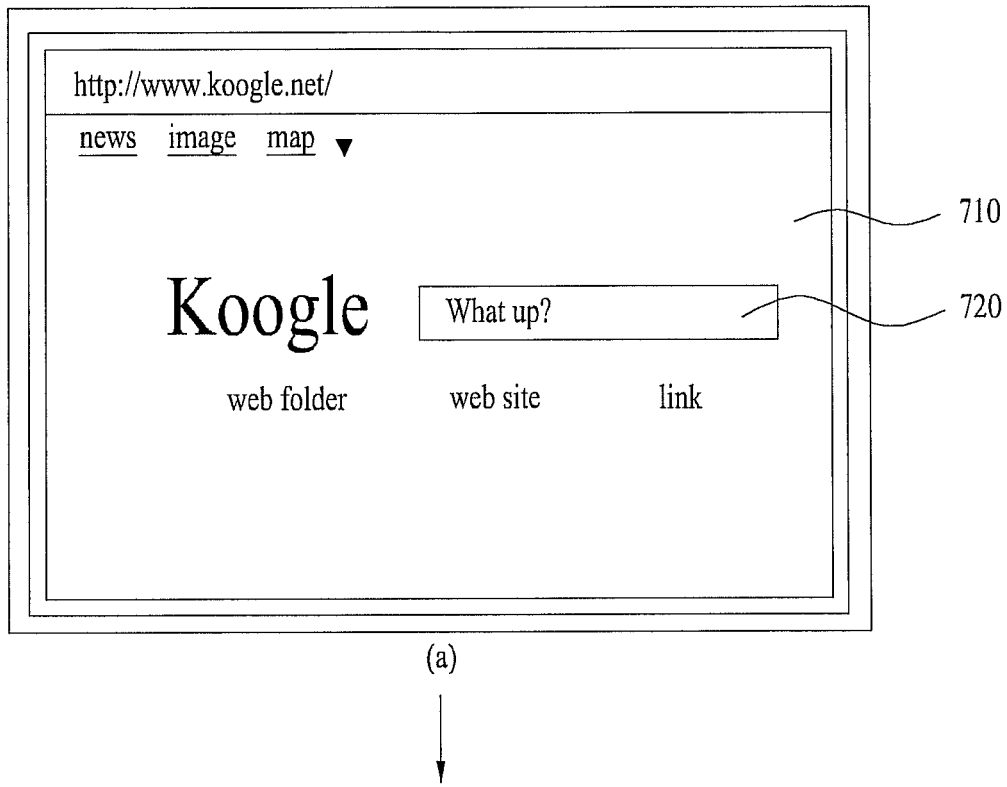
(a)
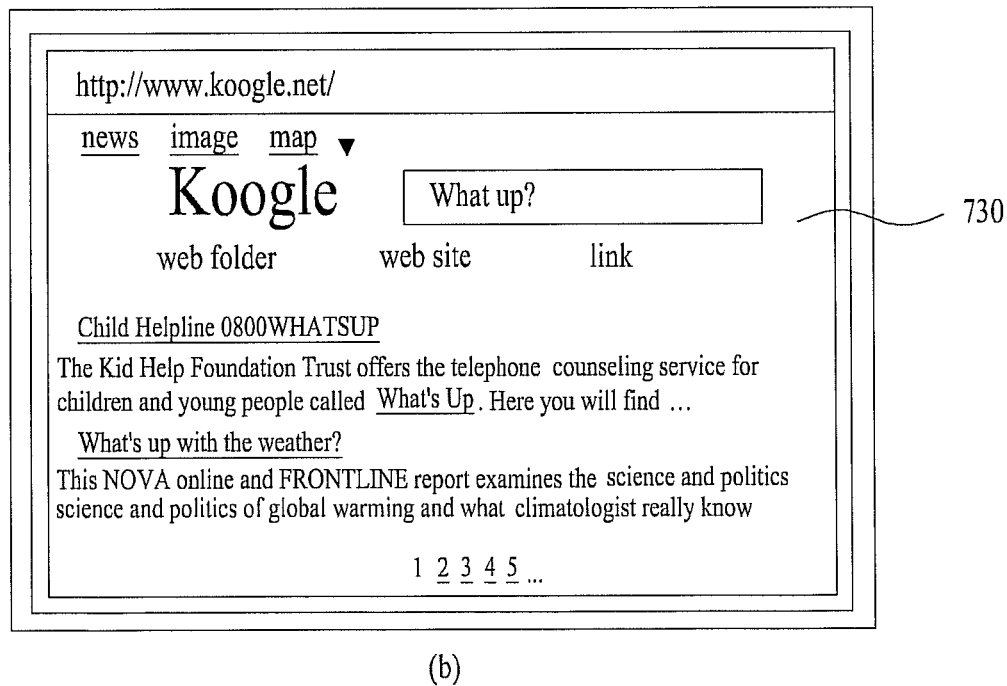
(b)

810 — Sign-in to yhoo!

http://www.yhoo.net/

ID
820 — ******

PASSWORD
825 — ******

☐ AUTO SIGN-IN

(b)

http://www.yhoo.net/mail/tttt

| tttt@yhoo.net | received box | |
|---|---|---|
| ✉ read mail | sender | title |
| ✉ write mail | KK | aaa |
| ✉ check mail | LL | bbb1111111111111111111111111 |
| | MM | ccccccccccccccccccc |
| • received box | NN | dddddddddddddddddd |
| • sent box | OO | eeeeeeeeeeeeeeeeeeee |
| • spam box | PP | No title |
| • recycle bin | | 1 2 3 4 5 ··· |

FIG. 45
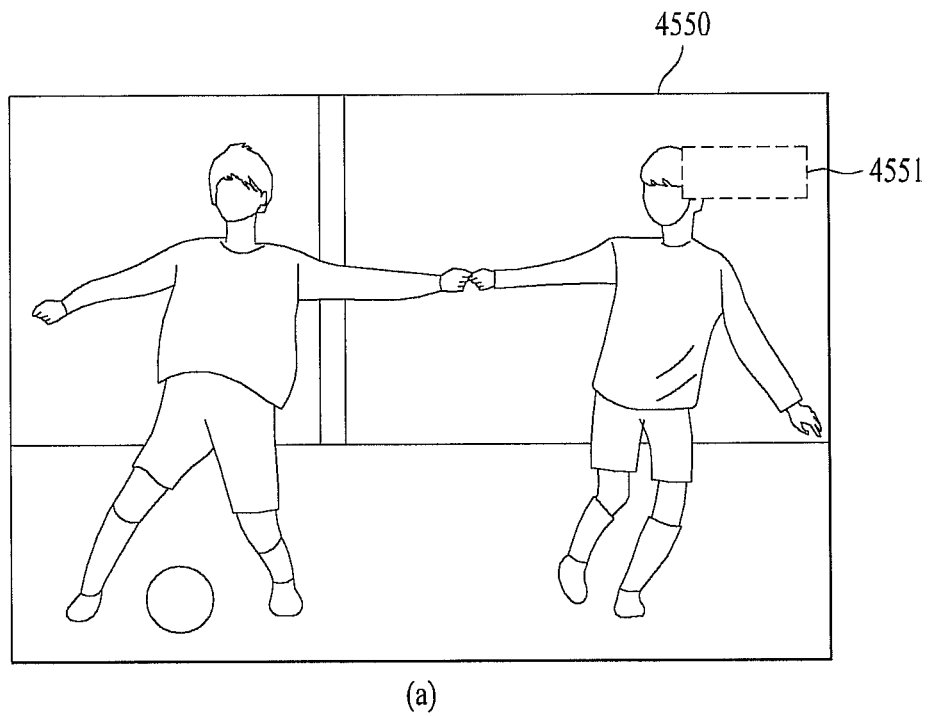
(a)
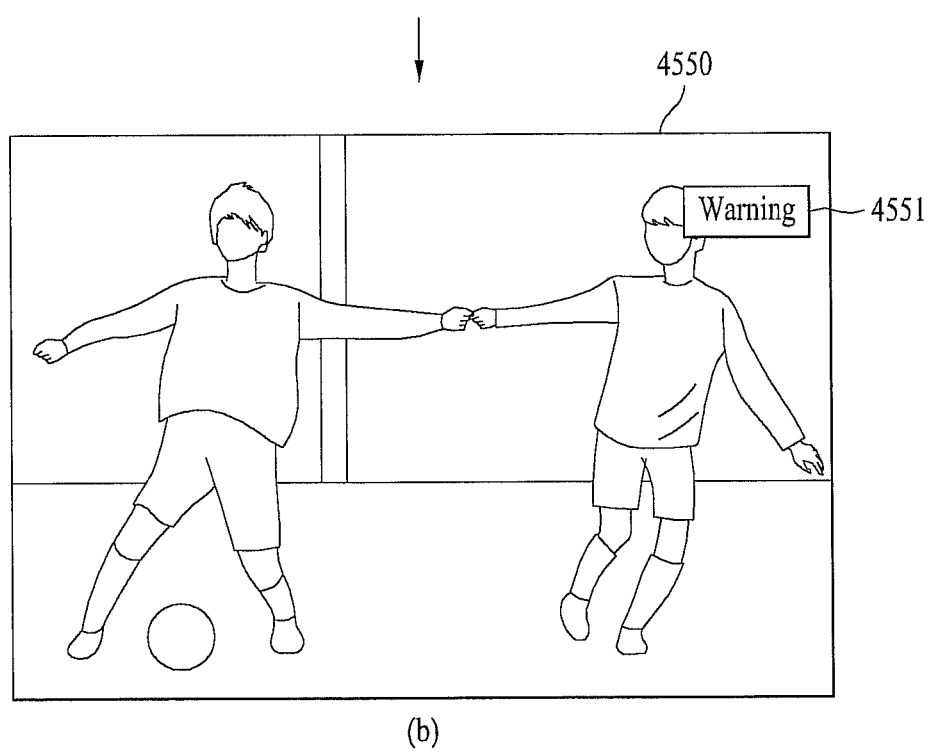
(b)

DISPLAY APPARATUS AND METHOD FOR CONTROLLING THE DISPLAY APPARATUS

CROSS-REFERENCE TO RELATED APPLICATIONS

This application claims the benefit of the U.S. provisional application No. 61/391,091, filed on Oct. 8, 2010 and the Korean patent application No. 10-2010-0113792, filed on Nov. 16, 2010, the contents of which are incorporated herein by reference.

BACKGROUND

1. Field

One or more embodiments described herein related to managing and displaying information on an electronic device.

2. Background

A display apparatus have been developed which integrate the display of broadcast and internet-related information. Unfortunately, these devices only have a finite amount of memory, which limits their capability. Also, displaying this information requires payment of costly access fees. Improvements are needed to address these and/or other drawbacks.

BRIEF DESCRIPTION OF THE DRAWINGS

FIG. 17 shows a third example of a user interface for a display device.

FIG. 18 shows a fourth example of a user interface for a display device.

FIG. 45 shows one embodiment of a procedure for automatically enabling a monitoring menu.

DETAILED DESCRIPTION

Figure 1:
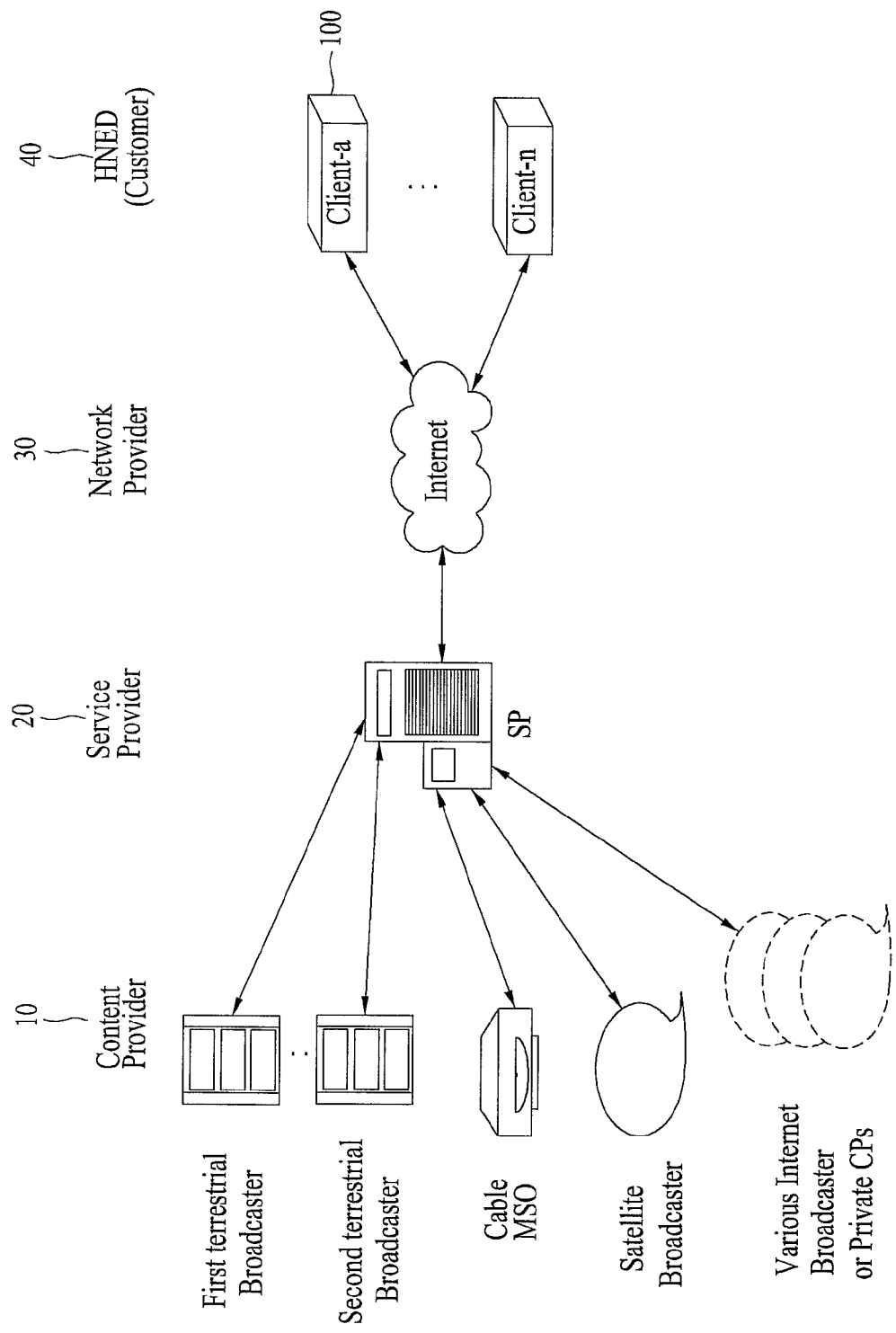
FIG. 1 shows one embodiment of a broadcasting system.

FIG. 1 shows one embodiment of a broadcasting system which includes a content provider (CP) 10, a service provider (SP) 20, a network provider (NP) 30, and a home network end user (HNED) 40. The FINED 40 corresponds, for example, to a client 100 which is a display device according to one or more of the aforementioned embodiments. The client 100 corresponds to the display device according to one or more of the aforementioned embodiments, wherein examples of the display device include network TV, smart TV, and IPTV.

The content provider 10 manufactures various contents and provides them. Examples of the content provider 10 include a terrestrial broadcaster, a cable system operator (SO), a multiple system operator (MSO), a satellite broadcaster, and an Internet broadcaster, as illustrated in FIG. 1.

Also, the content provider 10 may provide various applications in addition to broadcast contents, which will be described in more detail later.

The service provider 20 can provide contents provided by the content provider 10 by service packaging them. For example, the service provider 20 of FIG. 1 can package first terrestrial broadcasting, second terrestrial broadcasting, cable MSO, satellite broadcasting, various kinds of Internet broadcasting, application, etc. and provide the packaged one to a user.

Also, the service provider 20 may provide a service to the client 100 by using a unicast or multicast mode. The unicast mode is to transmit data between a single transmitter and a single receiver 1:1. In case of the unicast mode, for example, if the receiver requests a server to transmit data, the server can transmit data to the receiver in accordance with the request. The multicast mode is to transmit data to a plurality of receivers of a specific group. For example, the server can transmit data to a plurality of receivers, which are previously registered therewith, at one time. For this multicast registration, IGMP (Internet Group Management Protocol) can be used.

The network provider 30 may provide a network for providing a service to the client 100. The client 100 may construct a home network end user (HNED) to receive a service.

In the system of the aforementioned display device, conditional access or content protection can be used to protect contents which are transmitted. For conditional access or content protection, a cable card or downloadable conditional access system (DCAS) can be used.

In the mean time, the client 100 may provide contents through the network. In this case, the client 100 may be a content provider contrary to the above. The content provider 10 may receive contents from the client 100. In this case, it is advantageous in that bidirectional content service or data service is available.

Figure 2:
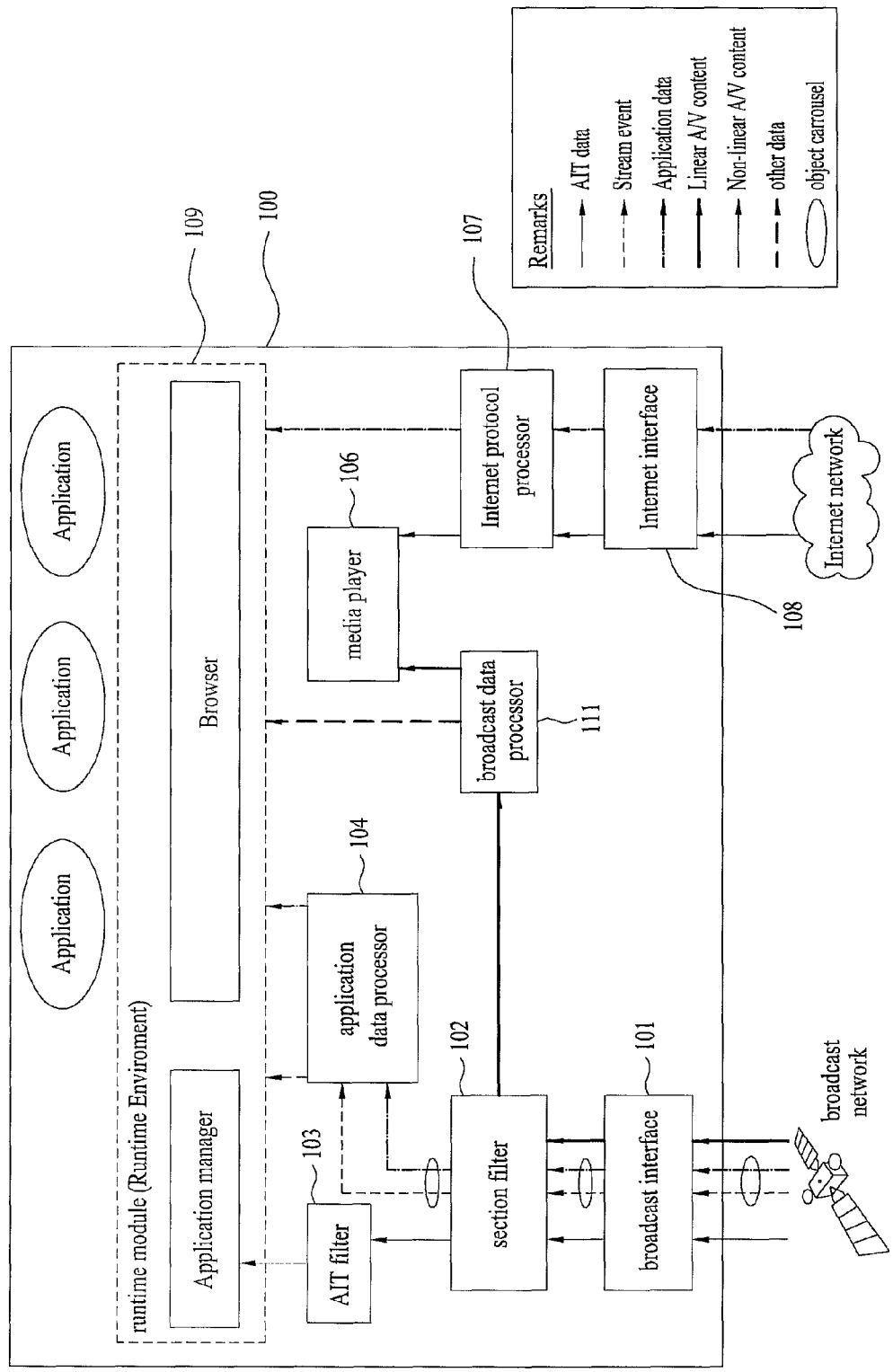
FIG. 2 shows another embodiment of a broadcasting system.

FIG. 2 shows another embodiment of a broadcasting system which includes a display device 100. This embodiment is connected with a broadcast network or Internet network. Examples of the display device 100 include network TV, smart TV, and HBBTV.

The display device 100 includes a broadcast interface 101, a section filter 102, an AIT filter 103, an application data processor 104, a broadcast data processor 111, a media player 106, an Internet protocol processor 107, an Internet interface 108, and a runtime module 109, for example.

Application information table (AIT) data, a real-time broadcast content, application data, and stream event are received through the broadcast interface 101. In the mean time, the real-time broadcast content may be designated as a linear A/V content.

The section filter 102 performs section filtering for four kinds of data received through the broadcast interface 101. Then, the section filter 102 transmits AIT data to the AIT filter 103, the linear A/V content to the broadcast data processor 111, and stream event and application data to the application data processor 104.

In the mean time, a non-linear A/V content and application data are received through the Internet interface 108. The non-linear A/V content may be content on demand (COD) application, for example.

The non-linear A/V content is transmitted to the media player 106, and the application data is transmitted to the runtime module 109. The runtime module 109, as illustrated in FIG. 2, includes an application manager and a browser, for example. The application manager controls a lifecycle for an interactive application by using the AIT data. The browser serves to display and process the interactive application.

Figure 3:
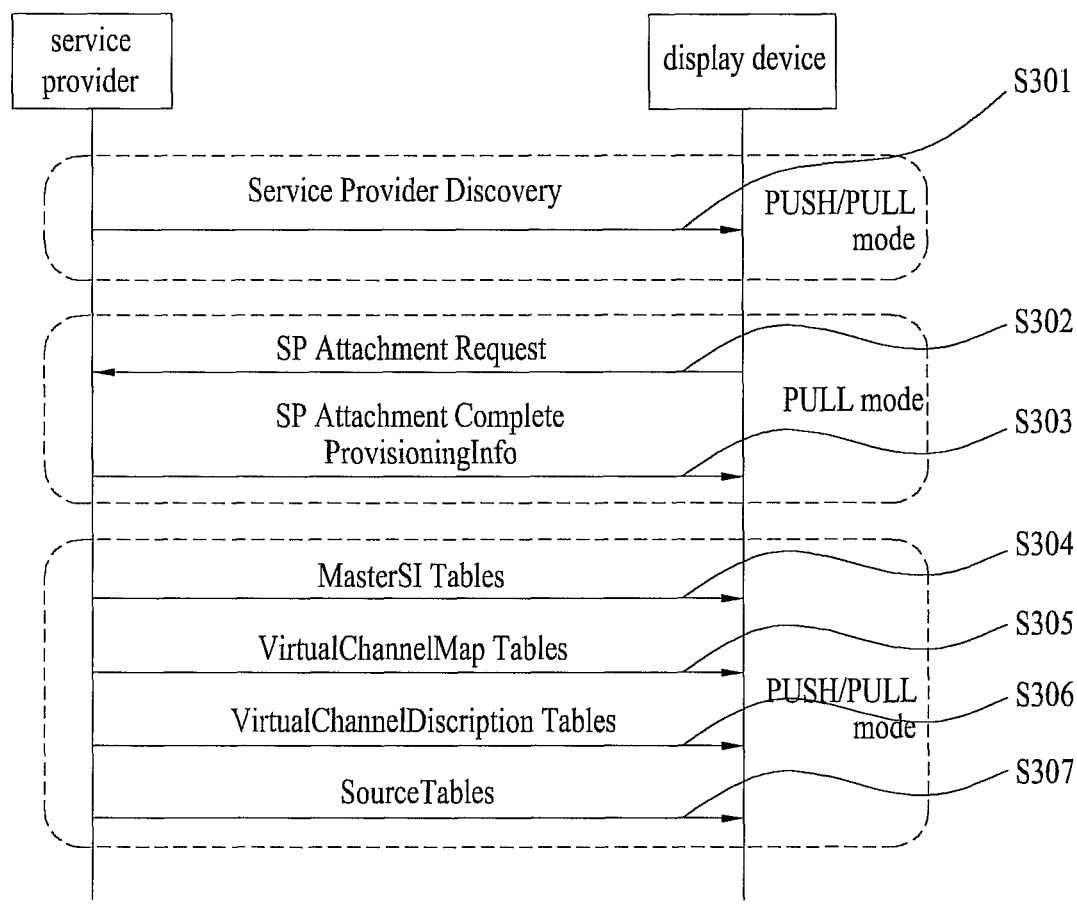
FIG. 3 shows steps for receiving channel information in a display device by accessing a service provider.

FIG. 3 shows steps for receiving channel information in a display device by accessing a service provider. The service provider performs service provider discovery (S301). The display device transmits a service provider (SP) attachment request signal (S302). If SP attachment is finished, the display device receives provisioning information (S303). Moreover, the display device receives a master SI table from the service provider (S304), receives a virtual channel map table (S305), receives a virtual channel description table (S306), and receives a source table (S307).

Hereinafter, the process steps for receiving channel information will be described in more detail. The service provider discovery may mean that service providers, which provide IPTV related services, discover a service discovery (SD) server that provides information on the service providers.

For example, three methods for discovering an address list that can receive information (for example, SP discovery information) on the SD server will be provided as follows. First of all, an address previously set by the display device or an address set by a manual operation of the user can be used. Second, a DHCP based SP discovery method can be used. Third, a DNS SRV-based SP discovery method can be used. Also, the display device accesses a server of an address acquired by any one of the above three methods and receives a service provider discovery record that includes information required for service discovery per SP. Then, the display device performs a service search step by using the received service provider discovery record. The above steps can be performed in a push mode or pull mode.

The display device performs a registration procedure (or service attachment procedure) by accessing the SP attachment server designated by an SP attachment locator of the SP discovery record.

Moreover, after performing a separate authentication procedure by accessing an SP authentication service server designated by an SP authentication locator, the display device may perform a service authentication procedure. After the service attachment procedure is successfully performed, data transmitted from the server to the display device may be a form of a provisioning information table.

The display device transmits the data to the service attachment server during the service attachment procedure, wherein the data includes ID and location information of the display device. The service attachment server can define a service subscribed by the display device, based on the received data. Moreover, address information that can acquire service information desired to be received by the display device is provided in the form of the provisioning information table. The address information corresponds to access information of the master SI table. In this case, it is easy to provide a customized service per subscriber.

The service information includes a master SI table record that manages access information and version on the virtual channel map, a virtual channel map table that provides a package type service list, a virtual channel description table that includes detailed information of each channel, and a source table that includes access information that enables actual access to services.

Figure 4:
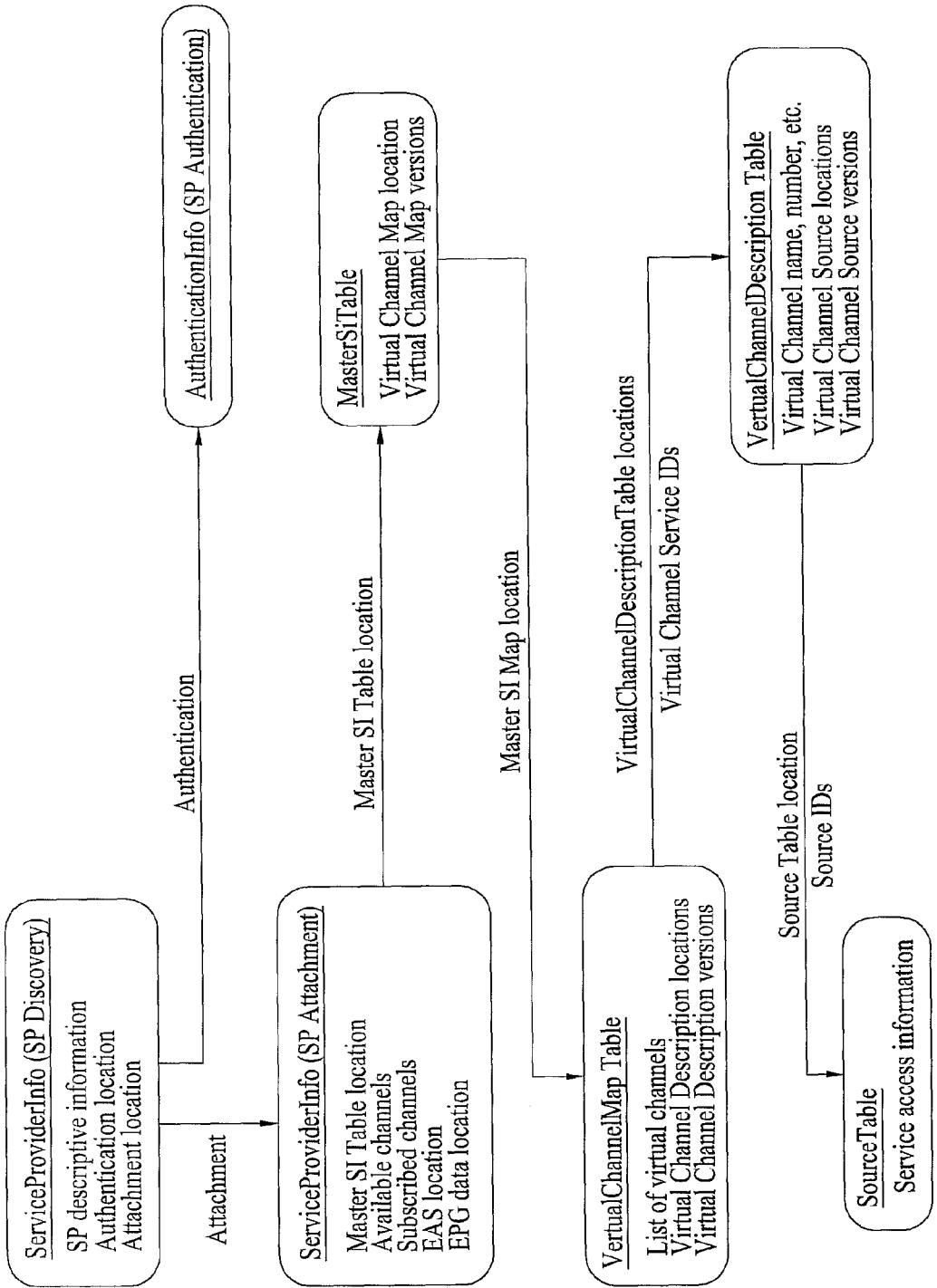
FIG. 4 shows an example of data used in the aforementioned steps.

FIG. 4 shows an example of data used in the aforementioned steps. The mater SI table includes location information that can receive each virtual channel map and version information of each virtual channel map.

Each virtual channel map is uniquely identified by a virtual channel map identifier, and virtual channel map version represents version information of the virtual channel map. If any one of all tables connected to one another along an arrow starting from the master SI table illustrated in FIG. 4 is changed, version of all upper tables (to reach master SI table) is increased together with increase of the corresponding table. Accordingly, it is advantageous in that the display device can identify change on all SI tables directly by monitoring the master SI table.

For example, if there is any change of the source table, version of the source table is increased, and version of the virtual channel description table for reference of the source table is also changed. Accordingly, change of a lower table causes change of an upper table, whereby version of the master SI table is finally changed.

The master SI table may exist per service provider. However, if configuration of the service is varied per location or subscriber (or subscriber group), the service provider is designed to have a plurality of master SI tables, thereby providing a customized service per each unit. In this way, if the service provider is designed, it is possible to efficiently provide a customized service for location of a subscriber and subscription information through the master SI table.

The virtual channel map table may have one or more virtual channels, and includes location information that can acquire detailed information of the channel without including the detailed information in the virtual channel map. Virtual channel description location of the virtual channel map table indicates location of the virtual channel description table that includes detailed information of the channel.

The virtual channel description table includes detailed information of the virtual channel, and can access the virtual channel description table by using the virtual channel description location of the virtual channel map table.

The source table provides access information (for example, IP address, port, AV codec, transport protocol, etc.) per service, wherein the access information is required for actual access to the service.

The aforementioned master SI table, the virtual channel map table, the virtual channel description table, and the source table are transferred through four flows, which are logically divided from one another, in a push mode or pull mode. In the mean time, the master SI table can be transmitted in a multicast mode for version management, and monitors version change by receiving multicast streaming.

Figure 5:
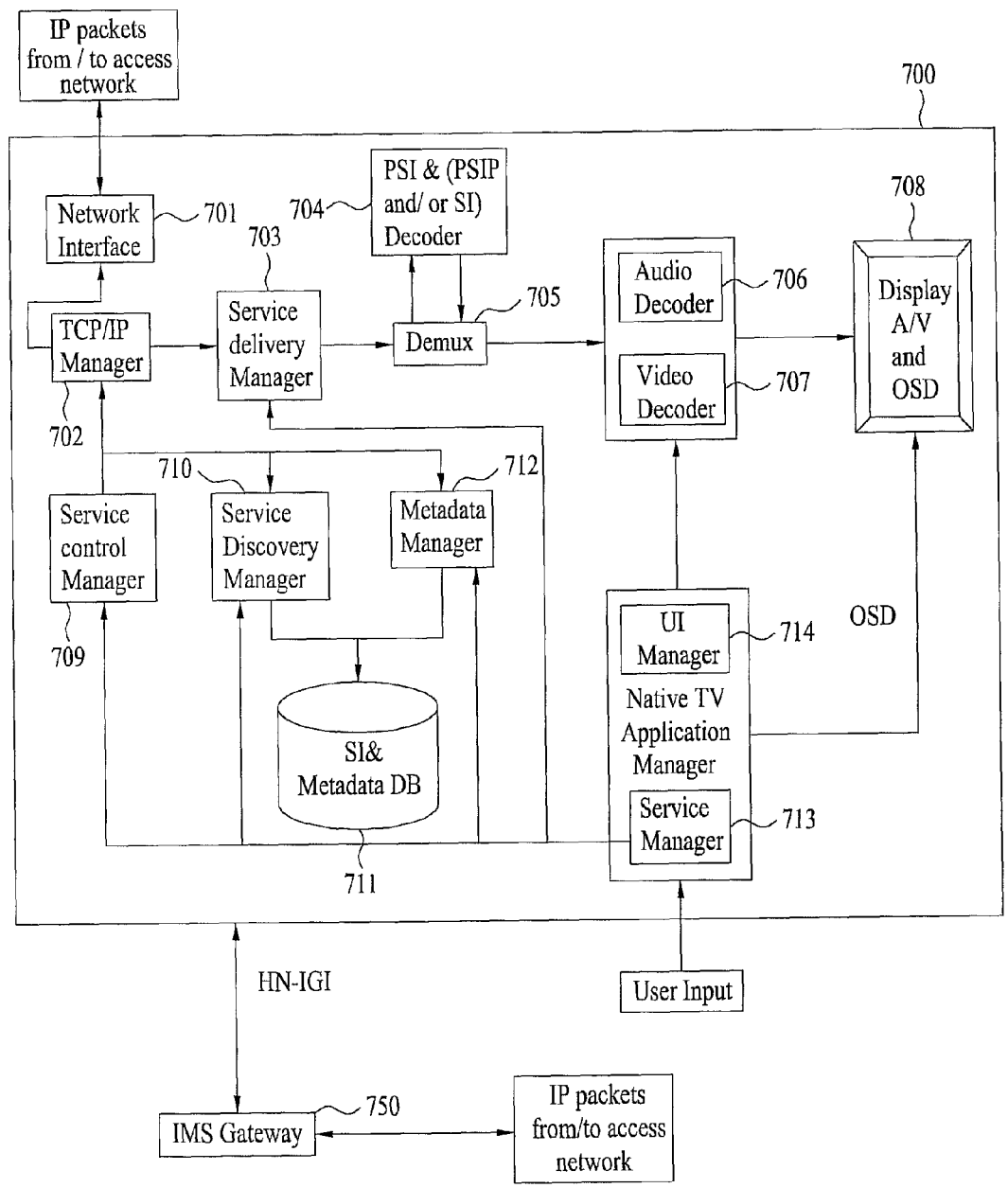
FIG. 5 shows an example of a display device.

FIG. 5 shows an example of a display device 700, which includes a network interface 701, a TCP/IP manager 702, a service delivery manager 703, a demultiplexer (Demux) 705, a PSI& (PSIP and/or SI) decoder 704, an audio decoder 706, a video decoder 707, a display A/V and OSD module 708, a service control manager 709, a service discovery manager 710, a metadata manager 712, an SI&Metadata DB 711, a UI manager 714, and a service manager 713.

The network interface 701 receives packets from a network, and transmits the packets to the network. In other words, the network interface 701 receives services, contents, etc. from the service provider through the network.

The TCP/IP manager 702 is involved in packets received in the display device 700 and packets transmitted from the display device 700, i.e., packet transfer from the source to the destination. The TCP/IP manager 702 sorts the received packets to correspond to a proper protocol, and outputs the sorted packets to the service delivery manager 705, the service discovery manager 710, the service control manager 709, and the metadata manager 712.

The service delivery manager 703 takes the role of control of received service data. For example, if the service delivery manager 703 controls real-time streaming data, it can use RTP/RTCP. If the service delivery manager 703 transmits the real-time streaming data by using RTP, it parses the received packets in accordance with RTP and transmits the parsed packets to the demultiplexer 705 or stores the parsed packets in the SI&Metadata DB 711 under the control of the service manager 713. The service delivery manager 703 feeds the received information back to a server, which provides a service, by using RTCP.

The demultiplexer 705 demultiplexes the received packets to audio, video and PSI (Program Specific Information) data and then transmits the demultiplexed data to the audio decoder 706, the video decoder 707, and the PSI&(PSIP and/or SI) decoder 704, respectively.

The PSI&(PSIP and/or SI) decoder 704 decodes service information such as PSI, for example. Namely, the PSI& (PSIP and/or SI) decoder 704 receives and decodes PSI section, PSIP (Program and Service Information Protocol) section or SI (Service Information) section, which is demultiplexed by the demultiplexer 705.

Also, the PSI&(PSIP and/or SI) decoder 704 decodes the received sections to make a database for service information, and stores the database for service information in the SI&Metadata DB 711.

The audio/video decoders 706/707 decode the video data and the audio data, which are received from the demultiplexer 705. Te audio data decoded by the audio decoder 706 and the video data decoded by the video decoder 707 are provided to the user through the display 708.

The UI manager 714 and the service manager 713 manage the whole state of the display device 700, provide a user interface, and manage other managers.

The UI manager 714 provides a graphic user interface for the user by using an on screen display (OSD), and performs a receiving operation based on a key input from the user. For example, if a key input signal for channel selection is input from the user, UI manager 714 transmits the key input signal to service manager 713.

The service manager 713 controls managers related to the service, such as the service delivery manager 703, the service discovery manager 710, the service control manager 709, and the metadata manager 712.

Also, the service manager 713 makes a channel map and selects a channel by using the channel map in accordance with the key input signal received from the UI manager 714. The service manager 713 receives service information of the channel from the PSI&(PSIP and/or SI) decoder 704 and sets audio/video PID (Packet Identifier) of the selected channel in the demultiplexer 705.

The service discovery manager 710 provides information required to select the service provider that provides services. If a signal related to channel selection is received from the service manager 713, the service discovery manager 710 discovers a corresponding service by using the received information.

The service control manager 709 takes the role of selection and control of the service. For example, if the user selects a live broadcasting service like the existing broadcasting mode, the service control manager 709 uses IGMP or RTSP. If the user selects a video on demand (VOD) service, the service control manager 709 selects and controls the service by using RTSP. The RTSP protocol can provide a trick mode for real-time streaming. Also, the service control manager 709 can initiate and manage a session through IMC gate by using IMS (IP Multimedia Subsystem) and Session Initiation Protocol (SIP). The above protocols are only exemplary, and other protocols may be used depending on embodiments.

The metadata manager 712 manages metadata related to the service and stores the metadata in the SI&Metadata DB 711. The SI&Metadata DB 711 stores the service information decoded by the PSI&(PSIP and/or SI) decoder 704, the metadata managed by the metadata manager 712, and the information required to select the service provider provided by the service discovery manager 710. Also, the SI&Metadata DB 711 may store setup data for the system. The SI&Metadata DB 711 may be implemented by using a NonVolatile RAM (NVRAM) or a flash memory. The IG 750 is a gateway where functions required for access to IMS based IPTV services are gathered.

Figure 6:
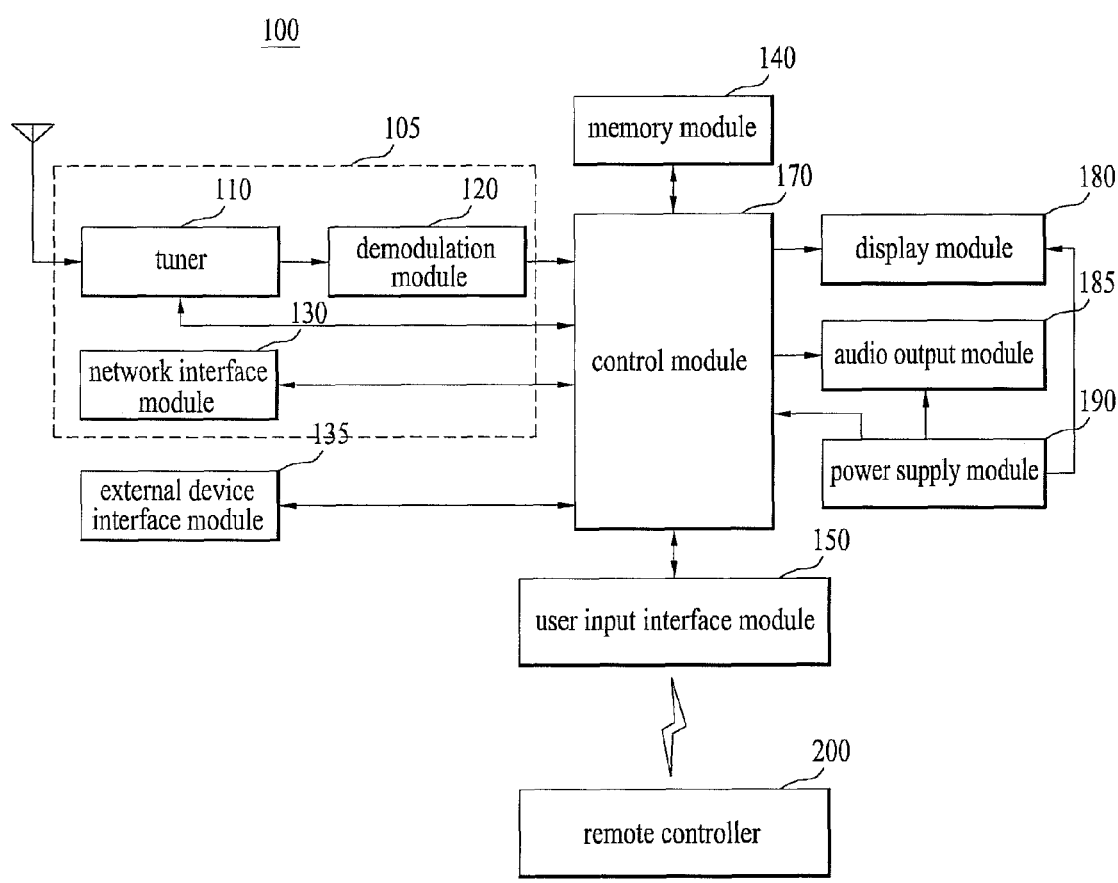
FIG. 6 shows another example of a display device.

FIG. 6 shows another example of a display device 100, which includes a broadcast receiver 105, an external device interface module 135, a memory module 140, a user input interface module 150, a control module 170, a display module 180, an audio output module 185, a power supply module 190, and a camera module (not shown). The broadcast receiver 105 includes a tuner 110, a demodulation module 120, and a network interface module 130. As occasion demands, the broadcast receiver 105 may be designed in such a manner that it includes a tuner 110 and a demodulation module 120 but does not include a network interface module 130.

On the contrary, the broadcast receiver 105 may be designed in such a manner that it includes a network interface module 130 but does not include a tuner 110 and a demodulation module 120.

The tuner 110 selects one of RF (radio frequency) broadcast signals received through an antenna, which corresponds to a channel selected by the user or all previously stored channels. Also, the tuner 110 converts the selected RF broadcast signal to an intermediate frequency signal or a baseband video or audio signal.

For example, if the selected RF broadcast signal is a digital broadcast signal, the tuner 110 coverts the selected RF broadcast signal to a digital IF (DIF) signal. If the selected RF broadcast signal is an analog broadcast signal, the tuner 110 coverts the selected RF broadcast signal to an analog baseband video or audio signal (CVBS/SIF). In other words, the tuner 110 can process both the digital broadcast signal and the analog broadcast signal. The analog baseband video or audio signal (CVBS/SIF) output from the tuner 110 may directly be input to the control module 170.

Also, the tuner 110 can receive RF broadcast signal of a single carrier based on an advanced television system committee (ATSC) mode and RF broadcast signal of multiple carriers based on a digital video broadcasting mode (DVB).

In the mean time, the tuner 110 sequentially selects RF broadcast signals of all broadcast channels stored through a channel memory function from RF broadcast signals received through the antenna, and converts the selected RF broadcast signals to intermediate frequency signals or baseband video or audio signals.

The demodulation module 120 receives the digital IF (DIF) signal converted by the tuner 110 and demodulates the received digital IF signal.

For example, if the digital IF signal output from the tuner 110 is based on the ATSC mode, the demodulation module 120 performs 8-vestigal side band (8-VSB) demodulation, for example. Also, the demodulation module 120 may perform channel decoding. To this end, the demodulation module 120 may include a trellis decoder, a de-interleaver, and a Reed-Solomon decoder to perform trellis decoding, de-interleaving, and Reed-Solomon decoding.

For example, if the digital IF signal output from the tuner 110 is based on the DVB mode, the demodulation module 120 performs coded orthogonal frequency division modulation (COFDMA) demodulation, for example. Also, the demodulation module 120 may perform channel decoding. To this end, the demodulation module 120 may include a convolution decoder, a de-interleaver, and a Reed-Solomon decoder to perform convolution decoding, de-interleaving, and Reed-Solomon decoding.

The demodulation module 120 can output a stream signal (TS) after performing demodulation and channel decoding. At this time, the stream signal may be a signal where a video signal, an audio signal and a data signal are multiplexed. For example, the stream signal may be MPEG-2 Transport Stream (TS) where a video signal of an MPEG-2 specification and an audio signal of Dolby AC-3 specification are multiplexed. Specifically, the MPEG-2 TS may include a 4 byte header and 184 byte payload.

The aforementioned demodulation module 120 may be provided separately depending on the ATSC mode and the DVB mode. Namely, an ATSC demodulation module and a DVB demodulation module may be provided separately.

The stream signal output from the demodulation module 120 may be input to the control module 170. The control module 170 performs demultiplexing, video/audio signal processing, etc. and then outputs video to the display module 180 and audio to the audio output module 185.

The external device interface module 135 may connect an external device to the display device 100. To this end, external device interface module 135 may include an A/V input/output unit (not shown) or a wireless communication unit (not shown).

The external device interface module 135 is connected to external devices such as Digital Versatile Disks (DVD), Blu-rays, game devices, cameras, camcorders, computers (e.g., notebook computers), etc. through wire/wireless cables. The external device interface module 135 transmits a video, audio, or data signal externally input through an external device connected thereto, to the control module 170 of the display device 100. Also, the external device interface module 135 outputs the video, audio or data signal processed by the control module 170 to the external device. To this end, the external device interface module 135 may include an A/V input/output unit (not shown) or a wireless communication unit (not shown).

The A/V input/output unit of the external input circuit may include a USB terminal, a composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, etc., to input video and audio signals of the external device to the display device 100.

The wireless communication unit may perform a short-distance wireless communication with other electronic devices. For example, communication standards such as Bluetooth, Radio Frequency Identification (RFID), infrared Data Association (IrDA), Ultra Wideband (UWB), ZigBee, Digital Living Network Alliance (DLNA), etc. can be used for the short-distance wireless communication, whereby network connection between the display device 100 and other electronic devices can be performed.

In addition, the external device interface module 135 may be connected to various set-top boxes through at least one of the above-mentioned various terminals to perform input/output operation with the set-top boxes.

Also, the external device interface module 135 receives an application of a neighboring external device or list of applications and transmits the received application or the list of applications to control module 170 or the memory module 140.

The network interface module 130 provides interface for connecting the display device 100 with wire/wireless networks including Internet network. The network interface module 130 may include an Ethernet terminal, for example, for wire network connection. Also, for example, Wireless LAN (WLAN)(Wi-Fi), Wireless broadband (Wibro), World Interoperability for Microwave Access (Wimax), High Speed Downlink Packet Access (HSDPA) can be used for the wireless network connection.

The network interface module 130 transmits or receives data to and from other users or other electronic devices through a network connected thereto or another network linked on the connected network. In particular, the network interface module 130 can transmit some contents data stored in the display device 100 to a user or electronic device selected from other users or electronic devices previously registered with the display device 100.

In the mean time, the network interface module 130 can access a predetermined web page through a network connected thereto or another network linked on the connected network. In other words, the network interface module 130 can transmit or receive data to and from a corresponding server by accessing the predetermined web page through the corresponding network. In addition, the network interface module 130 can receive contents or data provided by the content provider or the network operator.

In other words, the network interface module 130 can receive contents such as movies, advertisements, games, VOD, broadcast signals, etc. and related information, which are provided from the content provider or the network provider through the network. Also, the network interface module 130 can receive update information and update files of firmware provided by the network operator. Moreover, the network interface module 130 can transmit data to the Internet or content provider or the network operator.

Furthermore, the network interface module 130 can selectively receive a desired one of contents open to the public, through the network. Also, the network interface module 130 can transmit or receive contents or data of a list of contents to and from a predetermined server through the network.

The memory module 140 may store a program for processing and controlling each signal of the control module 170, or may store the processed video, audio or data signal. Also, the memory module 140 may temporarily store the video, audio or data signal input from the external device interface module 135 or the network interface module 130. The memory module 140 may store information on a predetermined broadcast channel through a channel memory function.

Also, the memory module 140 may store the application or the list of applications input from the external device interface module 135 or the network interface module 130.

Also, the memory module 140 may store the contents or the list of contents input from the external device interface module 135 or the network interface module 130.

For example, the memory module 140 may include a storage medium of at least one type of a flash memory type, a hard disk type, a multimedia card micro type, a card type memory (for example, SD or XD memory), RAM and ROM (EEPROM, etc.) The display device 100 can play contents files (moving picture files, still image files, music files, application files, etc.) stored in the memory module 140 to provide the played contents files to the user.

Although FIG. 6 illustrates that the memory module 140 and the control module 170 are provided separately, the embodiments described herein are not to be limited by the embodiment of FIG. 6. The memory module 140 may be included in the control module 170.

The user input interface module 150 transmits the signal input by the user to the control module 170 or transmits the signal from the control module 170 to the user. For example, the user input interface module 150 may receive a control signal such as power on/off, channel selection and screen setup from the remote controller 200 or transmit the control signal from the control module 170 to the remote controller 200 in accordance with various communication modes such as RF communication mode and IR communication mode.

Also, for example, the user input interface module 150 may transmit a control signal input by a local key (not shown) such as a power key, a channel key, a volume key, and a setup key to the control module 170.

Also, for example, the user input interface module 150 may transmit a control signal input by a sensing unit (not shown), which senses gesture of the user, to the control module 170, or may transmit the signal from the control module 170 to the sensing unit. In this case, the sensing unit may include a touch sensor, an audio sensor, a position sensor, an action sensor, etc.

Also, for synchronization and search of the contents stored in the display device, the user input interface module 150 may receive predetermined synchronization target content, a selection signal of the display device for synchronization, a content keyword, and a synchronization command from the user.

The control module 170 demultiplexes an input stream and processes the demultiplexed stream through the tuner 110, the demodulation module 120 or the external device interface module 130 to generate and output a signal for a video and audio output.

The video signal processed by the control module 170 may be input to the display module 180, so that the video signal may be displayed as image corresponding to the video signal. Also, the video signal processed by the control module 170 may be input to the external output device through the external device interface module 135.

The video signal processed by the control module 170 may be output to the audio output module 185. Also, the video signal processed by the control module 170 may be input to the external output device through the external device interface module 135.

Although not shown in FIG. 6, the control module 170 may include a demultiplexer and a video processor, which will be described later with reference to FIG. 10. In addition, the control module 170 controls overall operations of the display device 100. For example, the control module 170 may control the tuner 110 to tune RF broadcasting corresponding to the channel selected by the user or the previously stored channel.

Also, the control module 170 may control the display device 100 through a user command input through the user input interface module 150 or its internal program. In particular, the control module 170 may allow the user to access the network and download a desired application or a list of desired applications into the display device 100.

For example, the control module 170 controls the tuner 110 to input a signal of a channel selected in accordance with a predetermined channel selection command received through the user input interface module 150, and processes a video, audio or data signal of the selected channel. The control module 170 may allow the channel information selected by the user to be output through the display module 180 or the audio output module 185 together with the processed video or audio signal.

For another example, the control module 170 may allow a video signal or an audio signal from an external device, for example, camera or camcorder, which is input through the external device interface module 135, to be output through the display module 180 or the audio output module 185 in accordance with an external device video play command received through the user input interface module 150.

Also, the control module 170 may control the display device 100 through a user command input through the user input interface module 150 or its internal program. In particular, the control module 170 may allow the User to access the network and download a desired content or a list of contents into the display device 100.

The control module 170 may control the display module 180 to display video. For example, the control module 170 may control the display module 180 to display broadcasting image input through the tuner 110, external input image input through the external device interface module 135, image input through the network interface module, or image stored in the memory module 140. At this time, the image displayed in the display module 180 may be still image or moving image, and may be 2D image or 3D image.

If the control module 170 enters a contents viewing list, it may control the display module to display contents or a list of contents that can be downloaded in the display device 100 or from the external network.

Also, control module 170 may play contents. At this time, the contents may be contents stored in the display device 100, received broadcasting contents, or externally input contents. The contents may be at least one of broadcasting image, external input image, audio files, still image, accessed web screen, and document files.

According to one embodiment, the control module 170 may control the display module 180 to display a home screen in accordance with an input of movement to home screen.

The home screen may include a plurality of card objects sorted per content source. The card object may include at least one of a card object representing a thumbnail list of a broadcast channel, a card object representing a broadcast guide list, a card object representing a broadcasting reservation list or a broadcasting recording list, and a card object representing a media list within the display device or another device connected with the display device. Also, the card object may further include at least one of a card object representing a list of accessed external devices and a card object representing a list related with calls.

Also, the home screen may further include an application menu provided with at least one executable application list.

If there is an input of card object movement, the control module 170 may control the display module 180 to display the corresponding card object through movement or move a card object not displayed in the display module 180 to the display module 180.

If a predetermined one of a plurality of card objects in the home screen is selected, the control module 170 may control the display module 180 to display image corresponding to the corresponding card object.

In the mean time, the control module 170 may control the display module 180 to display received broadcasting image and an object representing corresponding broadcasting image information in the card object displaying broadcasting image. The control module 170 may control the broadcasting image such that the size of the broadcasting image may be fixed by lock.

The control module 170 may control the display module 180 to display a setup object for at least one of video setup, audio setup, reservation setup, pointer setup of the remote controller, and network setup in the home screen.

The control module 170 may control the display module 180 to display an object of login, help message, or exit in a part of the home screen.

The control module 170 may control the display module 180 to display an object representing the number of all card objects or representing the number of card objects displayed in the display module 180 in a part of the home screen.

If a card object name of a predetermined one of card objects displayed in the display module 180 is selected, the control module 170 may control the display module 180 to display the corresponding card object as the whole screen.

Also, if an incoming call signal is received in the accessed external device or the display device, the control module 170 may control the display module 180 to focus and display a call related card object of a plurality of card objects or move the call related card object into the display module 180.

If the control module 170 enters an application viewing list, it may display an application or a list of applications that can be downloaded in the display device 100 or from the external network.

The control module 170 may control installation or driving of the application downloaded from the external network together with various user interfaces. Also, the control module 170 may control the display module 180 to display image related to the application implemented by selection of the user.

Although not shown, a channel browsing processor that generates thumbnail image corresponding to a channel signal or external input signal may further be provided.

The channel browsing processor extracts image from the stream signal (TS) output from the demodulation module 120 or the stream signal output from the external device interface module 135 to generate thumbnail image. The thumbnail image may be input to the control module 170 as it is or encoded. Also, the generated thumbnail image may be encoded in a stream format and then input to the control module 170. Therefore, the control module 170 may display a thumbnail list that includes a plurality of thumbnail images, by using the input thumbnail image. The thumbnail images of the thumbnail list may be updated in due order or at the same time. Then, the user can simply recognize contents of a plurality of broadcast channels.

According to one embodiment, for synchronization of contents of the display device, if contents for synchronization and a selection signal of the display device for synchronization are received from the user through the user input interface module 150, the control module 170 transmits the selection signal to a predetermined server through the network interface module 130. If a comparison result of the list of contents is received from the server, the control module 170 transmits the contents corresponding to the comparison result to the server.

According to another embodiment, if contents for synchronization are received from the predetermined server through the network interface module 130, the control module 170 outputs a list of the received contents through the display module 180. If a synchronization confirmation command for the received contents is input from the user through the user input interface module 150, the control module 170 controls the memory module 140 to update the list of contents of memory module 140.

Also, if contents for synchronization are received from the predetermined server through the network interface module 130, the control module 170 outputs a notification message to a predetermined zone of the display module 180. If a confirmation command for the received contents is input from the user through the user input interface module 150, the control module 170 controls the display module 180 to output a list of the received contents.

Also, the control module 170 may control the display module 180 to output the notification message together with image data corresponding to the received contents or information on the number of the received contents.

The control module 170 may control the memory module 140 such that the list of the received contents may additionally include contents previously stored in the memory module 140. Also, the control module 170 may control the display module to respectively display the received contents and the contents previously stored in the memory module.

According to another embodiment, if a content search keyword and a selection signal of the display device for search are received from the user through the user input interface module 150, the control module 170 transmits the received search information to a predetermined server through the network interface module 130 and receives' the search result from the server through the network interface module 130.

The display module 180 converts the video, data and OSD signals processed by the control module 170 or the video and data signals received from the external device interface module 135 to R, G, B signals, respectively, to generate driving signals.

Examples of the display module 180 may include PDP, LCD, OLED, flexible display, and 3D display. A touch screen may be used as the display module 180, whereby the display module may be used as an input module as well as an output module.

According to one embodiment, the display module 180 may output a user interface that includes contents or a list of contents for synchronization, which are stored in the memory module 140 for synchronization and search of contents, a contents synchronization menu, a synchronization notification message, and a contents search menu.

The audio output module 185 receives the signal audio-processed by the control module 170, for example, stereo signal, 3.1 channel signal or 5.1 channel signal, and outputs the received signal as sound. Various types of speakers may be used as the audio output module 185.

To sense gesture of the user, the display device 100 may further include a sensing unit (not shown) that includes at least one of a touch sensor, an audio sensor, a position sensor, and an action sensor, as described above. The signal sensed by the sensing unit may be transmitted to the control module 170 through the user input interface module 150.

The display device 100 may further include a camera module (not shown) that takes a user. Image information taken by the camera module may be input to the control module 170.

The control module 170 may sense gesture of the user by using the image taken from the camera module (not shown) and the signal sensed from the sensing unit, respectively or in combination.

The power supply module 190 supplies the corresponding power to the whole portion of the display device 100. In particular, the power supply module 190 can supply the power to the control module 170 that can be implemented in the form of a system on chip (SOC), the display module 180 for image display, and the audio output module 185 for audio output.

To this end, the power supply module 190 may further include a converter (not shown) that converts alternating current to direct current. In the mean time, if the display module 180 is implemented as a liquid crystal panel that includes a plurality of back light lamps, for example, for luminance variable or dimming driving, the power supply module 190 may further include an inverter (not shown) that enables PWN operation.

The remote controller 200 transmits a user input to the user input interface module 150. To this end, the remote controller 200 can use Bluetooth, Radio Frequency (RF) communication, infrared (IR) communication, Ultra Wideband (UWB), ZigBee, etc. Also, the remote controller 200 can receive the video, audio or data signal output from the user input interface module 150 to display the received signal or output audio or vibration.

The aforementioned display device 100 may be a fixed type digital broadcast receiver that can receive at least one of digital broadcasting of ATSC mode (8-VSB mode), digital broadcasting of DVB-T mode (COFDM mode), and digital broadcasting of ISDB-T mode (BST-OFDM mode).

The block diagram illustrated in FIG. 2 corresponds to but one of a plurality of embodiments. The respective elements of the block diagram may be incorporated, added or omitted depending on options of the display device 100 which is actually implemented. In other words, two or more elements may be incorporated into one element, or one element may be divided into two or more elements, as occasion demands.

Unlike the embodiment in FIG. 6, the display device 100 may receive and play video contents through the network interface module 130 or the external device interface module 135 without the tuner 110 and the demodulation module 120 illustrated in FIG. 6.

The display device 100 is an example of a video processor that performs signal processing of video stored therein or input video. Another examples of the video signal processor include a set-top box that excludes the display module 180 and the audio output module 185 illustrated in FIG. 6, the aforementioned DVD player, a blu-ray player, a game device, and a computer. Hereinafter, the set-top box will be described with reference to FIG. 7 and FIG. 8.

Figure 7:
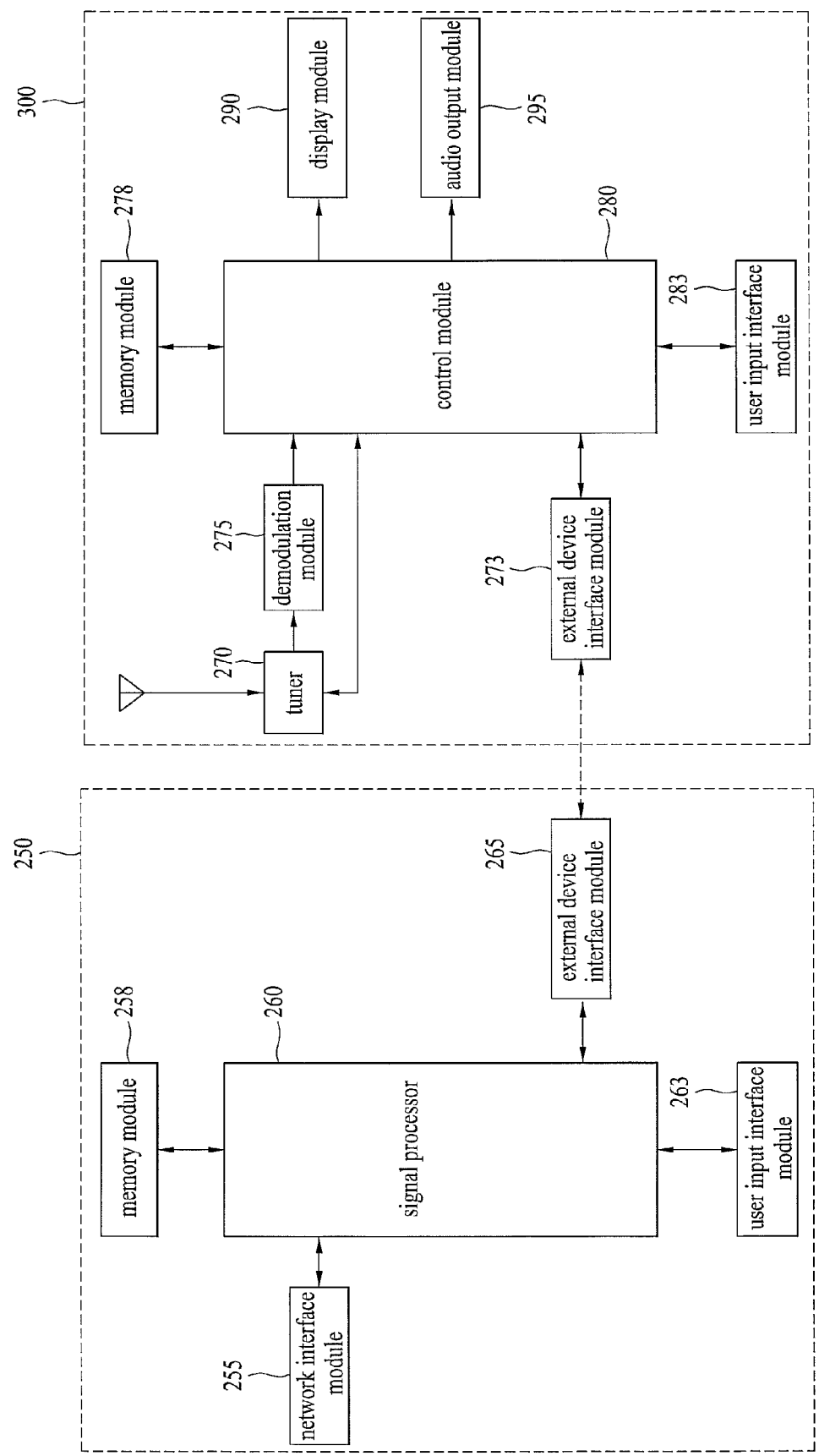
FIGS. 7 and 8 show a display device having or coupled to a set-top box.
Figure 8:
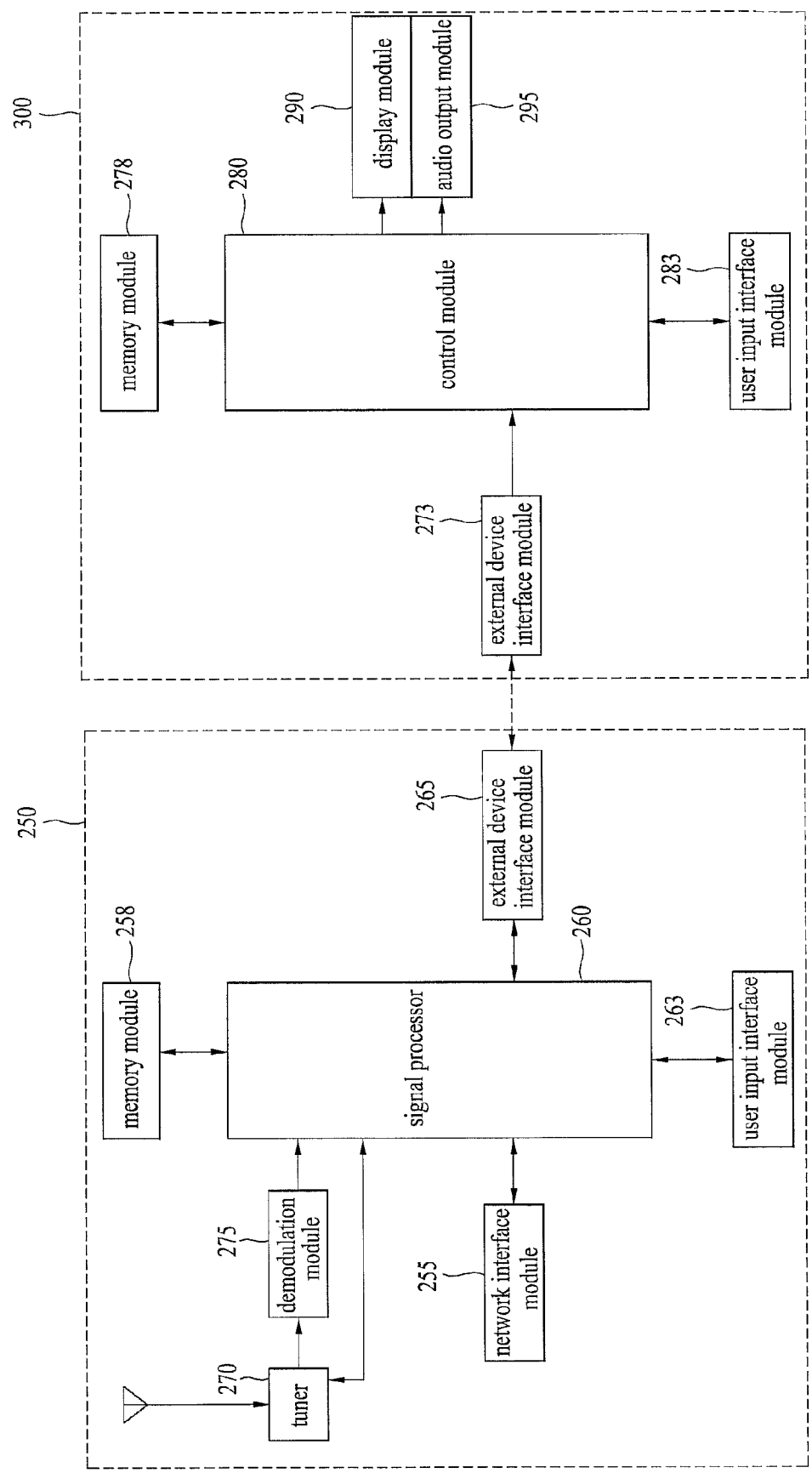

FIGS. 7 and 8 show a display device having or coupled to a set-top box. Referring to FIG. 7, a set-top box 250 and a displayer 300 can transmit or receive data through a wire or wireless cable.

The set-top box 250 includes a network interface module 255, a memory module 258, a signal processor 260, a user input interface module 263, and an external device interface module 265.

The network interface module 255 provides an interface for connection with wire/wireless network including Internet network. Also, the network interface module 255 transmits or receives data to and from other users or other electronic devices through a network connected thereto or another network linked on the connected network.

The memory module 258 may store a program for processing and controlling each signal of the signal processor 260, or may temporarily store the video, audio or data signal input from the external device interface module 265 or the network interface module 255. Also, the memory module 258 may store a platform illustrated in FIG. 11 and FIG. 12 which will be described later.

The signal processor 260 performs signal processing of an input signal. For example, the signal processor 260 may demultiplex or decode the input video signal, or may demultiplex or decode the input audio signal. To this end, the signal processor 260 may further include a video decoder or an audio decoder. The video signal or audio signal subjected to signal processing can be transmitted to the displayer 300 through the external device interface module 265.

The user input interface module 263 transmits the signal input by the user to the signal processor 260 or transmits the signal from the signal processor 260 to the user. For example, the user input interface module 263 may receive various control signals such as power on/off, action input and setup input, which are input by a local key (not shown) or a remote controller 200, to transmit the control signals to the signal processor 260.

The external device interface module 265 provides an interface for transmitting or receiving data to and from an external device connected thereto through a wire or wireless cable. In particular, the external device interface module 265 provides an interface for transmitting or receiving data to and from the displayer 300. In addition, the external device interface module 265 may provide an interface for transmitting or receiving data to and from external devices such as game devices, cameras, camcorders, computers (e.g., notebook computers), etc.

In the mean time, the set-top box 250 may further include a media input module (not shown) for playing separate media. An example of the media input module includes a blu-ray input module (not shown). In other words, the set-top box 250 may include a blu-ray player. Media of the input blu-ray disk are subjected to signal processing such as demultiplexing or decoding by the signal processor 260 and then transmitted to the displayer 300 through the external device interface module 265, whereby the media are displayed in the displayer 300.

The displayer 300 includes a tuner 270, an external device interface module 273, a demodulation module 275, a memory module 278, a control module 280, a user input interface module 283, a display module 290, and an audio output module 295.

Since the tuner 270, the demodulation module 275, the memory module 278, the user input interface module 283, the display module 290, and the audio output module 295 correspond to the tuner 110, the demodulation module 120, the memory module 140, the user input interface module 150, the display module 180, and the audio output module 185, which are illustrated in FIG. 6, their description will be omitted.

The external device interface module 273 provides an interface for transmitting or receiving data to and from an external device connected thereto through a wire or wireless cable. In particular, the external device interface module 273 provides an interface for transmitting or receiving data to and from the set-top box 250.

Accordingly, the video signal or audio signal input through the set-top box 250 is output to the display module 180 or the audio output module 185 through the control module 170.

Referring to FIG. 8, the set-top box 250 and the displayer 300 are similar to those illustrated in FIG. 7 but are different from those illustrated in FIG. 7 in that the tuner 270 and the demodulation module 275 are located in the set-top box 250 not the displayer 300. Hereinafter, the set-top box 250 and the displayer 300 of FIG. 8 will be described based on the difference from FIG. 7.

The signal processor 260 performs signal processing of a broadcast signal received through tuner 270 and demodulation module 275. Also, the user input interface module 263 receives an input signal of channel selection, channel storage, etc.

Figure 9:
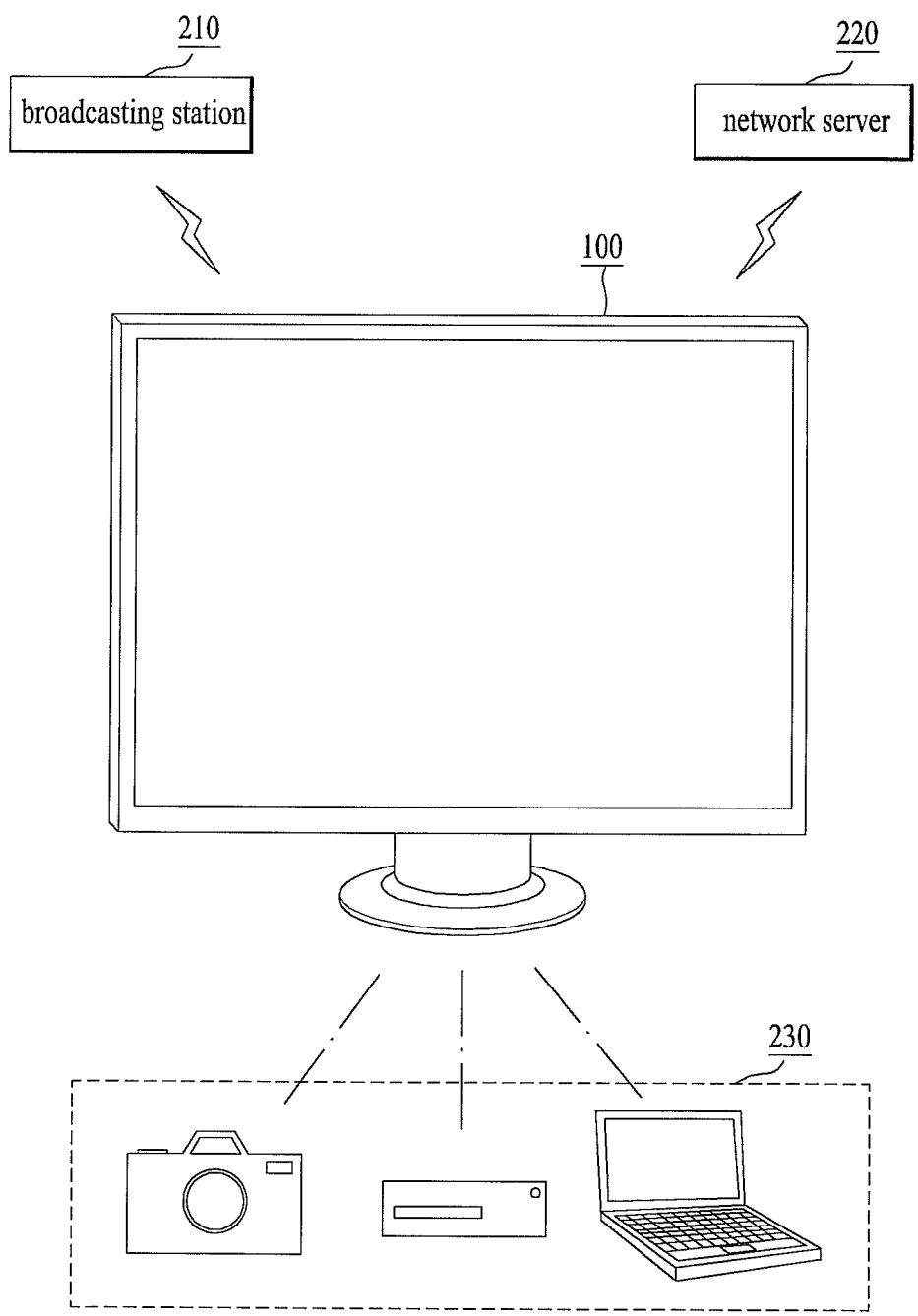
FIG. 9 shows a communication procedure performed between a display device and one or more other devices.

FIG. 9 shows a communication procedure performed between a display device and one or more other devices. As illustrated in FIG. 9, display device 100 can perform communication with a broadcasting station 210, a network server 220, or an external device 230.

The display device 100 receives a broadcast signal that includes a video signal transmitted from the broadcasting station 210. The display device 100 processes the video signal included in the broadcast signal and audio or data signal to be appropriately output from the display device 100. The display device 100 outputs video or audio based on the processed signal.

In the mean time, the display device 100 can perform communication with the network server. The network server 220 can transmit and receive a signal to and from the display device 100 through a random network. For example, the network server 220 may be a portable terminal that can be connected with the display device 100 through a wire or wireless base station. Also, the network server 220 may be a device that can provide contents to the display device 200 through Internet network. The content provider can provide contents to the display device by using the network server.

The display device 100 can perform communication with the external device 230. The external device 230 can directly transmit and receive a signal to and from the display device 100 through a wire or wireless cable. For example, the external device 230 may be a media memory device or a media player, which is used by the user. In other words, the external device 230 corresponds to a camera, a DVD player, a blu-ray player, or a personal computer.

The broadcasting station 210, the network server 220 or the external device 230 can transmit a signal, which includes a video signal, to the display device 100. The display device 100 can display video based on the video signal included in the input signal. Also, the display device 100 can transmit the signal, which is transmitted from the broadcasting station 210 or the network server 220 to the display device 100, to the external device 230. Also, the display device 100 can transmit the signal, which is transmitted from the external device 230 to the display device 100, to the broadcasting station 210 or the network server 220. In other words, the display device 100 serves to directly play and transmit the contents included in the signal transmitted form the broadcasting station 210, the network server 220 and the external device 230.

Figure 10:
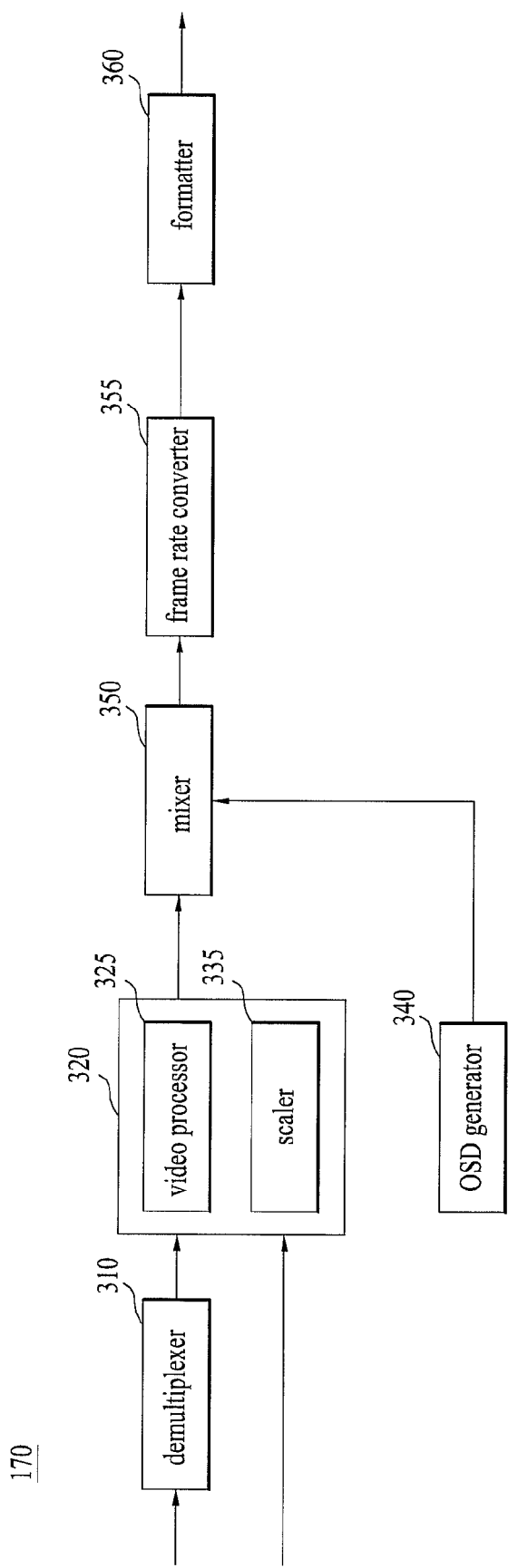
FIG. 10 shows one example of a control module.

FIG. 10 shows one example of a control module which, for example, may be included in FIG. 6. The control module 170 includes a demultiplexer 310, a video processor 320, an OSD generator 340, a mixer 350, a frame rate converter 355, and a formatter 360. The control module 170 may further include an audio processor (not shown) and a data processor (not shown).

The demultiplexer 310 demultipelxes input streams. For example, if MPEG-2 TS is input, the demultiplexer 310 demultiplexes the MPEG-2 TS and splits the demultiplexed MPEG-2 TS into a video signal, an audio signal and a data signal. In this case, the stream signal input to the demultiplexer 310 may be the stream signal output from the tuner 110, the demodulation module 120, or the external device interface module 135.

The video processor 320 can process the demultiplexed video signal. To this end, the video processor 320 includes a video decoder 325 and a scaler 335.

The video decoder 325 decodes the demultiplexed video signal, the scaler 335 performs scaling to output resolution of the decoded video signal through the display module 180.

The video decoder 325 may include decoders having various specifications. For example, if the demultiplexed video signal is an encoded video signal of the MPEG-2 specification, it may be decoded by an MPEG-2 decoder.

Also, for example, if the demultiplexed video signal is an encoded video signal of the H.264 specification based on a Digital Multimedia Broadcasting (DMB) mode or DVB-H mode, it may be decoded by an H.264 decoder.

The video signal decoded by video processor 320 is input to mixer 350.

The OSD generator 340 generates an OSD signal in accordance with input of the user or by itself. For example, the OSD generator 340 may generate a signal for displaying various kinds of information on the screen of the display module 180 in the form of graphic or text based on the control signal from the user input interface module 150. The generated OSD signal may include various data such as a user interface screen of the display device 100, a screen of various menus, widget, and icon.

For example, the OSD generator 340 may generate a signal for displaying broadcast information based on EPG or caption of broadcast video.

The mixer 350 mixes the OSD signal generated by the OSD generator 340 with the decoded video signal processed by the video processor 220. The mixed signal is provided to the formatter 360. As the decoded broadcast video signal or the external input signal is mixed with the OSD signal, the OSD may be overlaid on the broadcast video or the external input video.

The frame rate converter (FRC) 355 converts a frame rate of the input video. For example, the frame rate converter 355 converts a frame rate of 60 Hz to a frame rate of 120 Hz or 240 Hz. If the frame rate converter 355 converts the frame rate of 60 Hz to the frame rate of 120 Hz, a first frame may be inserted between another first frame and the second frame, or a third frame predicted from the first frame and the second frame may be inserted between the first frame and the second frame. If the frame rate converter 355 converts the frame rate of 60 Hz to the frame rate of 240 Hz, three same frames may be inserted between another first frame and the second frame, or the third frame predicted from the first frame and the second frame may be inserted between the first frame and the second frame. In the mean time, the input frame rate may be maintained without separate conversion.

The formatter 360 receives an output signal of the frame rate converter 355, changes a format of the signal to conform to the display module 180, and then outputs the changed format. For example, the formatter 360 may output R, G, B data signals. The R, G, B data signals may be output by low voltage differential signaling (LVDS) or mini-LVDS.

In the mean time, the audio processor (not shown) in the control module 170 may perform audio processing of the demultiplexed audio signal. To this end, the audio processor may include various decoders.

If the demutliplexed audio signal is an encoded audio signal, the audio processor in the control module 170 may decode the encoded audio signal. For example, the demultiplexed audio signal may be decoded by an MPEG-2 decoder, MPEG-4 decoder, AAC decoder, or AC-3 decoder.

Also, the audio processor in the control module 170 can process base, treble and sound volume control.

The data processor (not shown) in the control module 170 can perform data processing of the demultiplexed data signal. If the demutliplexed data signal is an encoded data signal, the data processor in the control module 170 may decode the encoded data signal. The encoded data signal may be electronic program guide (EPG) information that includes broadcast information such as start time and end time of a broadcast program broadcasted from each channel. For example, the EPG information may be ATSC-Program and System information protocol (ATSC-PSIP) information in case of the ATSC mode, and may include DVB-Service Information (DVB-SI) in case of the DVB mode.

The ATSC-PSIP information or the DVB-SI information may be information included in the aforementioned stream, i.e., a header (4 byte) of the MPEG-2 TS.

In the mean time, since the block diagram of the control module 170 illustrated in FIG. 10 is for one embodiment, other modules may be added to the respective elements of the block diagram in accordance with the needs of those skilled in the art, or some of the modules or elements illustrated in FIG. 10 may be omitted.

Figure 11:
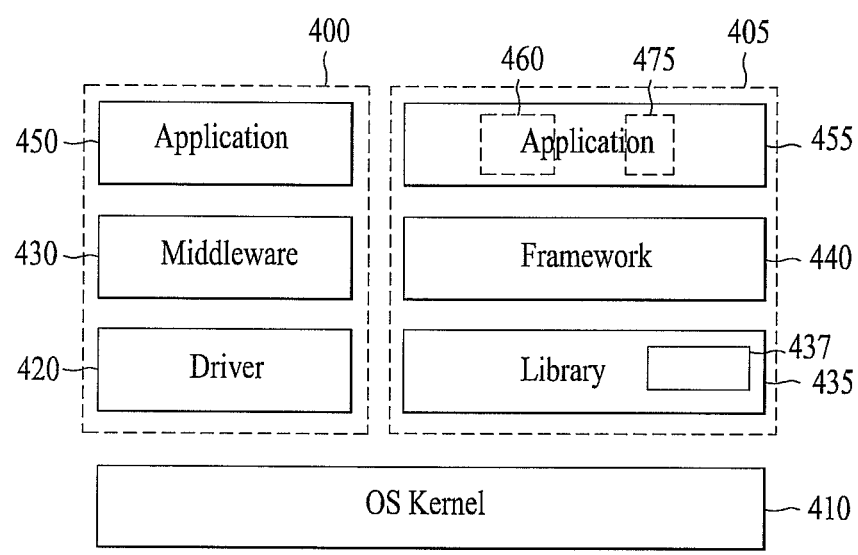
FIG. 11 shows one example of a platform structure for a display device.
Figure 12:
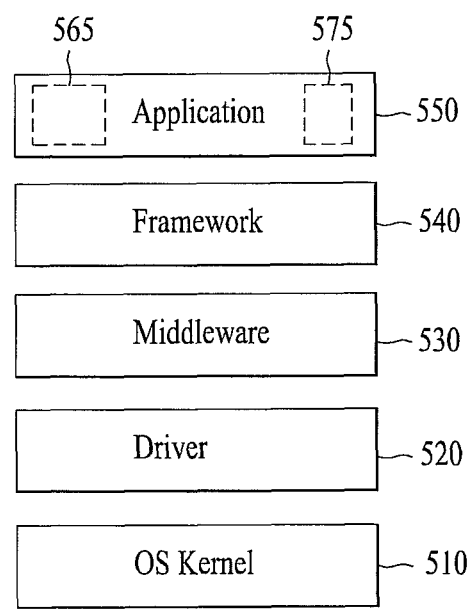
FIG. 12 shows another embodiment of a platform structure.

FIG. 11 shows one example of a platform structure for a display device, and FIG. 12 shows another embodiment of a platform structure. A platform of any one of the display devices according to one or more embodiments may include OS based software to perform the aforementioned various operations.

Referring to FIG. 11, a platform of any one of the display devices according to one or more embodiments is a split-type platform and can be designed in such a manner that it is split into a legacy system platform 400 and a smart system platform 405. An OS kernel 410 may be used in common for the legacy system platform 400 and the smart system platform 405.

The legacy system platform 400 includes a driver 420 on the OS kernel 410, a middleware 430, and an application layer 450.

The smart system platform 405 includes a library 435 on the OS kernel 410, a framework 440, and an application layer 455.

The OS kernel 410 is a core of the operating system, and can perform at least one of driving of a hardware driver, security of hardware and processor in the display device, efficient management of system resources, memory management, interface for hardware based on hardware abstraction, multi-process, and schedule management based on multi-process when the display device is driven. In the mean time, the OS kernel 410 may further perform power management.

The hardware driver in the OS kernel 410, for example, may include a display driver, a Wi-Fi driver, a Bluetooth driver, a USB driver, an audio driver, a power manager, a binder driver, and a memory driver.

Also, the hardware driver in the OS kernel 410 may further include a character device driver, a block device driver, and a network device driver as drivers for hardware devices therein. The block device driver may need a buffer equivalent to unit size in accordance with data transmission of a specific block unit. The character device driver may not need a buffer due to data transmission in a basic data unit, i.e., character unit.

As described above, the OS kernel 410 can be implemented as the kernel based on various operating systems such as unix (linux) based operating system and window based operating system. Also, the OS kernel 410 is an opened OS kernel, and can be used generally by other electronic devices.

The driver 420 is located between the OS kernel 410 and the middleware 430, and drives the device for operation of the application layer 450 together with the middleware 430. For example, the driver 420 may include drivers such as a micom in the display device, a display module, a graphic processing unit (GPU), a frame rate converter (FRC), a general purpose input/output pin (GPIO), HDMI, system decoder or demultiplexer (SDEC), video decoder (VDEC), audio decoder (ADEC), a personal video recorder (PVR), and an inter-integrated circuit (I2C). These drivers interact with the hardware driver in the OS kernel 410.

Also, the driver 420 may further include a driver of a remote controller 200, especially a spatial remote controller which will be described later. The driver of the spatial remote controller may be provided in the OS kernel 410 or the middleware 430 in addition to the driver 420.

The middleware 430 is located between the OS kernel 410 and the application layer 450, and serves as a medium that allows data to be exchanged between hardware and software. In this case, a standardized interface can be provided, various environments can be supported, and mutual interaction between tasks of different systems can be performed.

Examples of the middleware 430 in the legacy system platform 400 include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware.

The application layer 450 on the middleware 430, namely the application layer 450 in the legacy system platform 400 may include a user interface application on various menus in the display device. The application layer 450 on the middleware 430 can be edited by selection of the user, and can be updated through the network. This application layer 450 enables the user to input a desired menu of various user interfaces in accordance with input of the remote controller during viewing broadcasting image.

Also, the application layer 450 in the legacy system platform 400 may further include at least one of TV guide application, Bluetooth application, reservation application, digital video recorder (DVR) application, hot key application.

In the mean time, the library 435 in the smart system platform 405 is located between the OS kernel 410 and the framework 440, and can form the base of the framework 440. For example, the library 435 includes security library, web engine library and media library, wherein the security library includes secure socket layer (SSL), the web engine library includes WebKit, libc (c library), and video and audio formats, and the media library includes media framework. The library 435 can be made based on C or C++, and can be exposed to a developer through the framework 440.

The library 435 may include a runtime 437 that includes a core java library and a virtual machine (VM). The runtime 437 forms the base of the framework 440 together with the library 435.

The virtual machine (VM) may be a virtual machine that enables a plurality of instances, i.e., multi-tasking. The virtual machine (VM) may be allocated in accordance with each application in the application layer 455. At this time, for schedule adjustment and interconnection between the plurality of instances, the binder driver (not shown) in the OS kernel 410 may be driven.

The binder driver and runtime 437 can connect java based application with C based library.

The binder driver and the runtime 437 can correspond to middleware of the legacy system.

The framework 440 in the smart system platform 405 includes a program based on the application in the application layer 455. The framework 440 is compatible with any one of the applications and enables reuse, movement or exchanges of components. The framework 440 may include a support program, and a program that compiles other software elements. For example, the framework 440 may include a resource manager, an activity manager related to activities of the application, a notification manager, and a content provider for briefing of information shared between the applications. The framework 440 can be made based on JAVA.

The application layer 455 on the framework 440 includes various programs that can be driven and displayed in the display device 100. For example, the application layer 455 may include core application that includes at least one of email, short message service (SMS), calendar, map, and browser. This application layer 455 can be made based on JAVA.

Also, the application layer 455 can be divided into application 465 that can be stored in the display device 100 and cannot be deleted by the user and application 475 that can be downloaded through the external device or network and can freely be installed or deleted by the user.

Internet phone service, video on demand (VOD) service, web album service, social networking service (SNS), location based service (LBS), map service, web search service and application search service may be performed by network access through the application in the application layer 455. Also, various functions such as games and schedule management may be performed through the application in the application layer 455.

Referring to FIG. 12, a platform of any one of the display devices according to one or more embodiments is an integrated-type platform and includes an OS kernel 510, a driver 520, a middleware 530, a framework 540, and an application layer 550.

The platform of FIG. 12 is different from that of FIG. 11 in that the library 435 illustrated in FIG. 11 is omitted and the application layer 550 is an integrated layer. The driver 520 and the framework 540 correspond to those of FIG. 11.

The platform of FIG. 12 can be designed such that the library 435 illustrated in FIG. 11 is incorporated into the middleware 530 illustrated in FIG. 12. In other words, the middleware 530 includes legacy system middleware and display system middleware. The legacy system middleware may include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware.

The display system middleware may include security library, web engine library and media library, wherein the security library includes secure socket layer (SSL), the web engine library includes WebKit, libc, and the media library includes media framework. The display system middleware may further include runtime described above.

The application layer 550 in the legacy system may include menu application, TV guide application, and reservation application while the application layer 55 in the display system may include email, short message service (SMS), calendar, map, and browser.

The application layer 550 may be divided into application 565 that can be stored in the display device 100 and cannot be deleted by the user and application 575 that can be downloaded through the external device or network and can freely be installed or deleted by the user.

Based on the aforementioned platforms of FIG. 11 and FIG. 12, various API (Application Programming Interface) and SDK (Software Development Kit) can be opened for an application development. In the future or present time. Moreover, API can be implemented by calling the function that provides a connection to specific subroutine for implementation in a program.

For example, Those API and SDK can be opened by a source involved with hardware driver in OS kernel 410 such as display driver, Wi-fi driver, Bluetooth driver, USB driver, Audio driver, and so on. According to another embodiment, those API and SDK can be opened by a related source in a driver 420 such as a micom in the display device, a display module, a graphic processing unit (GPU), a frame rate converter (FRC), system decoder or demultiplexer (SDEC), video decoder (VDEC), audio decoder (ADEC), a spatial remote controller and so on.

According to another embodiment, the API and SDK can be opened by a related source such as PSIP involved with broadcasting information, SI middleware or DLNA middleware.

A developer skilled in the art can develop at least one of application that is used for display device 100 control or ran in display device 100 based on the aforementioned platforms of FIG. 11 and FIG. 12 by using those various open API.

The aforementioned platforms of FIG. 11 and FIG. 12 can be used generally for various electronic devices as well as the display device. In the mean time, the platforms of FIG. 11 and FIG. 12 may be stored or loaded in the memory module 140 or the control module 170 illustrated in FIG. 6 or a separate processor (not shown). Also, the platforms of FIG. 11 and FIG. 12 may be stored or loaded in the SI&Metadata DB 711, the UI manager 714 or the service manager 713 illustrated in FIG. 7. Also, a separate application processor (not shown) for implementing application may further be provided.

Figure 13:
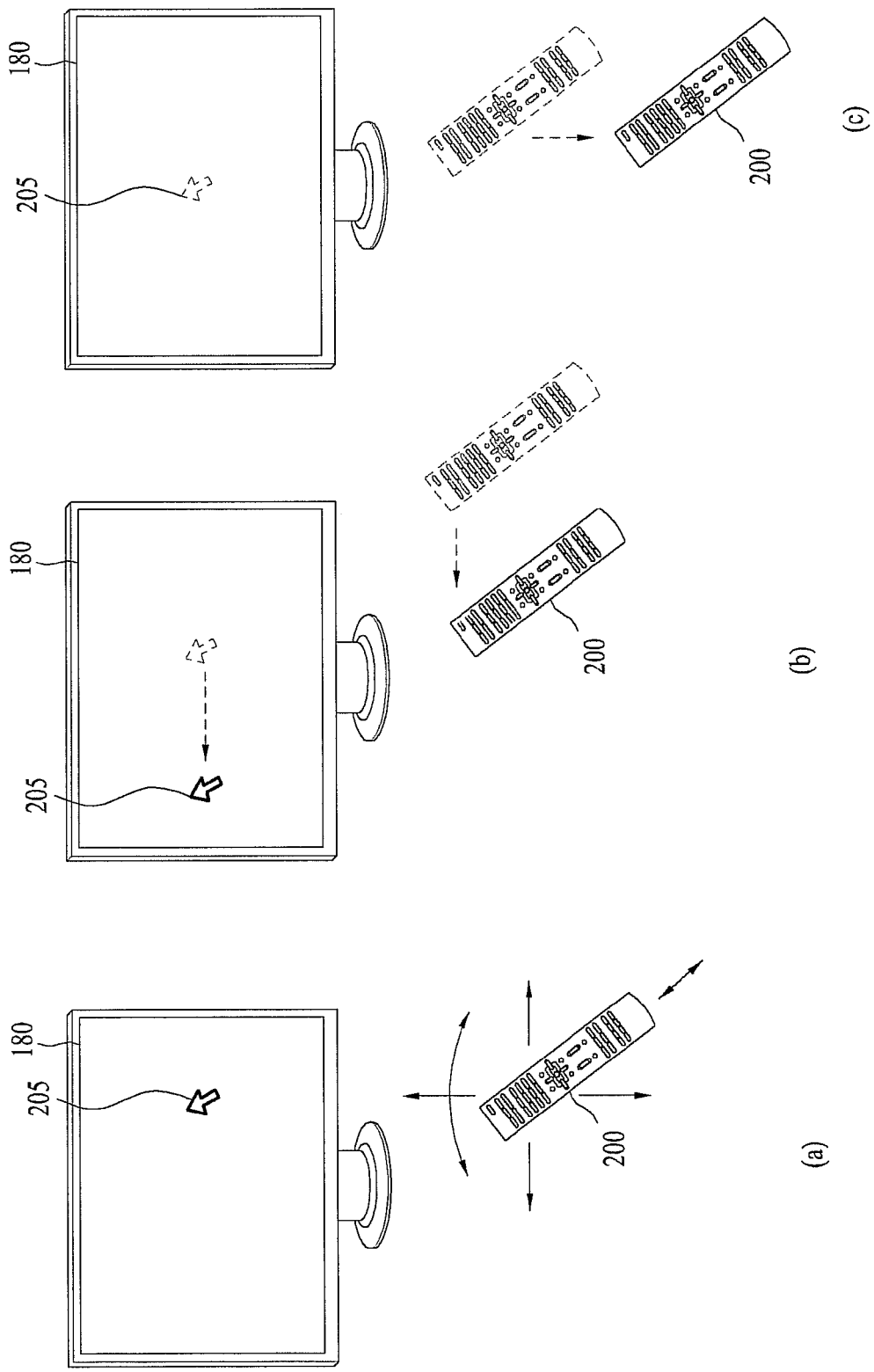
FIG. 13 shows steps included in one embodiment of a method for controlling a remote controller of a display device.

FIG. 13 shows steps included in one embodiment of a method for controlling a remote controller of a display device. As illustrated in FIG. 13(a), a pointer 205 corresponding to the remote controller 200 is displayed in the display module 180.

The user can move or rotate the remote controller 200 in up and down direction and left and right direction (FIG. 13(b)) and in front and rear direction (FIG. 13(c)). The pointer 205 displayed in the display module 180 of the display device corresponds to movement of the remote controller 200. Since the remote controller 200 moves to the corresponding pointer 205 in accordance with movement on 3D space as shown, it may be referred to as a spatial remote controller.

FIG. 13(b) illustrates that, if the user moves the remote controller 200 to the left, the pointer 205 displayed in the display module 180 of the display device moves to the left correspondingly.

Information on movement of the remote controller 200, which is sensed by a sensor of the remote controller 200, is transmitted to the display device. The display device can obtain a coordinate of the pointer 205 from the information on movement of the remote controller 200. The display device can display the pointer 205 to correspond to the above coordinate.

FIG. 13(c) illustrates that the user moves the remote controller 200 to be far away from the display module 180 in a state that the user pushes a specific button of the remote controller 200. In this case, a zone selected in the display module 180 corresponding to the pointer 205 is displayed through zoom-in.

On the contrary, if the user moves the remote controller 200 to be close to the display module 180, the zone selected in the display module 180 corresponding to the pointer 205 is displayed through zoom-out. If the remote controller 200 becomes far away from the display module 180, the selected zone may be subjected to zoom-out. If remote controller 200 becomes close to the display module 180, the selected zone may be subjected to zoom-in.

In a state that the specific button of the remote controller 200 is pushed, up and down movement and left and right movement may not be recognized. In other words, if the remote controller 200 moves to be far away from or close to the display module 180, front and rear movement may be recognized only without recognition of up and down movement and left and right movement. In a state that the specific button of the remote controller 200 is not pushed, the pointer 205 is only moved in accordance with up and down movement and left and right movement of the remote controller 200.

Movement speed or movement direction of the pointer 205 may correspond to that of the remote controller 200. In this specification, the pointer means an object displayed in the display module 180 to correspond to action of the remote controller 200. Accordingly, in addition to an arrow shape illustrated by the pointer 205, various shaped objects may be provided. For example, examples of the pointer may include dot, cursor, prompt, and thick outline. The pointer may be displayed to correspond to any one point of a horizontal axis and a vertical axis on the display module 180, or may be displayed to correspond to a plurality of points such as line and surface.

Figure 14:
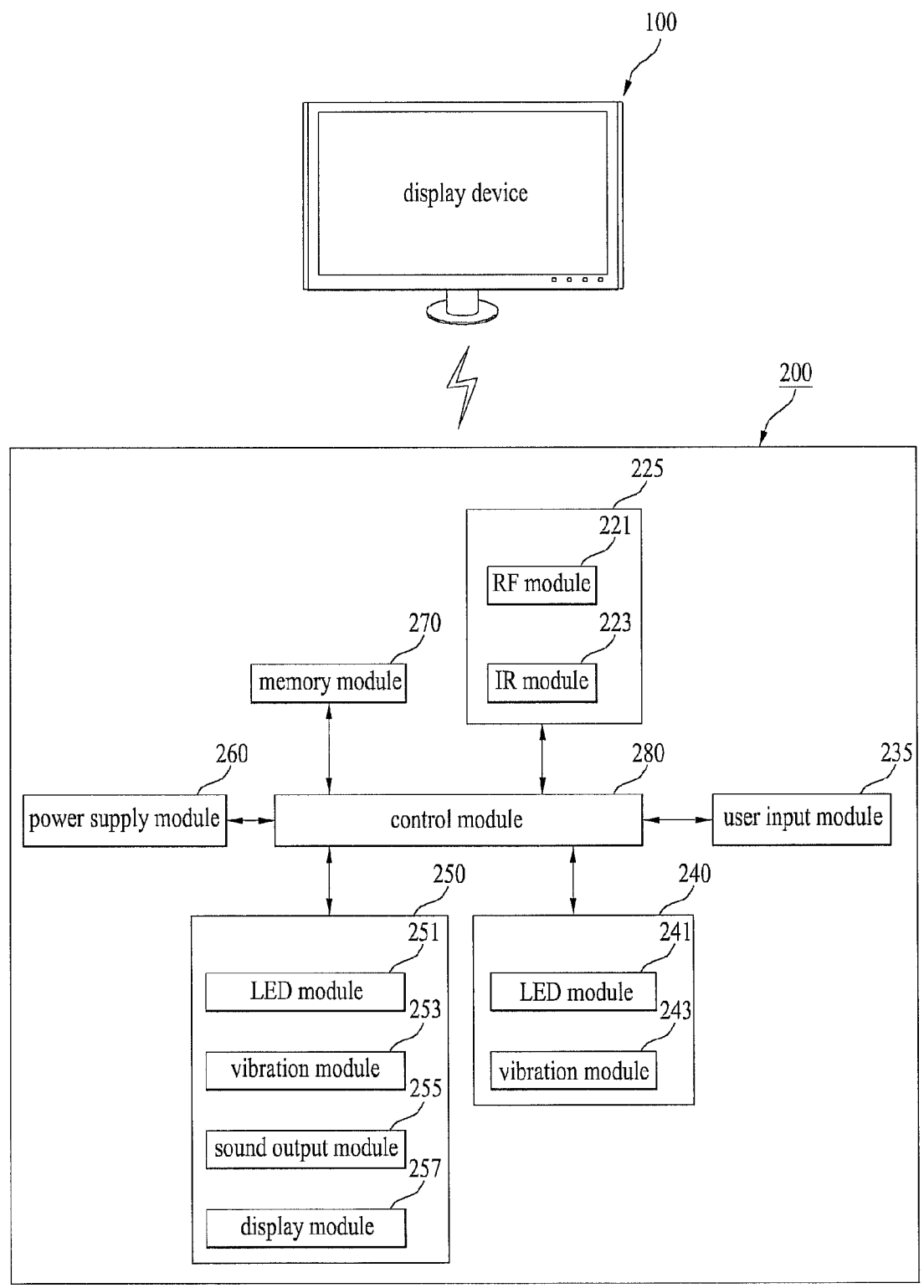
FIG. 14 shows a remote controller for controlling a display device.

FIG. 14 shows a remote controller 200 for controlling a display device. The remote controller 200 includes a wireless communication module 225, a use input module 235, a sensor module 240, an output module 250, a power supply module 260, a memory module 270, and a control module 280.

The wireless communication module 225 transmits and receives a signal to and from any one of the aforementioned display devices.

In this embodiment, the remote controller 200 may include RF module 221 that can transmit and receive a signal to and from the display device 100 in accordance with the RF communication standard. The remote controller 200 may further include IR module 223 that can transmit and receive a signal to and from the display device 100 in accordance with the IR communication standard.

In this embodiment, the remote controller 200 transmits a signal, which includes information on its movement, to the display device 100 through the RF module 221.

Also, the remote controller 200 can receive the signal transmitted from the display device 100 through the RF module 221. Also, the remote controller 200 can transmit a command on power on/off, channel change and volume change to the display device 100 through the IR module 223.

The user input module 235 can include a key pad, a button, a touch pad, or a touch screen. The user can input the command related to the display device 100 to the remote controller 200 by manipulating the user input module 235. If the user input module 235 includes a hard key button, the user can input the command related to the display device 100 to the remote controller 200 through a push action of the hard key button.

If the user input module 235 includes a touch screen, the user can input the command related to the display device 100 to the remote controller 200 by touching a soft key of the touch screen. Also, the user input module 235 may include various kinds of user input units may be used including but not limited to a scroll key and jog key.

The sensor module 240 may include a gyro sensor 241 or an acceleration sensor 243. The gyro sensor 241 can sense the information on movement of the remote controller 200. For example, the gyro sensor 241 can sense the information on movement of the remote controller 200 based on x, y and z axes. The acceleration sensor 243 can sense information on movement speed of the remote controller 200. In the mean time, the sensor module 240 may further include a distance sensor that senses the distance between the display module 180 and the remote controller 200.

The output module 250 can output the video or audio signal corresponding to the manipulation of the user input module 235 or the signal transmitted from the display device 100. The user can recognize whether the user input module 235 has been manipulated or whether the display device 100 has been controlled, through the output module 250.

For example, if the user input module 235 is manipulated or if the output module 250 transmits and receives a signal to and from the display device 100 through the wireless communication module 225, the output module 250 may include an LED module 251 for lighting, a vibration module 253 that generates vibration, a sound output module 255 that outputs sound, or a display module 257 that outputs image.

The power supply module 260 supplies the power to the remote controller 200. If the remote controller 200 does not move for a predetermined time, the power supply module 260 can save the power by stopping power supply. The power supply module 260 can resume power supply if a predetermined key provided in the remote controller 200 is manipulated.

The memory module 270 may store various kinds of programs and application data required for control or operation of the remote controller 200. If the remote controller 200 transmits and receives a signal to and from the display device 100 through the RF module 221, the remote controller 200 and the display device 100 transmit and receive the signal to and from each other through a predetermined frequency band. The control module 280 of the remote control module 200 can store information on the frequency band, which can be transmitted and received to and from the display device 100 paired with the remote controller 200, and can refer to the stored information.

The control module 280 controls all matters related to control of the remote controller 200. The control module 280 can transmit the signal corresponding to predetermined key manipulation of the user input module 235 or the signal corresponding to movement of the remote controller 200, which is sensed by the sensor module 240, to the display device through the wireless communication module 225.

Figure 15:
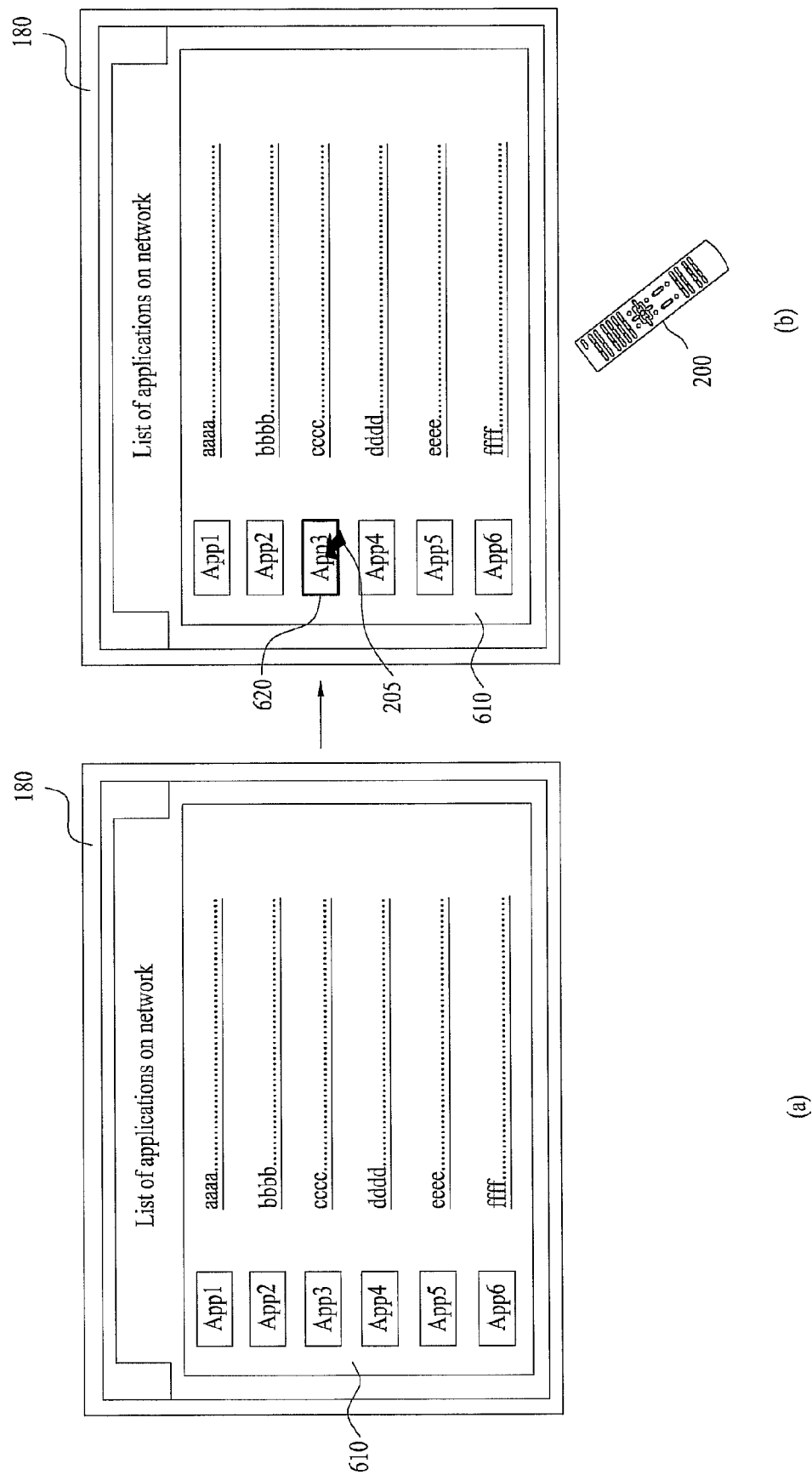
FIG. 15 shows a first example of a user interface for a display device.
Figure 16:
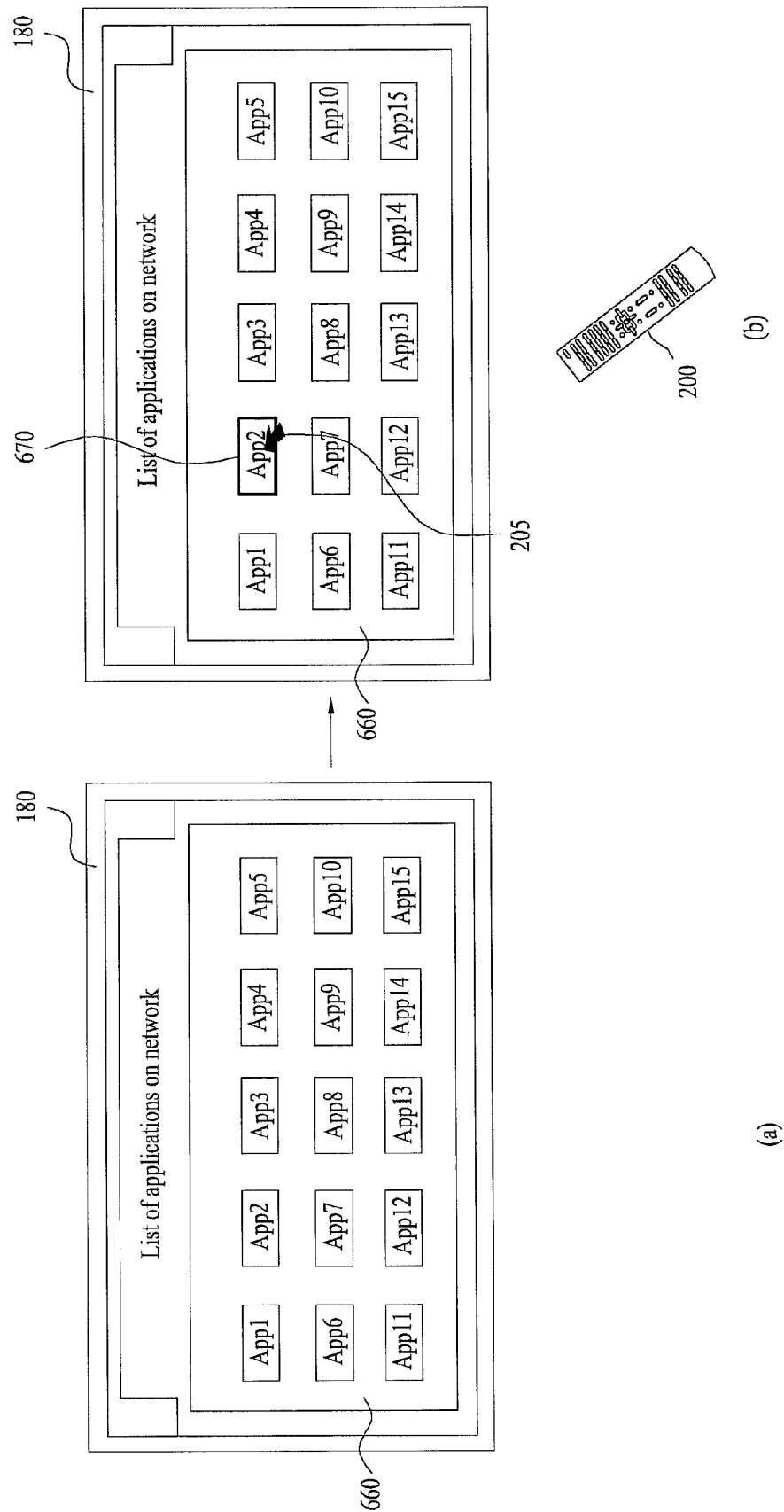
FIG. 16 shows a second example of a user interface for a display device.

FIG. 15 shows a first example of a user interface for a display device, FIG. 16 shows a second example of a user interface for a display device, FIG. 17 shows a third example of a user interface for a display device, and FIG. 18 shows a fourth example of a user interface for a display device.

In FIG. 15, the list of applications on the network is displayed in the display module 180. In other words, the user can search and download various applications by directly accessing the corresponding content server or network server.

In FIG. 15(*a*), a list 610 of various applications in the accessed server is displayed in the display module 180. The list 610 of applications may include icon representing each application and brief information on each application. In the mean time, since the display device enables full browsing, it can display the icon or brief information received from the server through zoom-in. In this case, the user can easily identify the list of applications. This will be described later.

In FIG. 15(*b*), any one 620 of the list 610 of applications is selected using the pointer 205 of the remote controller 200. In this case, the corresponding application can be downloaded conveniently.

FIG. 16 illustrates that the list of applications in the display device is displayed in the display module 180. First of all, in FIG. 16(*a*), if the user views the list of applications by manipulating the remote controller 200, the list 660 of applications stored in the display device may be displayed in the display module 180. Although the icons representing each application are only shown in the drawing, the embodiments described herein are not limited to the icons. The list of applications may include brief information on each application as in FIG. 15, whereby the user can easily identify the list of applications.

In FIG. 16(*b*), any one 670 of the corresponding list 660 of applications is selected using the pointer 205 of the remote controller 200. In this case, the corresponding application can be implemented conveniently.

In order to select a predetermined item, the pointer 205 moves in accordance with movement of the user by using the remote controller 200 in FIG. 15 and FIG. 16. Also, various examples for selecting a predetermined item may be provided. For example, a cursor displayed on the screen by combination of a directional key and a confirmation key, which are arranged in a local key (not shown) or the remote controller 200, may be used to select a predetermined item.

For another example, if the remote controller 200 includes a touch pad, the pointer 205 is moved on the display module 180 by touch action of the touch pad. In this way, a predetermined item may be selected.

FIG. 17 illustrates that a web screen is displayed in the display module of the display device. In FIG. 17(*a*), a predetermined web screen 710 that includes a search window 720 is displayed in the display module 180. The user can input a predetermined text in the search window 720 by using a key pad (not shown) displayed on the screen, a text key (not shown) provided in a local key (not shown), or a text key (not shown) provided in the remote controller.

FIG. 17(*b*) illustrates that a search result screen 730 according to a search keyword input to the search window is displayed in the display screen 180. Since the display device according to this embodiment enables full browsing, the user can easily identify the web screen.

FIG. 18 illustrates that a web screen is displayed in the display portion of the display device. In FIG. 18(*a*), a mail service screen 810 having an ID input window 820 and a password input window 825 is displayed in the display module 180. The user can input a predetermined text in the ID input window 820 and the password input window 825 by using a key pad (not shown) displayed on the screen, a text key (not shown) provided in a local key (not shown), or a text key (not shown) provided in the remote controller. Accordingly, the user can log in the corresponding mail service.

In FIG. 18(*b*), a screen 830 after log in mail service is displayed in the display module 180. For example, 'read mail' item, 'write mail' item, 'sent box' item, 'received box' item, and 'recycle bin' item may be displayed in the display module. Also, the 'received box' item may be divided into 'sender' item and 'title' item. In this way, the received mails may be arranged and displayed in the display module 180.

Since the display device enables full browsing when the screen for mail service is displayed, the user can use the mail service conveniently.

Figure 19:
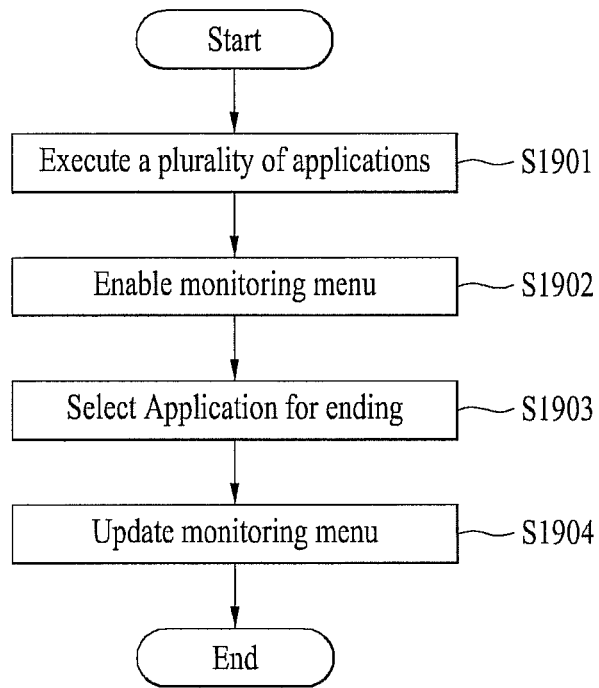
FIG. 19 shows a procedure for providing an application monitoring screen on a display device according to any of the aforementioned embodiments or examples.

FIG. 19 shows a procedure for providing an application monitoring screen on a display device according to any of the aforementioned embodiments or examples. According to one embodiment, a user can execute one or more applications in the display apparatus at the same time (S1901). Also, the executed applications are in the execution status while sharing the memory of the display apparatus. The applications may be executed on the display screen at the same time by screen split. Alternatively, the applications may be executed in such a manner that any one application is executed on the entire screen and the other applications are executed on a background.

Next, the display apparatus receives a signal for enabling a monitoring menu from the user (S1902). The signal for enabling the monitoring menu may include a remote controller or a hot-key input of the display apparatus. Also, the signal may include a selection signal of a predetermined menu item included in the display screen. At this time, the user can use various input means such as a spatial remote controller, an infrared remote controller, and a remote controller provided with a keyboard and a touch pad.

If the signal is received, the display apparatus displays the monitoring menu on the screen.

According to one embodiment, the monitoring menu may be displayed on a predetermined zone of the display screen currently used by the user in the form of window, or may be displayed on the entire screen to enhance readability. Also, the monitoring menu may be displayed in an opaque color so as not to disturb use of an application used before the signal for enabling the monitoring menu is input.

According to one embodiment, the monitoring menu may include various kinds of information such as billing information, memory use information and information on the number of use times and then may be provided to the user, as described in detail with reference to FIG. 30 to FIG. 32.

Next, the user selects whether to end what application based on the information on the monitoring menu (S1903).

The user can select one or more applications, or can select a signal to end all applications currently in service.

The selected signal can be input through a remote controller or various input means of the display apparatus.

If the selected signal is received, the display apparatus ends execution of the selected applications (S1904). If a problem such as loss of information or disconnection occurs due to the end of the applications, a message indicating that the problem will occur is displayed to warn the user of the problem.

Next, if the end of the applications is finished, the monitoring menu is updated.

According to one embodiment, the billing information, the memory use information and the information on the number of use times are again measured in a state that the selected applications are ended, whereby the monitoring menu is updated.

The user can further end another application with reference to the updated monitoring menu or disable the monitoring menu. Also, according to another embodiment, the display apparatus can disable the monitoring menu at the same time when the end of the selected applications is finished.

A module for displaying the monitoring menu in the display apparatus can be stored in the display apparatus and then provided to the user when a manufacturer of the display apparatus manufactures the module for displaying the monitoring menu.

Also, according to one embodiment, the module for displaying monitoring menu may not be stored in the initial display apparatus. Namely, the display apparatus may install the module for displaying the monitoring menu by accessing a predetermined web site and downloading data for displaying the monitoring menu.

Figure 20:
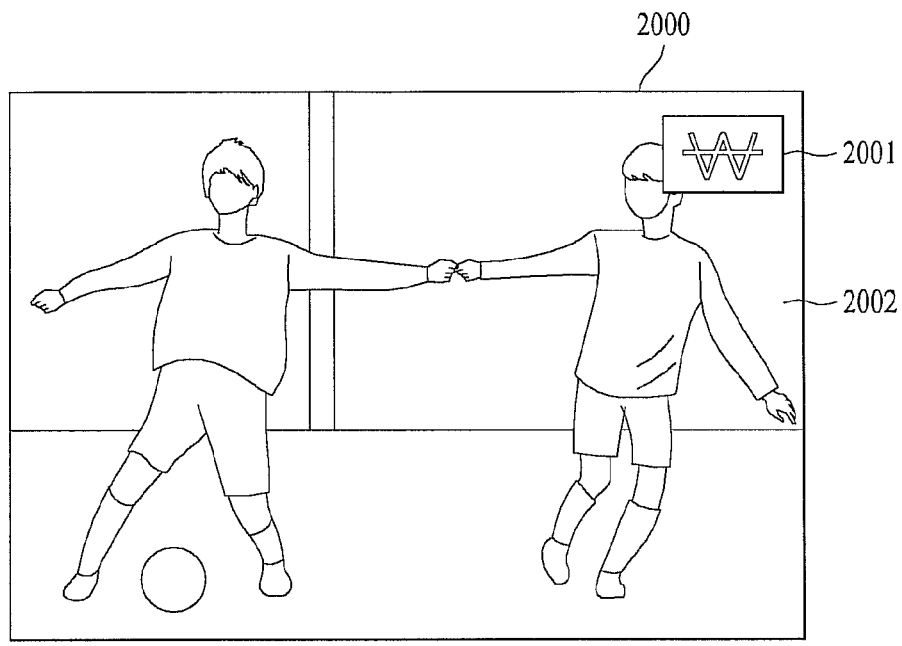
FIG. 20 shows one example of a display screen that includes a menu item for enabling a monitoring menu.

FIG. 20 shows one example of a display screen that includes a menu item for enabling a monitoring menu. According to one embodiment, a menu item 2001 for enabling the monitoring menu may be displayed on a predetermined zone of the display screen in the form of icon so as not to disturb the display screen of contents currently in service in the display apparatus.

The contents can include various contents, such as movie contents, music contents, real-time broadcasting contents, web page contents and game contents, which can be used in the display apparatus. Also, the menu item for enabling the monitoring menu may be displayed while an execution screen of a predetermined application is being displayed in the display apparatus.

Also, the icon may be set in such a manner that it is not always displayed but displayed if a pointer is located at a random position designated by the user.

The icon may include image or text representing the menu item for enabling the monitoring menu. Also, color or transparency of the menu item 2001 may be changed depending on user setup, as described in detail with reference to FIG. 21 to FIG. 24.

Figure 21:
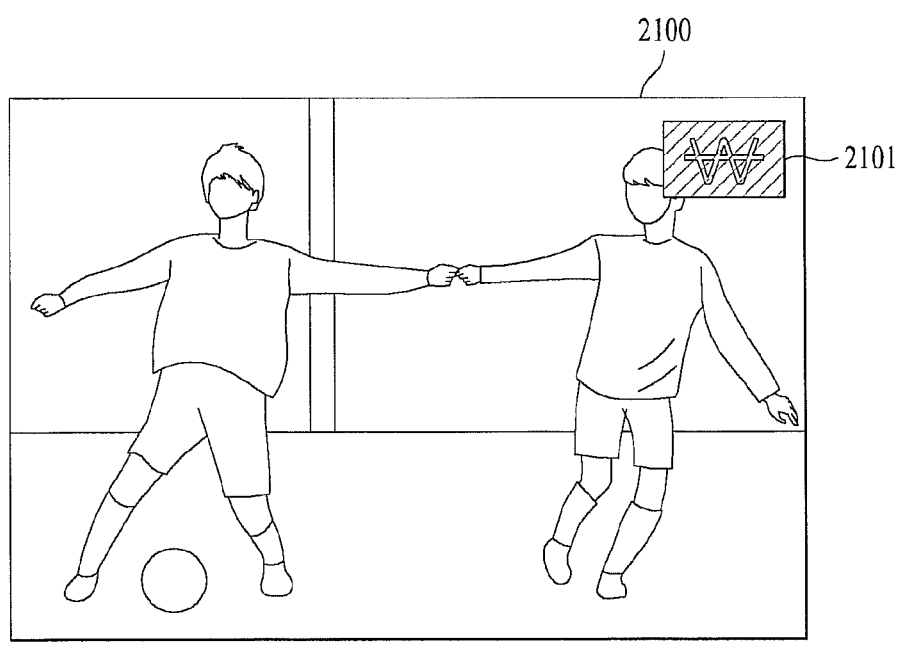
FIGS. 21 and 22 show additional examples of display screens that include menu items for enabling a monitoring menu.
Figure 22:
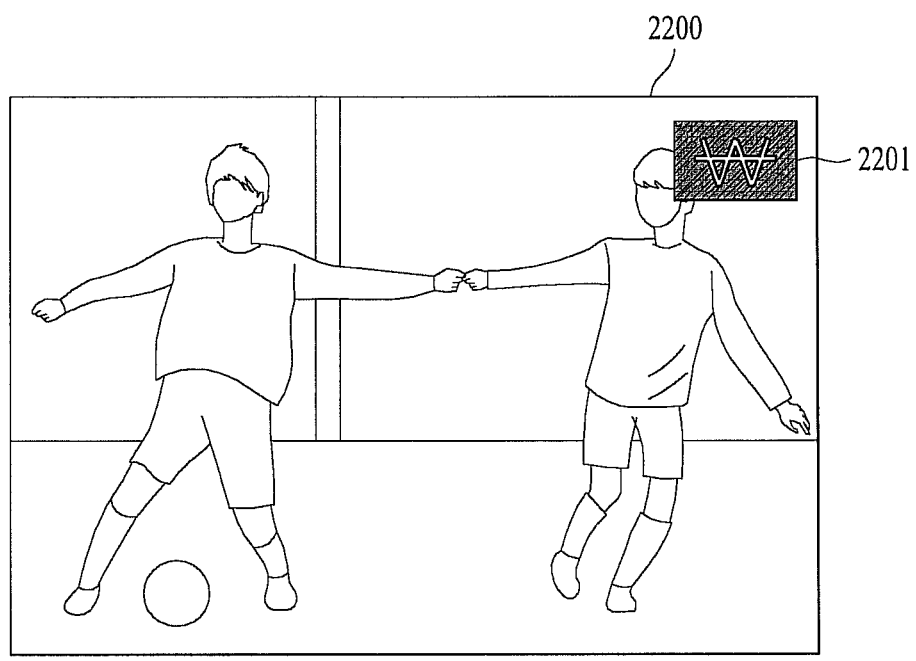

FIGS. 21 and 22 show additional examples of display screens that include menu items for enabling a monitoring menu. In this menu, menu items 2101 and 2202 can be displayed on a predetermined zone of the display screen in the form of icon. Also, the icon may be displayed in various colors depending on the execution status of contents or applications currently in service in the display apparatus.

For example, it is supposed that the color is varied depending on the memory usage. In this case, if memory capacity currently remaining in the display apparatus is sufficient, the icon may be displayed in green color. If the remaining memory capacity corresponds to half of the total memory capacity, the icon may be displayed in yellow color. Also, as the remaining memory capacity is small, if the application or contents currently in service may forcibly be ended the icon may be displayed in red color.

The user can conveniently identify the status of the current memory through only the color of the icon.

Also, the green, yellow, or red is only exemplary, and more various colors may be displayed depending on memory use level. If the remaining memory capacity is reduced, the icon may be displayed in color that can easily be recognized by the user. In other words, if the remaining memory capacity corresponds to half of the total memory capacity, the icon is displayed as illustrated in FIG. 21 (2101). If the remaining memory capacity is small, the icon is displayed in darker color as illustrated in FIG. 22 (2201).

Also, if the remaining memory capacity is too small, the icon may be flickered to assist recognition of the user.

In addition to the memory use, if user fee is overcharged due to use of contents or applications in the display apparatus, or if overload is predicted due to increase of data processed by a processor of the display apparatus, the icon may be displayed variably in color, which can easily be recognized by the user, as the user fee is increased or the data are increased.

Figure 23:
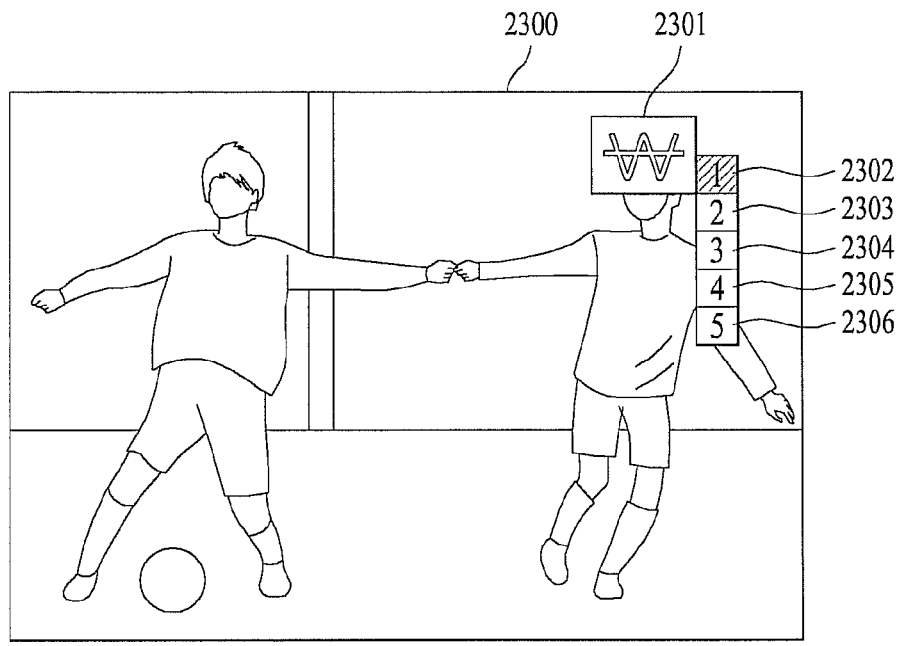
FIGS. 23 and 24 show examples of display screens that include a transparency setup menu for controlling display of a menu item for a monitoring menu.
Figure 24:
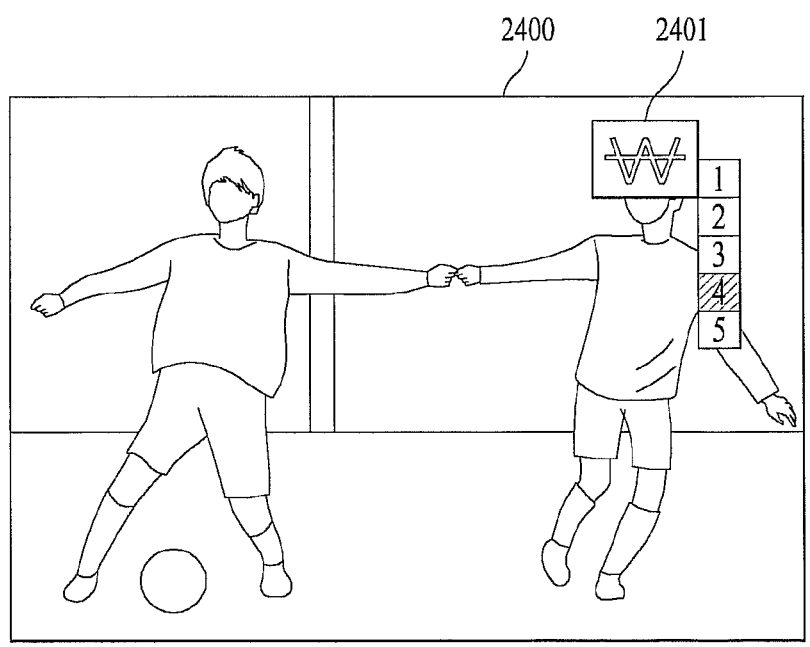

FIGS. 23 and 24 show examples of display screens that include a transparency setup menu for controlling display of a menu item for a monitoring menu. Transparency of the icon can be varied depending on user setup or the screen currently displayed in a display module of the display apparatus. For example, if the user calls a menu for controlling transparency of the icon through hot-key input of the remote controller or selection of a predetermined menu item, a transparency control menu can be displayed as illustrated in FIG. 23 and FIG. 24.

The transparency control menu may include respective number menu items 2302, 2303, 2304 and 2305 representing transparency. If the user selects a predetermined number, the transparency control menu is set in such a manner that the icon is displayed with transparency corresponding to the selected number.

In other words, for example, if the user selects a number '1' 2302 from the transparency control menu, the icon may be displayed in opaque color as illustrated in FIG. 23 (2301), or if the user selects a number '4' (2305), the icon may be displayed in clearer color than that of FIG. 23, as illustrated in FIG. 24 (2401), whereby the user can identify the display screen overlapped with the icon.

Also, the display apparatus may control transparency of the icon variably depending on the screen displayed in its display module without displaying the transparency control menu.

In other words, for example, if caption of contents currently in service in the display apparatus is displayed on a zone where the icon is located, the icon may be displayed with high transparency. If such contents are not displayed on the zone where the icon is located, the icon may be displayed with low transparency.

Furthermore, as described with reference to FIG. 21 and FIG. 22, if the remaining memory capacity of the display apparatus becomes small and user fees are overcharged, transparency of the icon may be lowered, whereby the user can easily recognize the icon.

Figure 25:
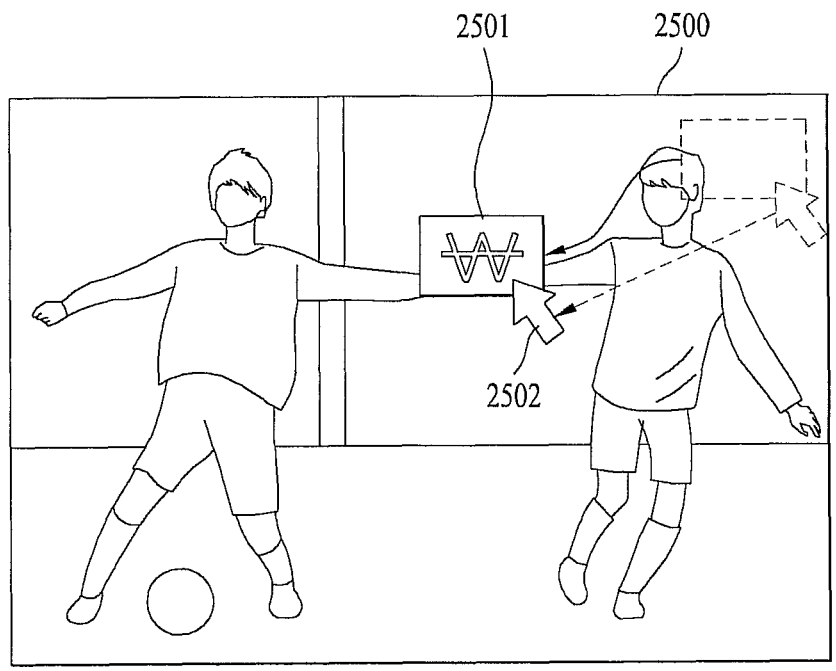
FIG. 25 shows an example of a display screen which allows a position of a menu item to be changed.

FIG. 25 shows an example of a display screen which allows a position of a menu item to be changed. According to one embodiment, the user can move a menu item 2501 for enabling the monitoring menu through the user input device.

For example, the user can move the position of the menu item through a drag and drop action of a pointer 2502. In other words, after clicking the menu item through the pointer 2502, the user can move the pointer to a desired position through a drag action and fix the menu item to the desired position through a drop action.

Also, unlike shown, the user can set a mode for moving the menu item through a predetermined menu item or hot-key input, and can move the menu item to a desired position through a directional key.

As a result, since the user can locate the menu item to the desired position, the user can conveniently use predetermined contents through the display apparatus even in a state that the menu item is displayed.

Figure 26:
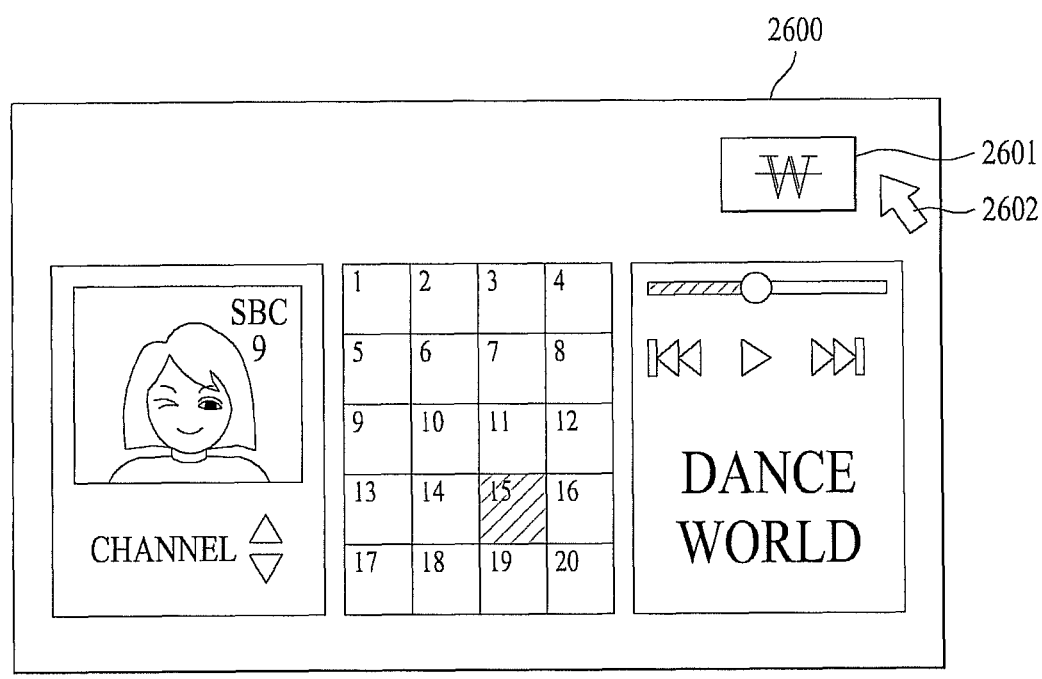
FIG. 26 shows an example of a display screen that includes a menu item for enabling a monitoring menu on a home screen of a smart TV system.

FIG. 26 shows an example of a display screen that includes a menu item for enabling a monitoring menu on a home screen of a smart TV system. The home screen of the smart TV is displayed to use functions of the smart TV, and a menu item 2601 for enabling the monitoring menu is displayed in the form of icon. The home screen of the smart TV will be described later in detail with reference to FIG. 34.

Also, one or more applications can be executed in the display apparatus, and a menu item 2601 for enabling the monitoring menu can be displayed with the screen for the applications.

The menu item can be displayed in the form of icon that includes text or image. Also, a pointer 2602 can be moved through various input means such as a remote controller to input a selection signal of the menu item for enabling the monitoring menu.

Figure 27:
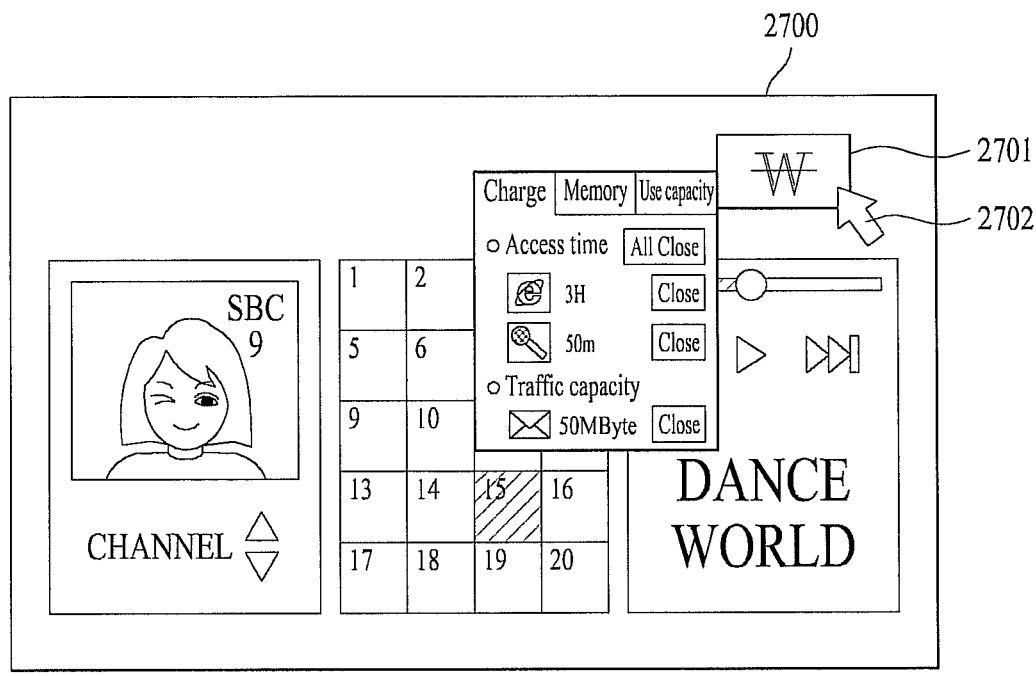
FIG. 27 shows an example of a screen that includes a monitoring menu displayed on a home screen of a smart TV system.

FIG. 27 shows an example of a screen that includes a monitoring menu displayed on a home screen of a smart TV system. If a selection signal of the menu item 2701 for enabling the monitoring menu is input on the display screen of FIG. 26, a monitoring menu 2703 is displayed.

The monitoring menu 2703 includes billing information, memory use information and information on the number of use times, which will be described later in detail with reference to FIG. 30 to FIG. 32.

The monitoring menu 2703 can be displayed on a predetermined zone of the display screen currently used by the user in the form of window as shown.

According to one embodiment, the monitoring menu 2703 may be displayed on the entire screen to enhance readability unlike shown in FIG. 27. Moreover, the monitoring menu 2703 can be displayed in opaque color so as not to disturb use of application or content used before the signal for enabling the monitoring menu is input.

The user can end execution of a predetermined application by selecting an application end menu item from the monitoring menu, and can select the application item to move to the execution screen of the selected application. The selected item will be described with reference to FIG. 30 to FIG. 32.

Figure 28:
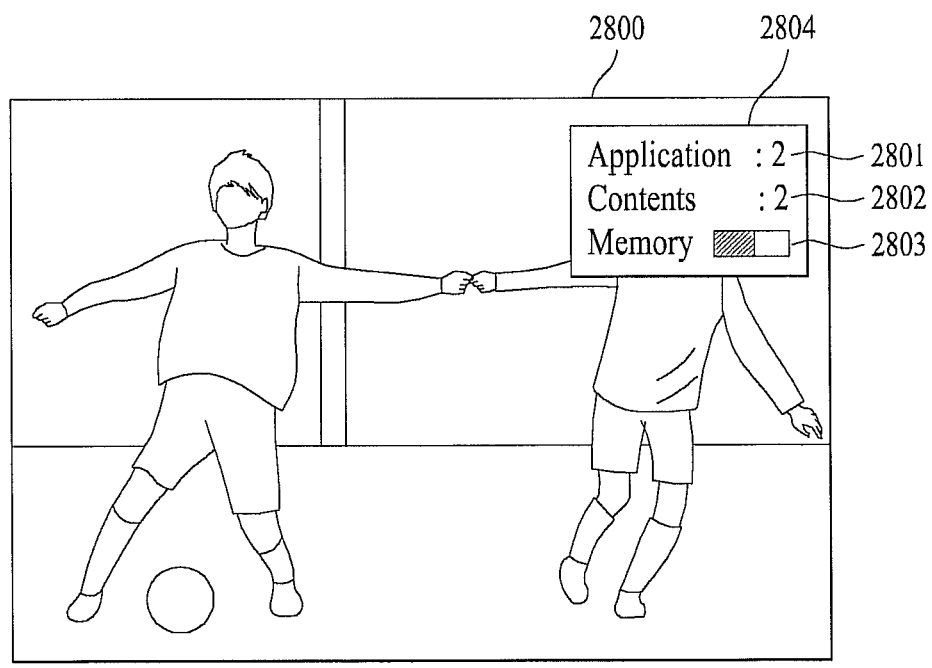
FIGS. 28 and 29 show additional examples of display screens that include monitoring menus.
Figure 29:
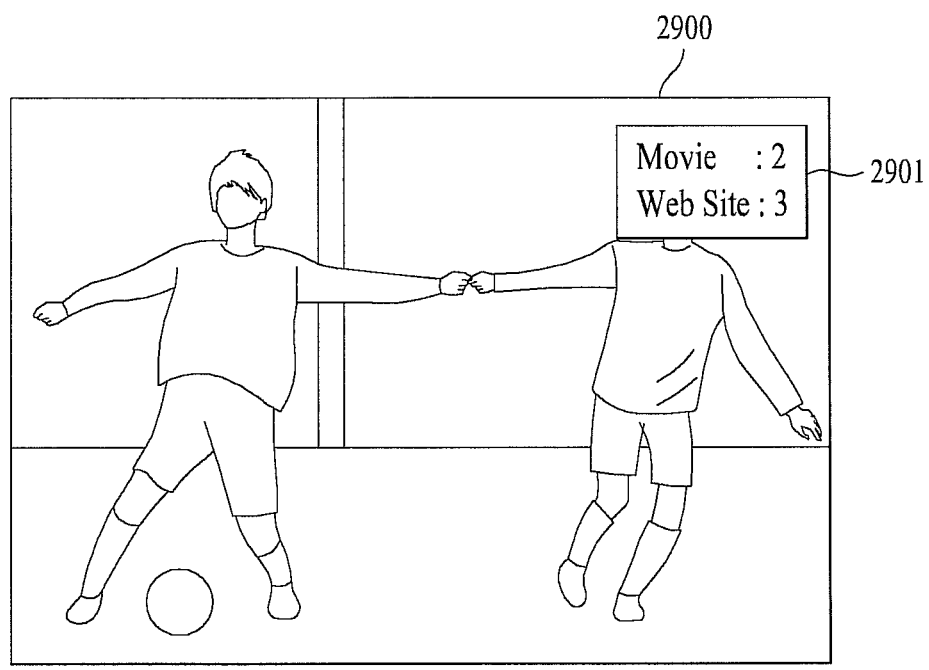

FIGS. 28 and 29 show additional examples of display screens that include monitoring menus. As shown, a monitoring menu 2804 indicates execution information of application or content currently in service in the display apparatus can be displayed by miniaturization so as not to disturb the screen of another application or content displayed in the display apparatus.

In other words, as illustrated in FIG. 28, the number 2801 of applications currently in service in the display apparatus, the number 2802 of contents currently in service, and graph or number 2803 on memory use information of the display apparatus can be displayed on a predetermined zone of the display screen.

According to one embodiment, items included in the monitoring menu can be edited. In other words, as illustrated in FIG. 29 (2901), the monitoring menu can be set to include name of contents or applications currently in service.

Also, like the menu item for enabling the monitoring menu, transparency or color of the monitoring menu can be varied. In this case, even though the user uses predetermined contents or applications of the display apparatus, the user can easily identify execution information of the applications or contents through the miniaturized monitoring menu.

Figure 30:
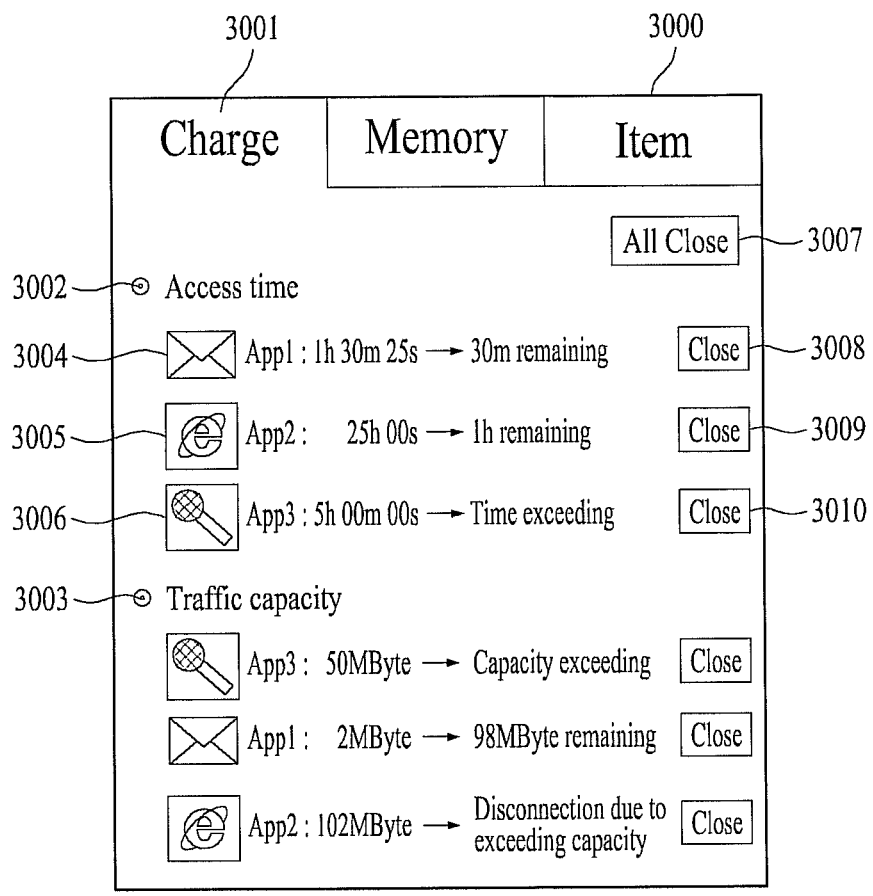
FIG. 30 shows an example of a display screen that includes a monitoring menu containing billing information.

FIG. 30 shows an example of a display screen that includes a monitoring menu containing billing information. The monitoring menu can include a tab 3001 for displaying billing information. If the tab for displaying the billing information is selected, it can include reference information for billing such as access time and traffic capacity.

Referring to FIG. 30, if fee is calculated depending on access time (3002), the tab can include a list of applications or contents currently in service, information 3004, 3005 and 3006 on use time and remaining free of charge time, so as to identify billing information.

Also, if fee is calculated depending on traffic capacity (3003), the tab can include a list of applications or contents currently in service, information on used traffic capacity and remaining free of charge traffic capacity.

According to one embodiment, the display apparatus can display the list of applications and contents, which include name and icon of the applications and contents. Also, the tab can include end menu items for each of applications and contents 3008, 3009 and 3010, and can include an end menu item 3007 for ending all of the applications and contents currently in service.

Also, the access time information or the traffic capacity information can be displayed in the form of number of graph.

If the access time or the traffic capacity exceeds a predetermined value, the color of the applications and contents can be varied to another color, whereby the user can easily recognize the applications and contents.

Also, if fee is calculated depending on another reference unlike shown, a tab for displaying the billing information together with reference information for billing can be displayed.

Also, the user can select name or icon of the applications and contents included in the list of applications or contents from the monitoring menu and switch the current screen to the execution screen of the selected applications and contents, as described later in detail with reference to FIG. 44.

In this case, the user can easily identify the billing information so that user fees may not be overcharged.

Figure 31:
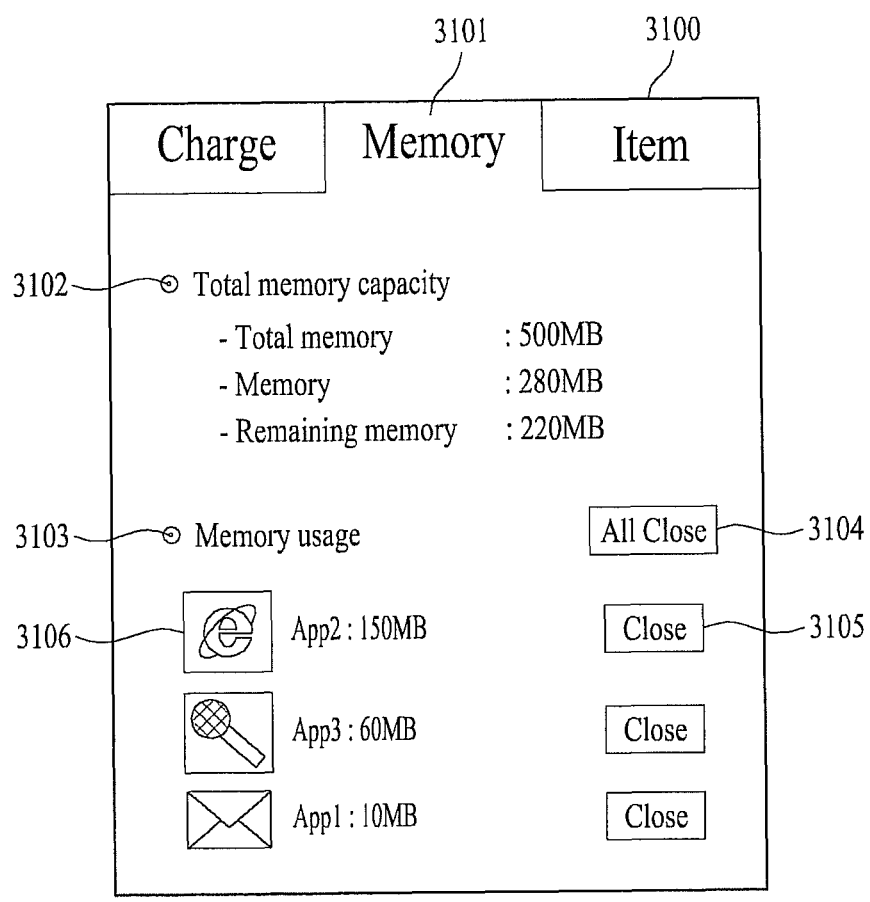
FIG. 31 shows an example of a display screen that includes a monitoring menu containing memory use information.

FIG. 31 shows an example of a display screen that includes a monitoring menu containing memory use information. The monitoring menu can include a tab 3101 for displaying memory information. If the tab for displaying the memory information is selected, the user can identify total memory capacity 3102 of the display apparatus and memory occupancy information 3103 of each of applications and contents.

According to one embodiment, the total memory capacity 3102 can include information on total memory capacity of the display apparatus, memory capacity currently in service, and remaining memory capacity.

In this case, since the user can identify redundancy capacity of the memory, the user can prevent forcible end or data loss from occurring in executing the applications and contents. Also, the memory occupancy information 3103 of each of the applications and contents can include a list of applications and contents currently in service, and information on memory capacity used by each of the applications and contents 3106.

According to one embodiment, the display apparatus can display the list of applications and contents, which includes name and icon of the applications and contents. Moreover, the display apparatus can display the list of applications and contents in the order of applications and contents having larger memory usage.

Also, the display apparatus can include information on memory capacity used by each of the applications and contents, and can display the used memory capacity in the form of number or graph.

Also, the display apparatus can include an end menu item 3105 for ending applications and contents for each of applications and contents, and can include an end menu item 3104 for ending all of the applications and contents currently in service.

Also, the user can select name or icon of the applications and contents included in the list of applications or contents from the monitoring menu and switch the current screen to the execution screen of the selected applications and contents, as described later in detail with reference to FIG. 44.

In this case, the user can decide to end what application and contents to efficiently manage the memory by referring to the information on remaining memory capacity in the total memory capacity.

Figure 32:
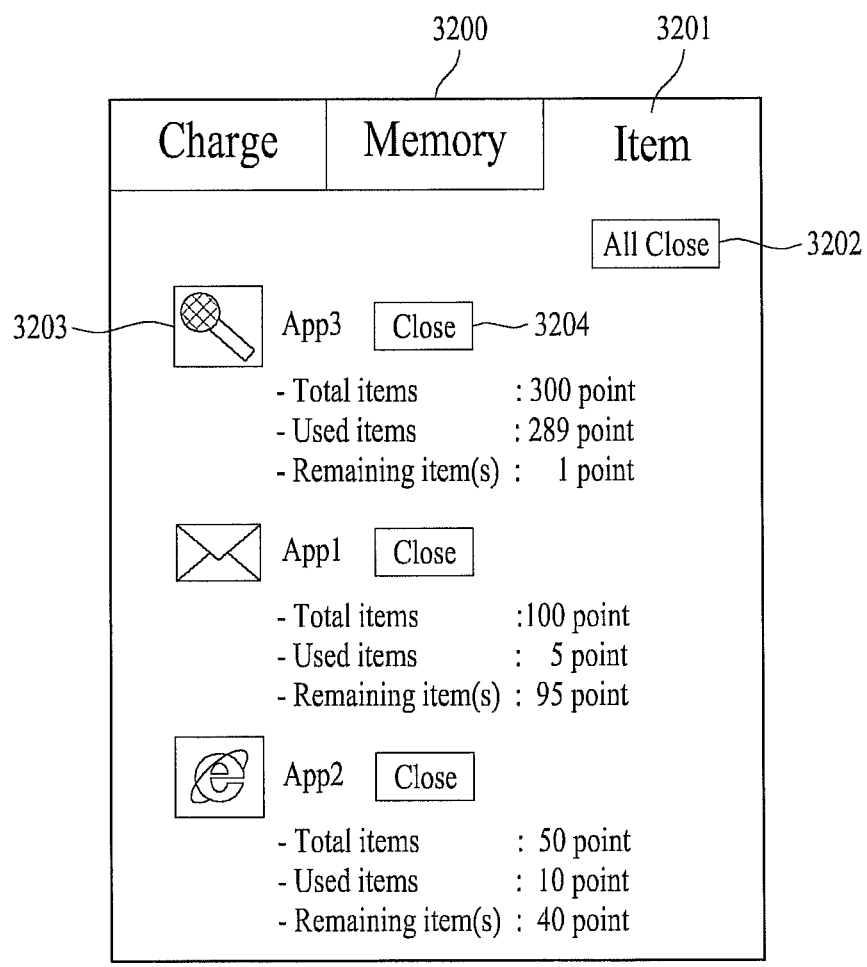
FIG. 32 shows an example of a display screen that includes a monitoring menu containing billing information.

FIG. 32 shows an example of a display screen that includes a monitoring menu containing billing information. The monitoring menu can include a tab 3201 for displaying Item information. The tab for displaying Item information can display the Item information together with information that can identify use item of each of applications and contents 3203.

According to one embodiment, if use of items is limited to a predetermined number of items as shown, the display apparatus can include a list of applications and contents, the number of total items, the number of used items, and the number of remaining items. The information on the number of items can be displayed in the form of number or graph.

According to one embodiment, the display apparatus can display the list of applications and contents together with name and icon of the applications, and can include an end menu item 3204 for ending applications and contents for each of applications and contents and an end menu item 3202 for ending all of the applications and contents currently in service.

Also, if the remaining items are reduced to reach a predetermined number of items or less, the display apparatus can display the color of applications and contents in another color, whereby the user can easily recognize the color of the applications and contents.

Also, unlike shown, if a use limit reference is another reference not item, such as a predetermined point or coin, the display apparatus can display the corresponding information together with information on the use limit reference.

Also, the user can select name or icon of the applications and contents included in the list of applications or contents from the monitoring menu and switch the current screen to the execution screen of the selected applications and contents, as described later in detail with reference to FIG. 44.

Figure 33:
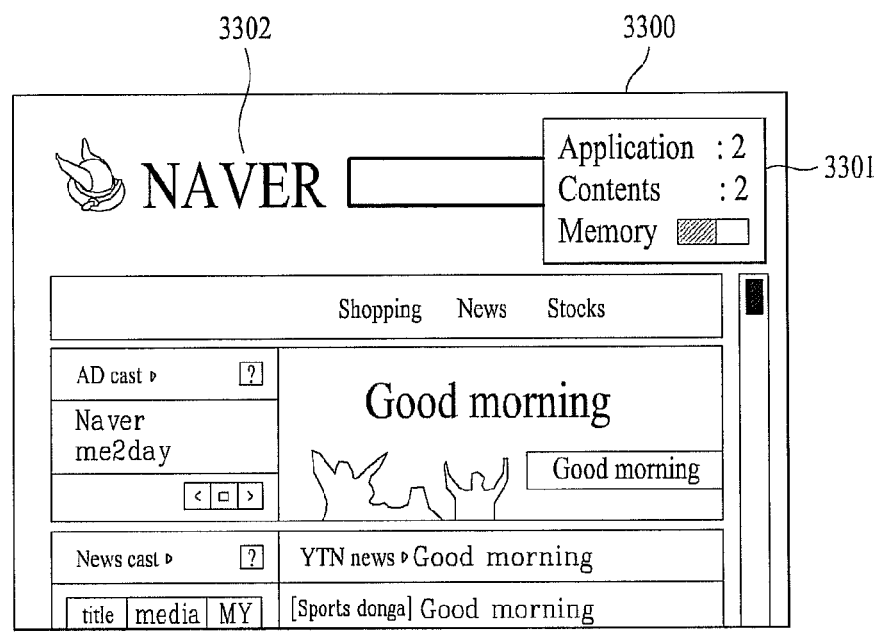
FIG. 33 shows an example of a display screen that includes a monitoring menu containing an application execution screen.

FIG. 33 shows an example of a display screen that includes a monitoring menu containing an application execution screen. In this embodiment, a selection signal of name or icon of the applications or contents included in the monitoring menu of FIG. 27 to FIG. 32 is input from the monitoring menu, whereby the current screen can be switched to a use screen 3302 of the applications or contents.

In other words, if the user selects name or icon of application, which can use a web site, from the monitoring menu through the user input device, the screen for using the selected application can be displayed as illustrated in FIG. 33.

Also, the switched screen can continue to provide execution information to the user by miniaturizing the monitoring menu 3301.

In this case, the user can easily switch to the execution screen of the applications or contents from the monitoring menu, and can exactly select application and contents for ending by identifying the status of the applications or contents displayed by name or icon only, in detail, from the monitoring menu.

Figure 44:
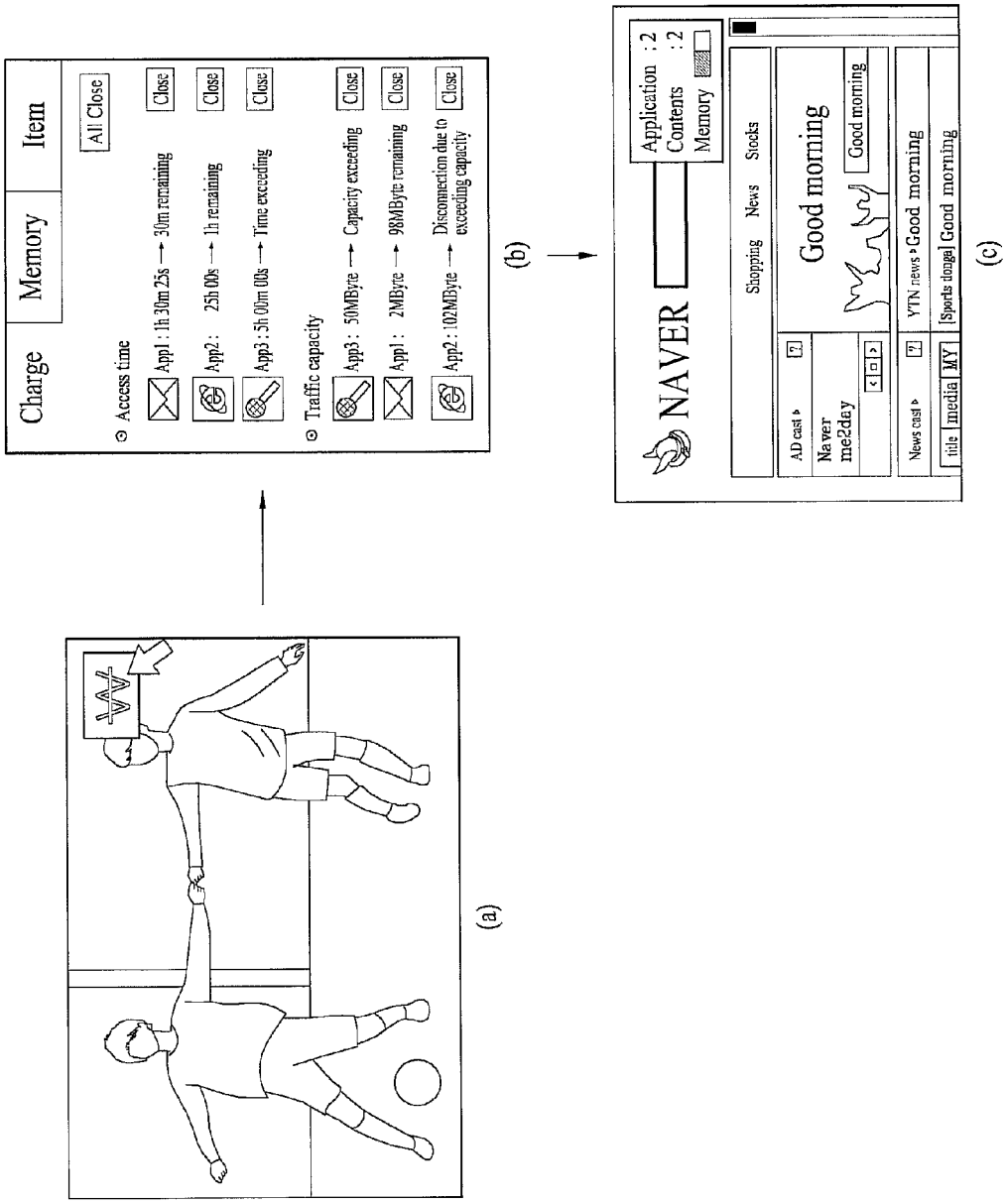
FIG. 44 shows one way in which screen switching of a display apparatus may be performed.

FIG. 44 shows one way in which screen switching of a display apparatus may be performed. As illustrated in FIG. 44(*a*), if predetermined contents or applications are displayed from the display apparatus, the menu item for enabling the monitoring menu can be displayed on a predetermined zone of the display module of the display apparatus.

Also, in the display screen illustrated in FIG. 44(*a*), if a selection signal of the menu item is received from the user, the display apparatus can display the screen illustrated in FIG. 44(*b*) to display the monitoring menu in detail.

Also, in the display screen illustrated in FIG. 44(*b*), if the user inputs a selection signal of name or icon of predetermined contents or applications included in the monitoring menu, the display apparatus can display the display screen of the selected applications or contents as illustrated in FIG. 44(*c*) to allow the user to use the selected applications or contents.

In other words, since the user can easily identify execution information on each of the applications or contents on the display screen, the user can control the execution condition of the display apparatus more easily.

FIGS. 34 to 39 show examples of home screens that may be used to execute various functions of a smart TV system. The home screen(s) can include cards 3401, 3402, 3403 and 3404 related to applications or contents that can be used in the smart TV, and a launcher bar 3405 that includes icons 3406, 3407 and 3408 of the applications or contents. The launcher bar 3405 may be located above the cards as shown, or may be located below the cards or at the left or right of the cards.

Also, a predetermined icon included in the launcher bar can be displayed as image that can predict name or action of the applications.

Also, if a selection signal of the icon is received from the user, the cards 3401, 3402, 3403 and 3404 can be displayed to include predetermined information on applications or contents corresponding to the selected icon. Also, if a selection signal of any one of the cards is input from the user, the application corresponding to the selected card can be executed as the entire screen.

Figure 34:
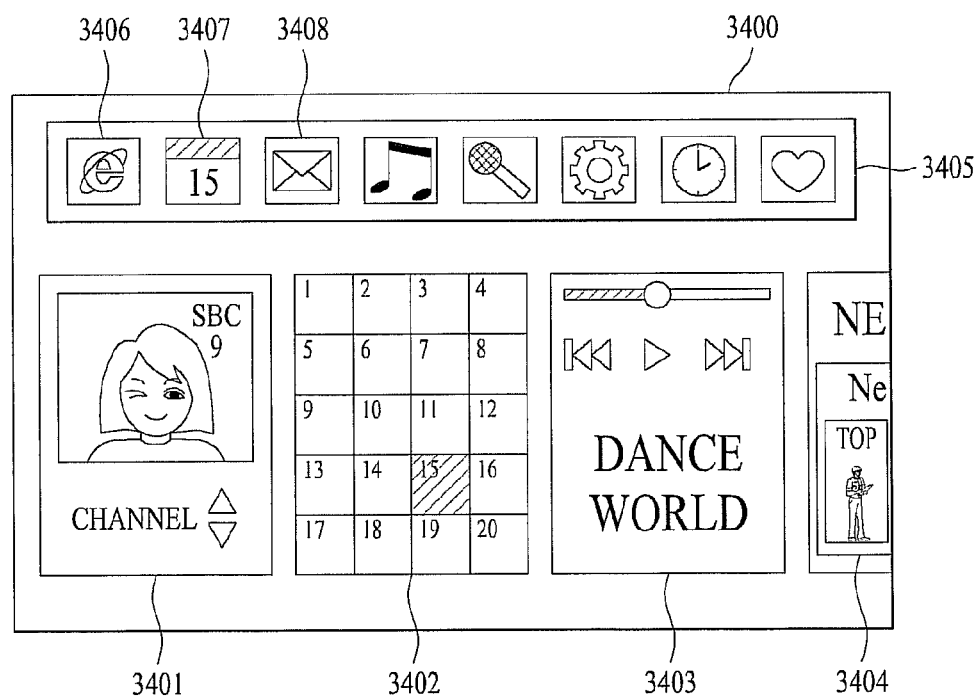
FIGS. 34 to 39 show examples of home screens that may be used to execute various functions of a smart TV system.

Referring to FIG. 34, it is noted from the card 3401 that terrestrial broadcast contents are displayed. Also, it is noted that the card 3402 is related to calendar application that enables schedule management. It is noted that the card 3403 is related to application that can play music through the display apparatus. In other words, the user can identify and execute the applications of the smart TV through the icon or the cards.

Furthermore, the card 3404 can allow information on the applications or contents of the smart TV, which is not displayed on the home screen, to be displayed, whereby the user can predict the contents or applications of the smart TV through the information. For example, as illustrated in FIG. 34, a part of the card 3404 is displayed at the right end of the display screen, whereby the user can identify information on the application or contents corresponding to the card existing at the right part of the display screen.

Figure 36:
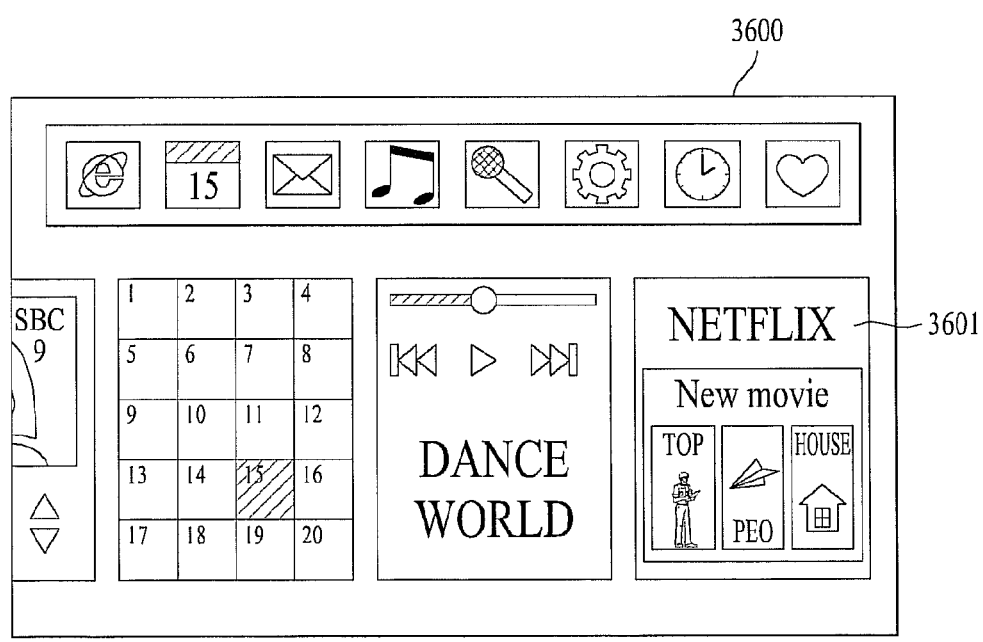

In other words, if the user scrolls the cards to the right side through the user interface module in a state that the home screen 3400 of FIG. 34 is displayed, although a home screen 3600 of FIG. 36 is displayed, even before the user directly performs the above scroll operation, the card 3404 of the application 'NETFLIX' is partially displayed at the right part on the home screen of FIG. 34. Accordingly, the user can predict that the entire card 3601 of the application 'NETFLIX' is displayed if the user scrolls the cards to the right side.

Figure 35:
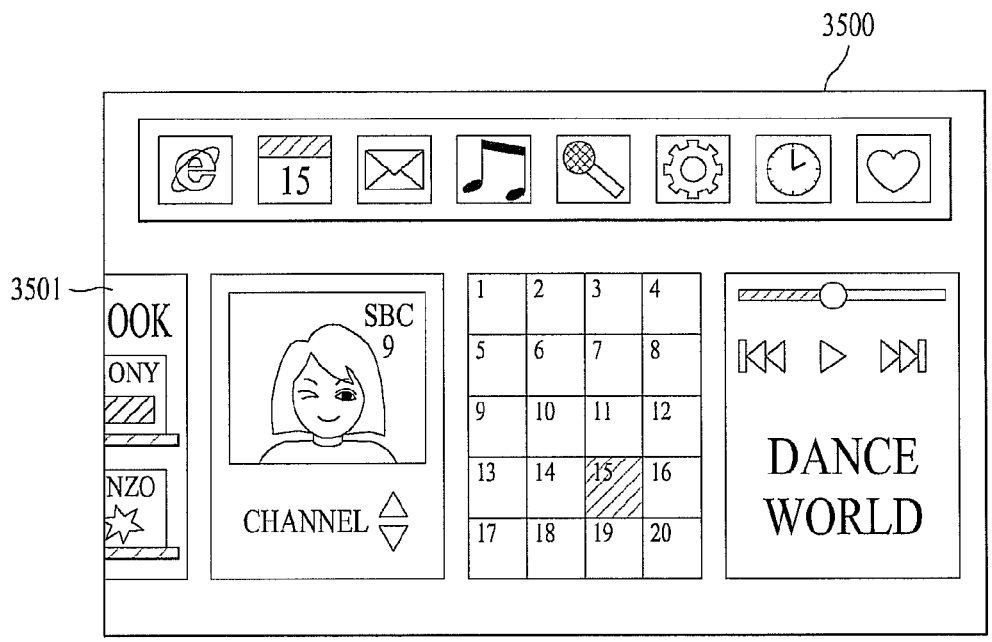
Figure 37:
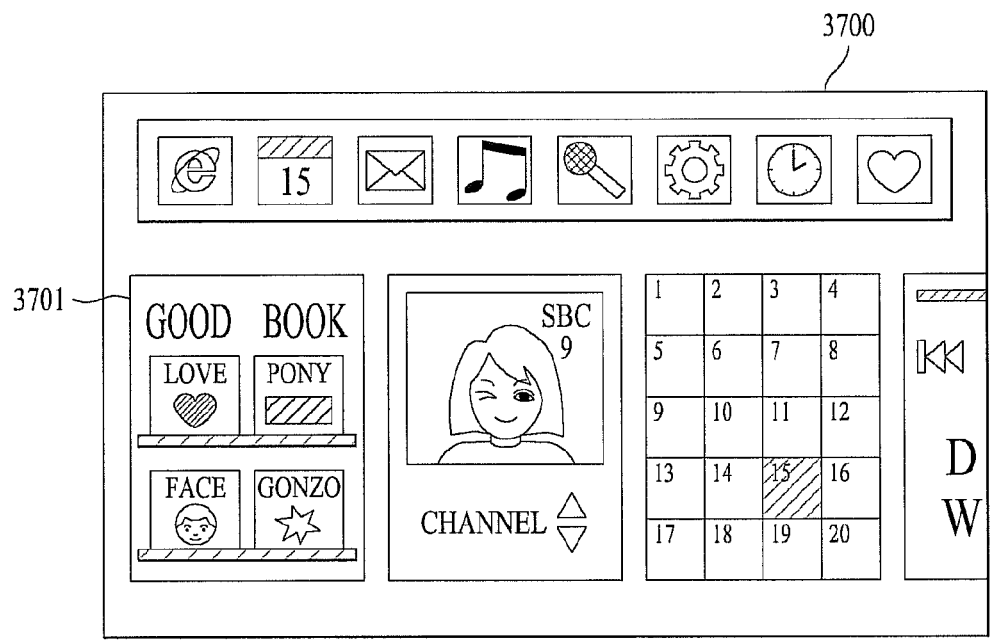
Figure 38:
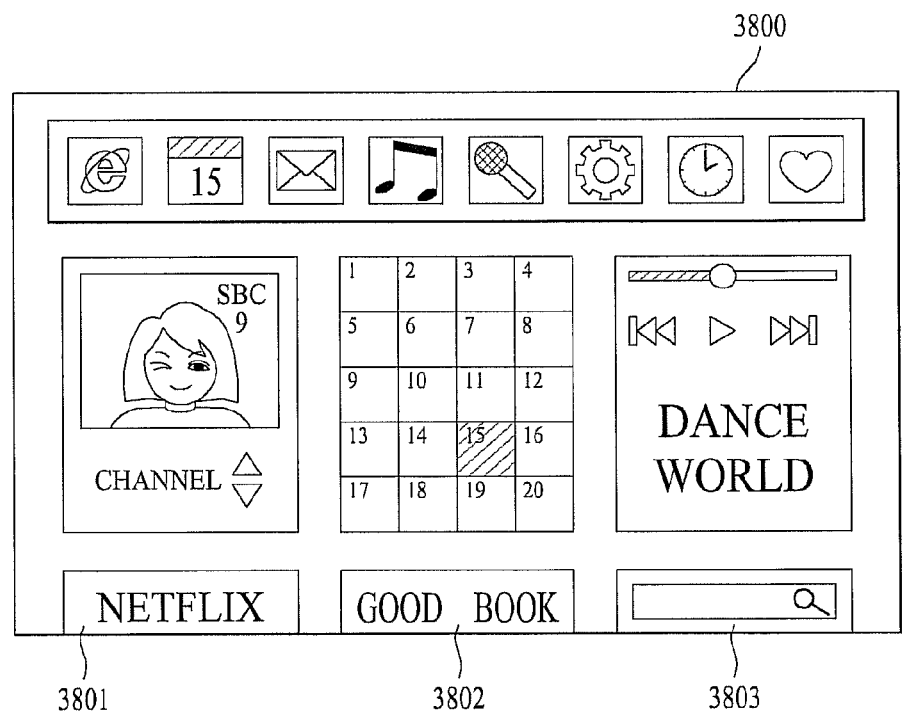
Figure 39:
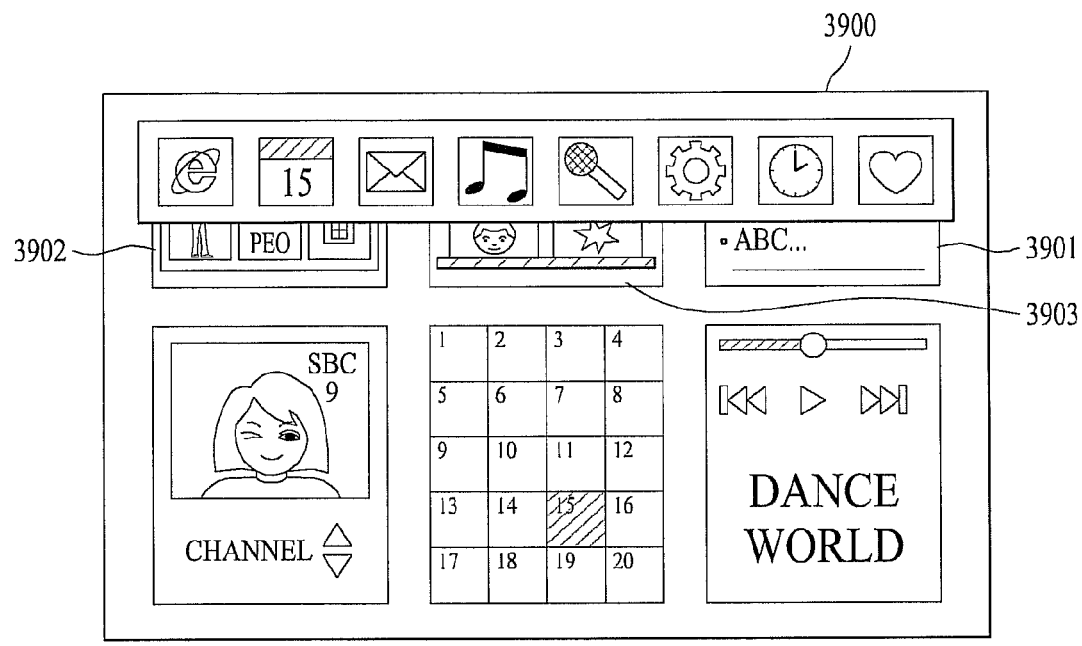

Also, a part 3501 of the card is displayed at the left side as illustrated in the home screen 3500 of FIG. 35, whereby the user can predict an application card 3701 of a home screen 3700 of FIG. 37.

Also, in addition to the left side or right side, a part of widgets card is displayed at upper sides 3901, 3902 and 3903 or lower sides 3801, 3802 and 3803 of the card, whereby the user can predict the corresponding application card by scrolling the card to the upper side or lower side on the home screen.

Also, unlike shown in FIG. 34 to FIG. 39, a part of each of the cards is displayed at the upper side, lower side, right side and left side at the same time, whereby the user can predict what card will be displayed if the user scrolls the cards to the upper side, lower side, right side and left side.

FIGS. 40 to 43 show additional examples of home screens that may be used to execute various functions of a smart TV system. In the same manner as FIG. 34 to FIG. 39, after a part of the icons displayed on the home screen is displayed, if the user scrolls the icon list, the user can predict what icon will be displayed.

The icon can be displayed as image data that can predict name or action of the application, not text. Accordingly, even though a part of the icon is displayed, the user can predict the application corresponding to the icon.

Figure 40:
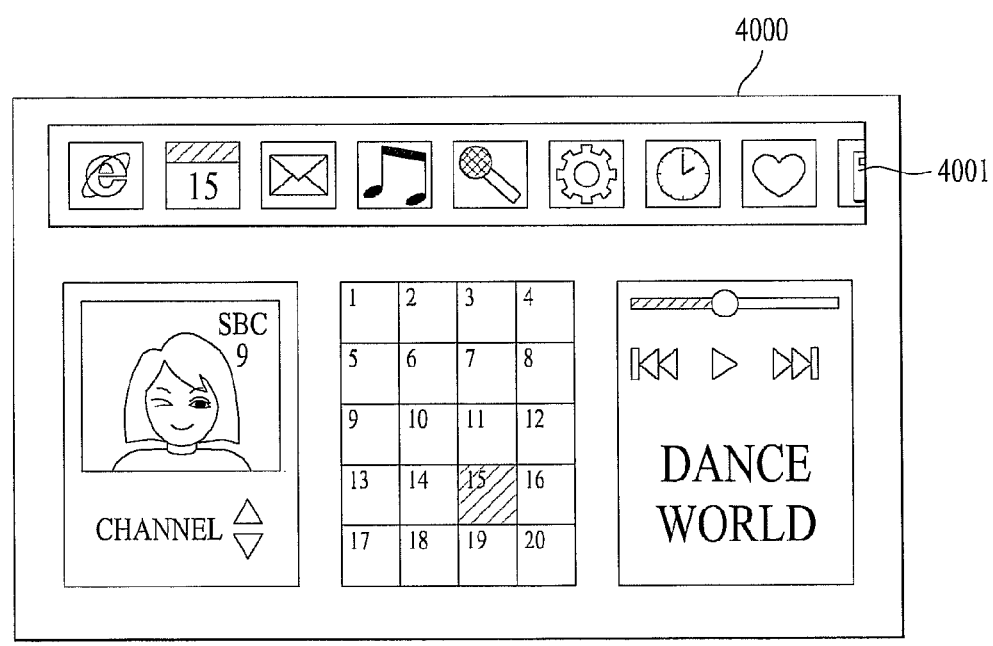
FIGS. 40 to 43 show additional examples of home screens that may be used to execute various functions of a smart TV system.

In other words, if a home screen 4000 is displayed as illustrated in FIG. 40, a part 4001 of the icon is displayed at the right side of the icon list, whereby the user can predict the corresponding icon by scrolling the icon list to the right side.

Figure 41:
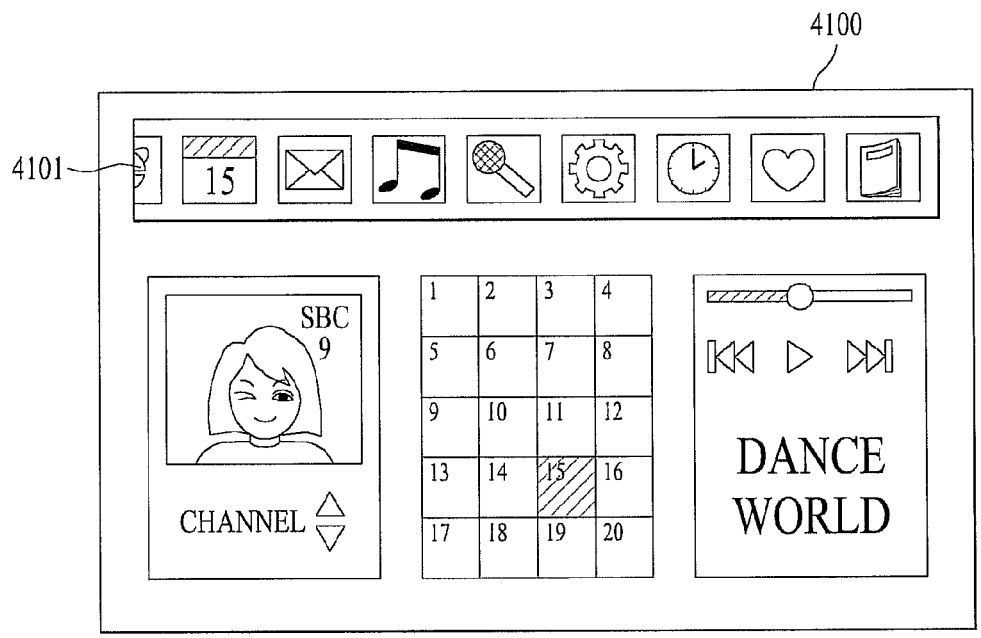
Figure 42:
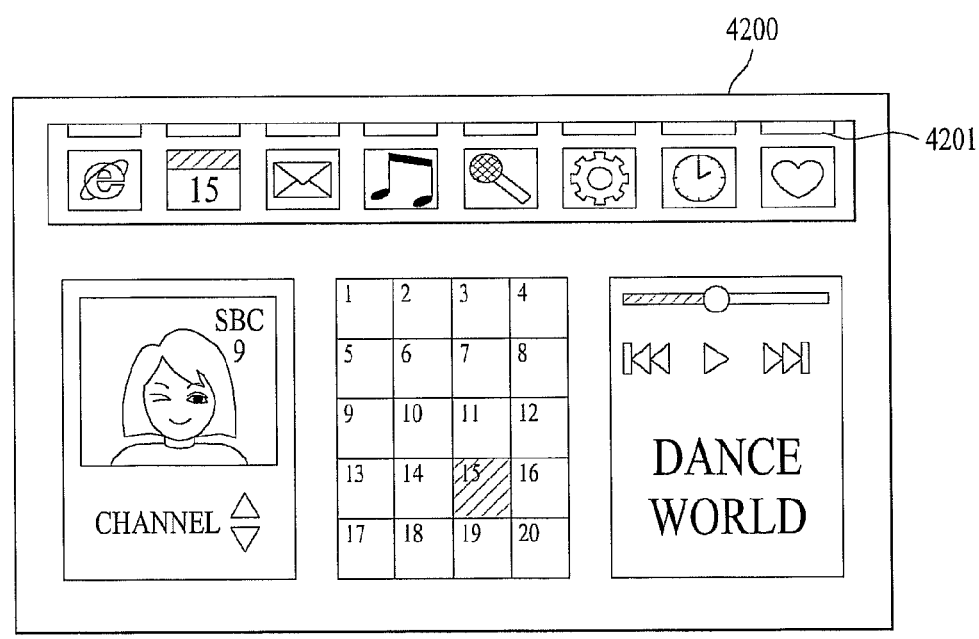
Figure 43:
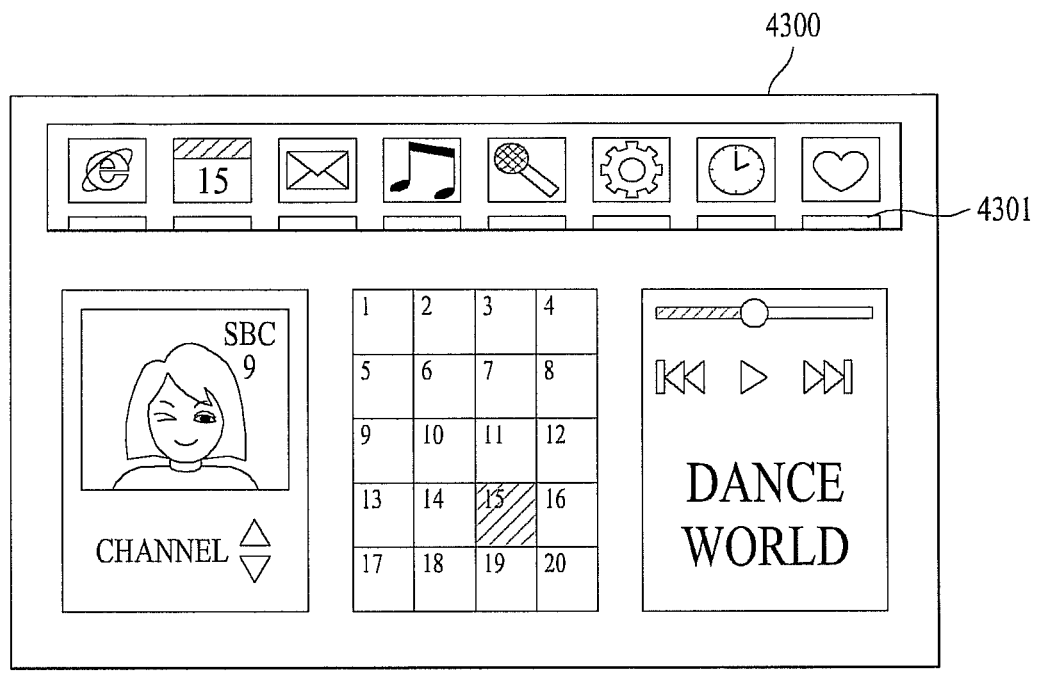

Also, if a home screen 4100 is displayed as illustrated in FIG. 41, the user can predict the corresponding icon by scrolling the icon list to the left side. If a home screen 4200 is displayed as illustrated in FIG. 42, the user can predict the corresponding icon by scrolling the icon list to the upper side. If a home screen 4300 is displayed as illustrated in FIG. 43, the user can predict the corresponding icon by scrolling the icon list to the lower side. In this way, the user can predict the corresponding icons through partial icons 4101, 4102 and 4103 displayed on each home screen.

Also, unlike shown in FIG. 40 to FIG. 43, a part of each icon may be displayed at the upper side, lower side, left side and right side at the same time like FIG. 34 to FIG. 39.

Accordingly, the user can predict the corresponding icon located at the scroll position before directly scrolling the icon list, whereby convenience in use of the display apparatus can be improved.

As described above, the network TV for processing data for a monitoring service according to one embodiment includes a broadcast interface receiving broadcast data through a broadcast network, wherein the broadcast data include audio data and video data, a demultiplexer demultiplexing the audio data and the video data of the received broadcast data, an audio decoder decoding the demultiplexed audio data, a video decoder decoding the demultiplexed video data, an Internet interface receiving at least one or more contents through an Internet network, a first controller controlling the received contents to be executed in a background type, a collector collecting state information on the at least one or more contents executed in the background type, a generator generating a monitoring indicator corresponding to the collected state information, a second controller controlling the display module to display the decoded video data in a first zone of the network TV and display the generated monitoring indicator in a second zone of the network TV, and a speaker outputting the decoded audio data.

The network TV according to one embodiment can be designed by considering the modules illustrated in FIG. 2 or FIG. 5. Hereinafter, the network TV will be described in more detail with reference to FIG. 2 or FIG. 5. However, it is to be understood that modules other than those illustrated in FIG. 2 or FIG. 5 may be included.

The broadcast interface corresponds to the reference numeral 101 of FIG. 2 or the reference numeral 701 of FIG. 5. The demultiplexer corresponds to the reference numeral 705 of FIG. 5, the audio decoder corresponds to the reference numeral 706 of FIG. 5, and the video decoder corresponds to the reference numeral 707 of FIG. 5. Moreover, the demultiplexer, the audio decoder, and the video decoder can be designed in such a manner that their functions are performed by the broadcast data processor 111 of FIG. 2.

The Internet interface corresponds to the reference numeral 108 of FIG. 2 or the reference numeral 701 of FIG. 5. The first controller, the collector, the generator, the second controller are designed in such a manner that their functions are performed by the second runtime module 109 of FIG. 2 or the service manager 713 of FIG. 5. In the mean time, the display module and the speaker correspond to the reference numeral 708 of FIG. 5.

Also, the monitoring indicator, for example, corresponds to the reference numeral 2001 of FIG. 20, the reference numeral 1201 of FIG. 21, the reference numeral 2201 of FIG. 22, the reference numeral 2301 of FIG. 23, the reference numeral 2401 of FIG. 24, the reference numeral 2501 of FIG. 25, the reference numeral 2601 of FIG. 26, etc. Moreover, the state information of the content includes at least one or more of information illustrated in FIG. 30 to FIG. 32.

According to another embodiment, if the displayed monitoring indicator is selected, the second controller displays the collected state information (for example, the state information includes current state information for each content). If the a specific content is selected from the displayed state information, the second controller stops execution of the background for the specific content, stops display of the decoded video data, and displays the specific content in the first zone of the network TV.

According to still another embodiment, the second controller is designed to determine whether the collected state information corresponds to what level of a plurality of levels and to display the generated monitoring indicator in the second zone of the network TV differentially depending on the level of the collected state information.

Moreover, the network TV according to still another embodiment is designed to further include a user interface that receives a signal for selecting a level of transparency of the monitoring indicator, and the second controller displays the generated monitoring indicator in the second zone of the network TV based on the selected level of transparency.

Also, the monitoring indicator according to still another embodiment is designed to include at least one or more of a first tab displaying the memory use state caused by at least one or more contents currently in service as the background, a second tab displaying an item use state caused by at least one or more contents currently in service as the background, and a third tab displaying a use state of a charged content of at least one or more contents currently in service as the background.

Also, according to still another embodiment, the second controller is designed to determine whether the collected state information corresponds to a warning range and to display the generated monitoring indicator in the second zone of the network TV only if the collected state information corresponds to the warning range. This second controller will be described in more detail with reference to FIG. 45.

The network TV according to still another embodiment further includes a user interface that receives a signal for selecting a reference category for automatic forcible end, and the second controller is designed to first and forcibly end a specific content currently in service as the background based on the selected reference category if the collected state information corresponds to a danger range. The reference category corresponds to memory use capacity or initial access time, for example. This will be described in more detail with reference to FIG. 49 to FIG. 51.

In the mean time, the content used in this specification includes at least one or more of application and web page. As the case may be, the content may further include other data that can be ordinarily defined by those skilled in the art.

FIG. 45 shows one embodiment of a procedure for automatically enabling a monitoring menu. If the aforementioned monitoring indicator is always enabled, it may be a little interference on a general broadcast screen of the user. Accordingly, in order to solve this problem, as illustrated in (a) of FIG. 45, the network TV 4500 according to one embodiment maintains a zone 4501 where the monitoring indicator is displayed, at off state.

However, a network TV 4550 is designed in such a manner that a monitoring indicator 4551 is automatically enabled as illustrated in FIG. 45(*b*) only if a specific event occurs while the collector is collecting the state information on the content currently in service as the background. Moreover, the specific event means that the use time of the charged content remains about 30 minutes or error may occur in general broadcasting of the network TV due to excessive memory capacity of the content operated as the background.

Accordingly, the network TV according to the embodiment is advantageous in that the user can receive only a danger state on the content such as application while viewing a general broadcast screen.

Figure 46:
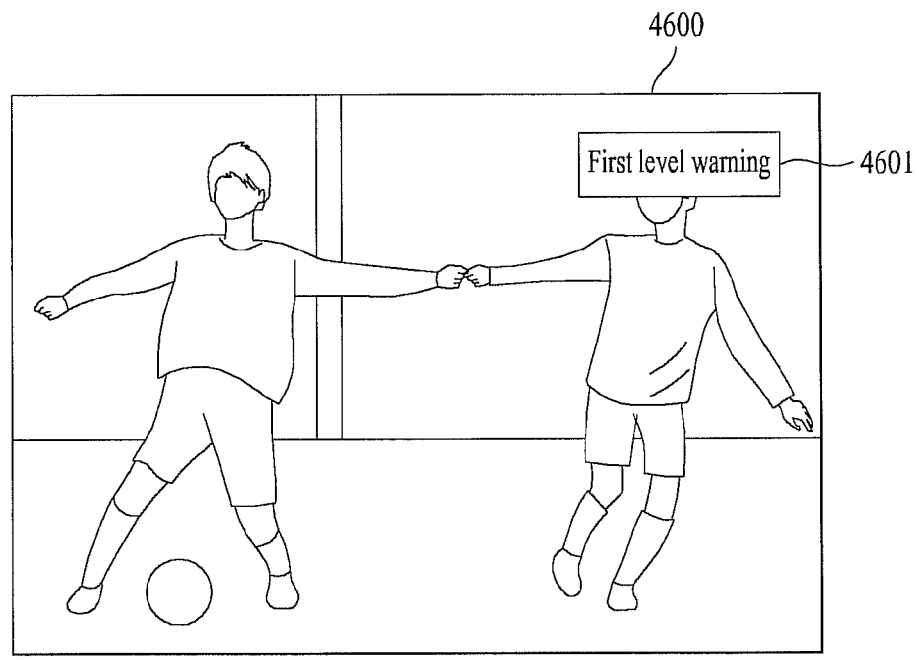
FIG. 46 shows an example of the first level of a monitoring menu.
Figure 47:
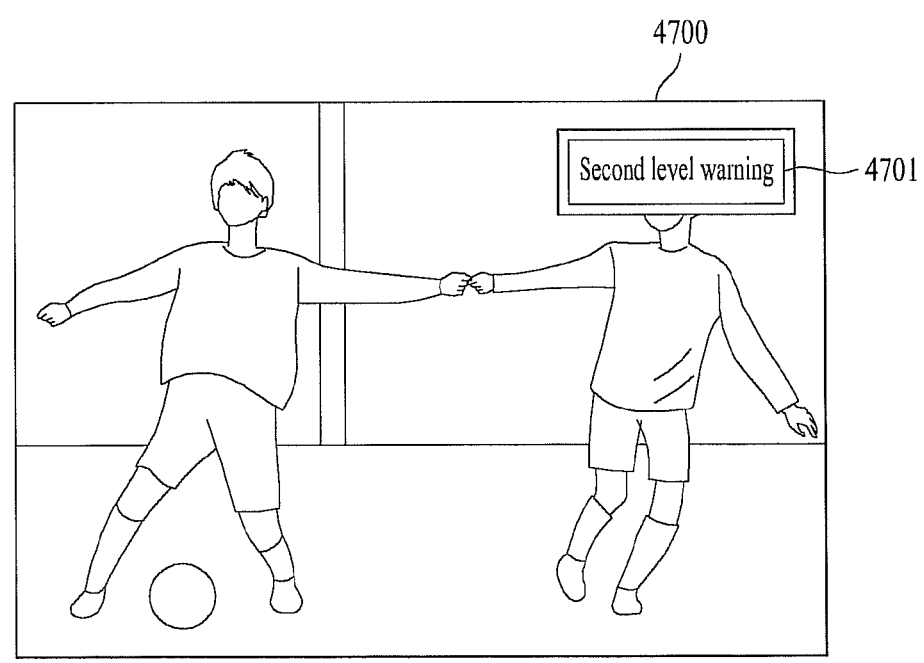
FIG. 47 shows an example of a second level of the monitoring menu.
Figure 48:
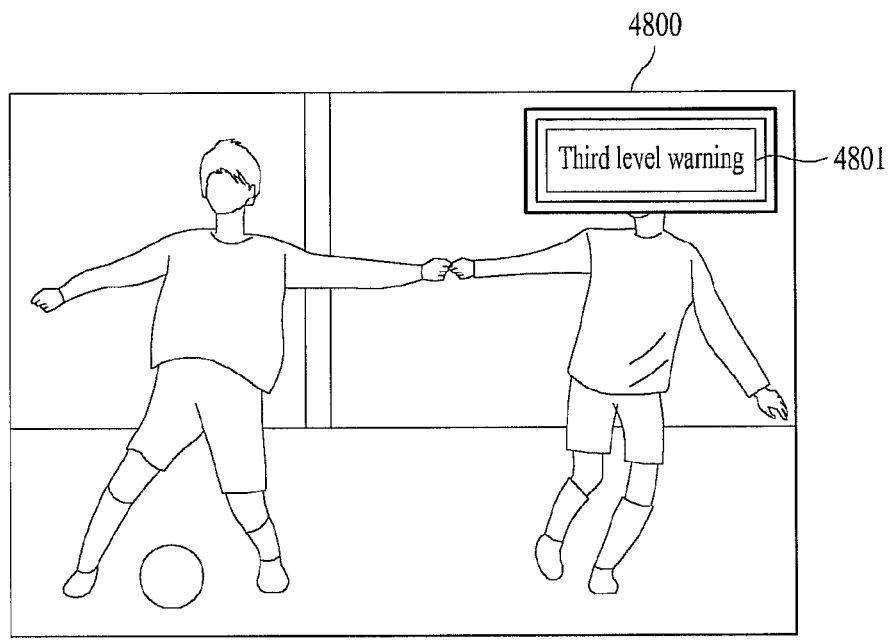
FIG. 48 shows an example of a third level of a monitoring menu.

FIG. 46 shows an example of the first level of a monitoring menu, FIG. 47 shows an example of a second level of the monitoring menu, and FIG. 48 shows an example of a third level of a monitoring menu.

Considering the state information of the contents currently in service as the background, if the possibility of overload that may occur in the memory or the CPU of the network TV reaches 50% to 70%, or if the use time of the charged content remains 30 minutes or one hour, as illustrated in FIG. 46, the network TV 4600 according to one embodiment displays the monitoring indicator 4601 indicating first level warning.

Moreover, considering the state information of the contents currently in service as the background, if the possibility of overload that may occur in the memory or the CPU of the network TV reaches 70% to 90%, or if the use time of the charged content remains 10 minutes or 30 minutes, as illustrated in FIG. 47, the network TV 4700 according to one embodiment displays the monitoring indicator 4701 indicating second level warning. In this case, the second level warning message 4701 is displayed using a highlight scheme more emphasized than the warning message 4601 of FIG. 46 or a size greater than that of the warning message 4601 of FIG. 46.

Also, considering the state information of the contents currently in service as the background, if the possibility of overload that may occur in the memory or the CPU of the network TV reaches 90% or more, or if the use time of the charged content remains 10 minutes or less, as illustrated in FIG. 48, the network TV 4800 according to one embodiment displays the monitoring indicator 4801 indicating third level warning. In this case, the third level warning message 4801 is displayed using a highlight scheme more emphasized than the warning message 4701 of FIG. 47 or a size greater than that of the warning message 4701 of FIG. 47.

Figure 49:
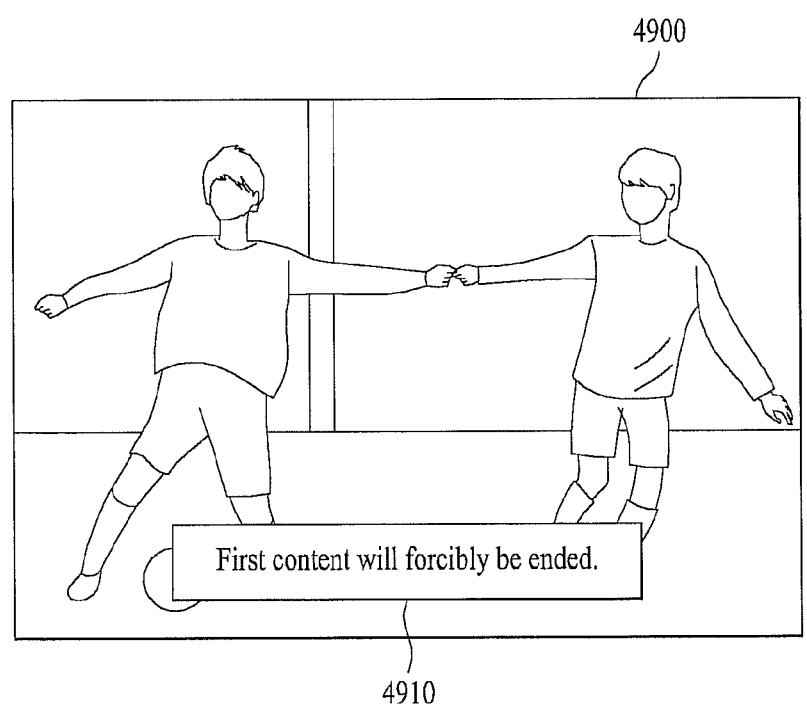
FIG. 49 shows an example of a forcible termination screen.

FIG. 49 shows an example of a forcible termination screen. The network TV 4900 according to one embodiment performs a control operation to generate a message 4910 indicating that a specific content will forcibly be ended automatically, in a popup type, independently from or dependently on the embodiments illustrated in FIG. 45 to FIG. 48. Accordingly, according to this embodiment, throughput of the network TV can be prevented from being deteriorated by various contents or functions operated as the background.

Figure 50:
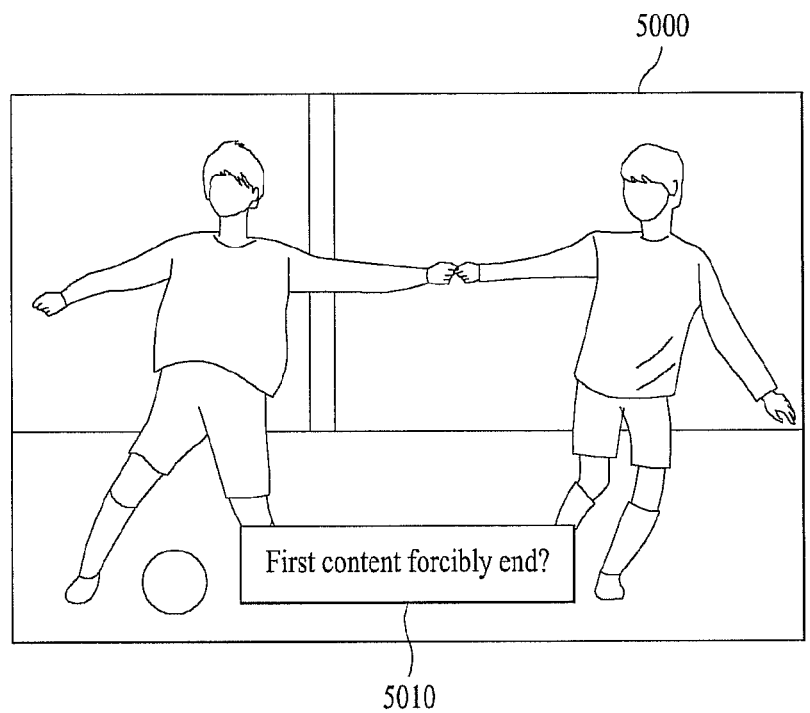
FIG. 50 shows another example of a forcible terminal screen

FIG. 50 shows another example of another automatic forcible terminal screen. Unlike FIG. 49, the network TV 5000 illustrated in FIG. 50 performs a control operation to generate a message 5010 inquiring whether to forcibly end a specific content, in a popup type. This network TV 5000 is designed considering that the specific content scheduled for forcible end may be different from a content to be ended by the user.

Figure 51:
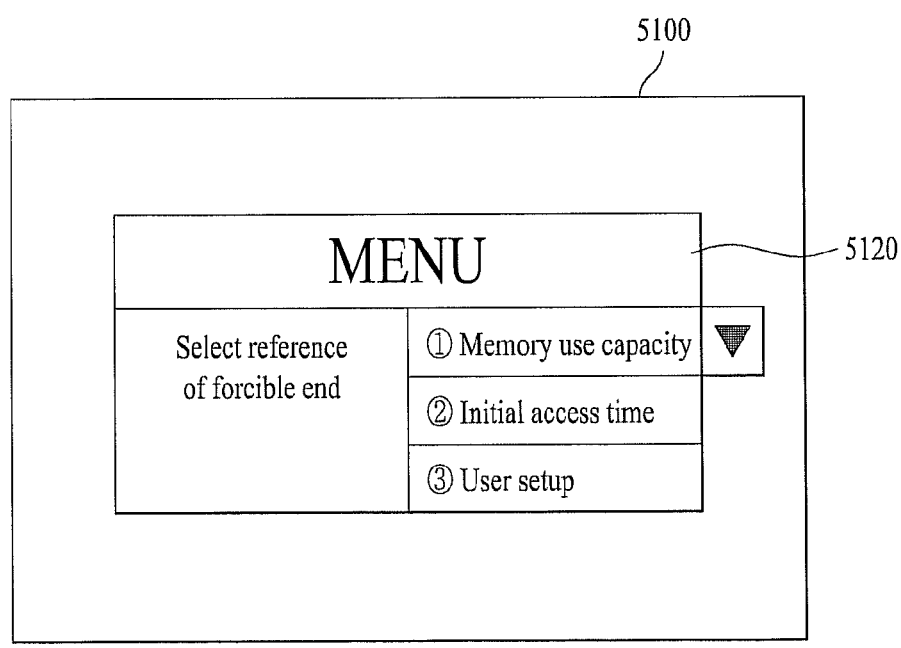
FIG. 51 shows one embodiment of a forcible termination method.

FIG. 51 shows one embodiment of a forcible termination method. As illustrated in FIG. 49 or FIG. 50, if overload is predicted due to the content currently in service as the background, the network TV according to one embodiment may be designed to forcibly end a random content. However, for convenience of the user, as illustrated in FIG. 51, the network TV 5100 according to one embodiment displays a menu screen 5120 for setting a reference category of forcible end.

As illustrated in FIG. 51, the reference category of forcible end may be memory use capacity or initial access time. Accordingly, it is advantageous in that the contents are automatically ended in accordance with the reference desired by the user.

In more detail, if the memory use capacity is set based on the reference of forcible end and too many contents are operated as the background, the contents are forcibly ended automatically in the order of greater memory use capacity.

If the initial access time is set based on the reference of forcible end and too many contents are operated as the background, the contents are forcibly ended automatically in the order of earlier execution time.

As described above, programs or modules related to the monitoring service based on the monitoring indicator according to one embodiment may be designed in such a manner that the programs or modules are included in the network TV during initial manufacture of the network TV or the programs or modules are included in the network TV after manufacture of the network TV. This will be described with reference to FIG. 52 and FIG. 53.

Figure 52:
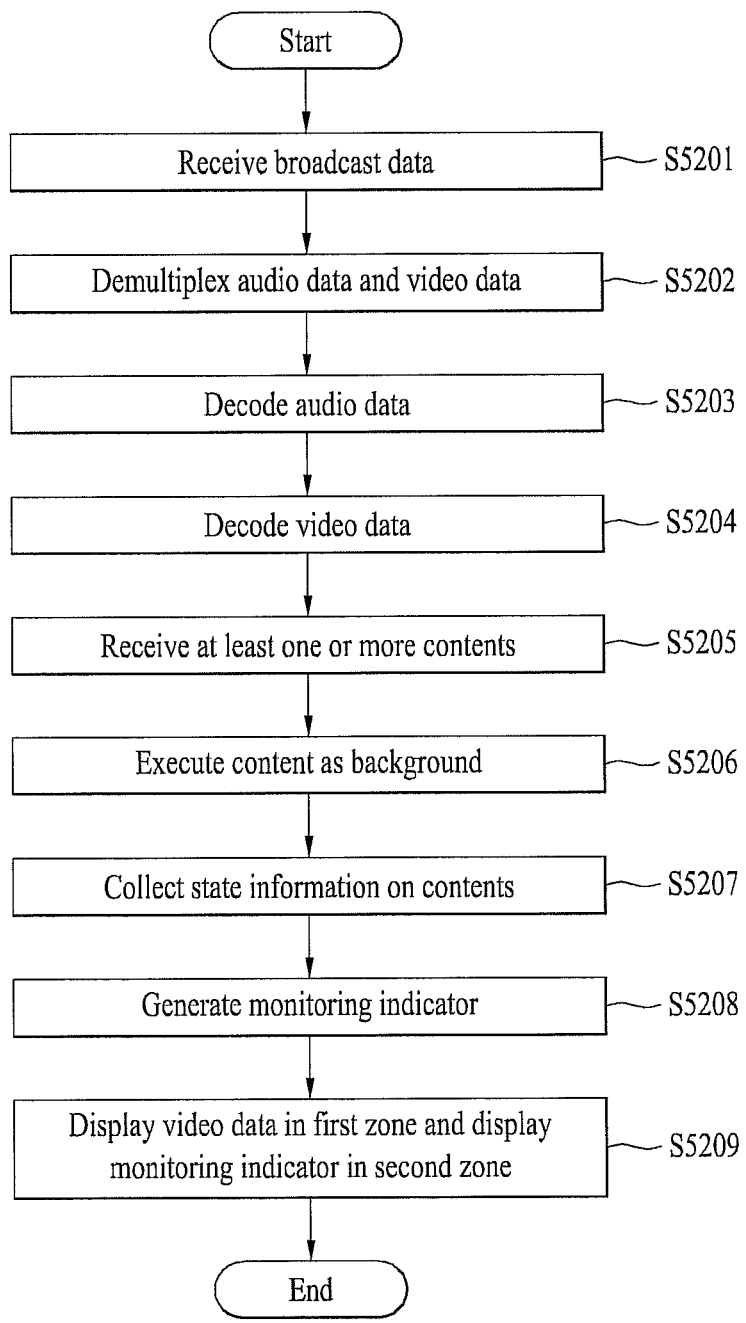
FIG. 52 shows one embodiment of a monitoring service method.

FIG. 52 shows one embodiment of a monitoring service method. As illustrated in FIG. 52, the control method includes receiving broadcast data through a broadcast network, wherein the broadcast data include audio data and video data (S5201). The control method includes demultiplexing the audio data and the video data of the received broadcast data (S5202), and decoding the demultiplexed audio data (S5203). The control method includes decoding the demultiplexed video data (S5204).

The control method includes receiving at least one or more contents through an Internet network (S5205). The control method includes controlling the received contents to be executed in a background type (S5206). The control method includes collecting state information on the at least one or more contents executed in the background type (S5207).

The control method includes generating a monitoring indicator corresponding to the collected state information (S5208). The control method includes displaying the decoded video data in the first zone of the network TV and at the same time displaying the generated monitoring indicator in the second zone of the network TV (S5209).

Also, according to one embodiment, if the displayed monitoring indicator is selected, the control method includes displaying the collected state information. If a specific content is selected from the displayed state information, the control method includes stopping execution of the background for the specific content, stopping display of the decoded video data, and displaying the specific content in the first zone of the network TV. This embodiment can be understood in more detail from FIG. 44.

The step S5209 includes determining whether the collected state information corresponds to a warning range and displaying the generated monitoring indicator in the second zone of the network TV only if the collected state information corresponds to the warning range. This embodiment can be understood in more detail with reference to FIG. 45.

The step S5209 includes determining whether the collected state information corresponds to what level of a plurality of levels and displays the generated monitoring indicator in the second zone of the network TV differentially depending on the level of the collected state information. This embodiment can be understood in more detail with reference to FIG. 46 to FIG. 48.

Moreover, although not illustrated in FIG. 52, according to another embodiment, the control method further includes receiving a signal for selecting a reference category for automatic forcible end, and first and forcibly ending a specific content currently in service as the background based on the selected reference category if the collected state information corresponds to a danger range. The reference category corresponds to memory use capacity or initial access time, for example. This embodiment can be understood in more detail with reference to FIG. 49 to FIG. 51.

The step S5209 further includes receiving a signal for selecting a level of transparency of the monitoring indicator, and displaying the generated monitoring indicator in the second zone of the network TV based on the selected level of transparency. This embodiment can be understood in more detail with reference to FIG. 23 and FIG. 24. The content includes at least one or more of application and web page.

Figure 53:
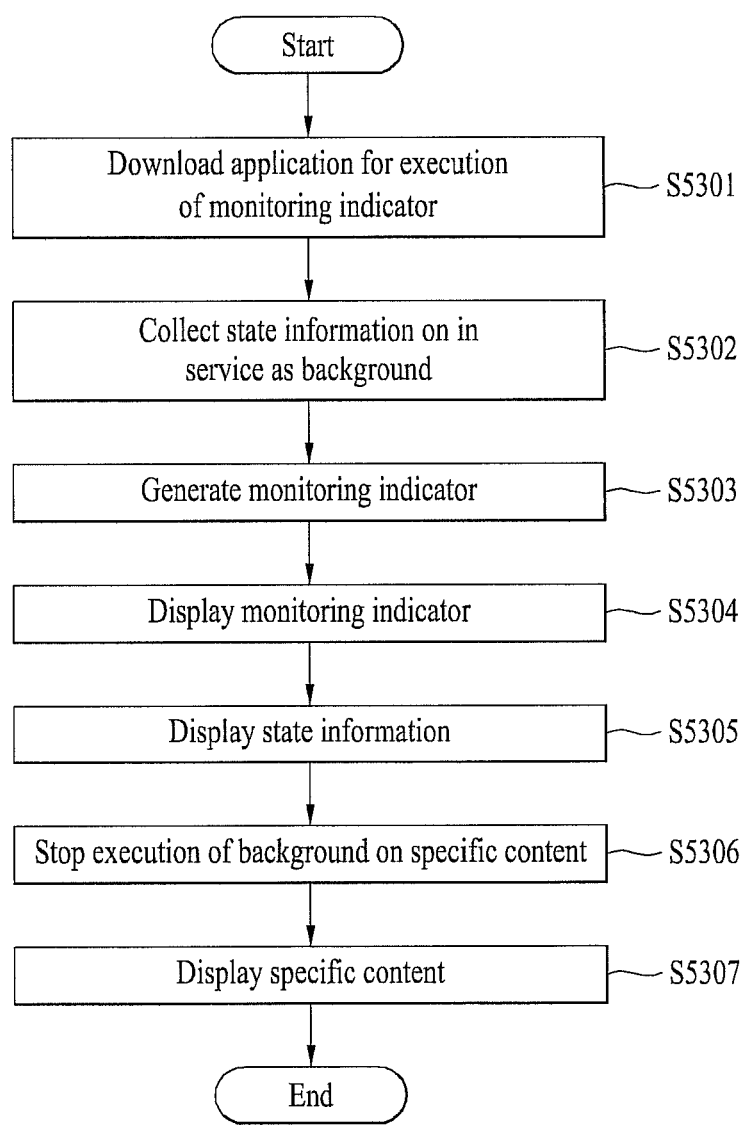
FIG. 53 shows another embodiment of a monitoring service method.

FIG. 53 shows another embodiment of a monitoring service method. The method includes downloading an application for execution of the aforementioned monitoring indicator (S5301). The method includes collecting state information on at least one or more contents executed in a background type (S5302). In this case, the content is received through the Internet network.

The method includes generating a monitoring indicator corresponding to the collected state information (S5303), displaying the generated monitoring indicator in the second zone of the network TV, wherein the second zone is different from the first zone where video data of broadcast data are displayed (S5304). Also, if the displayed monitoring indicator is selected, the method includes displaying the collected state information (S5305). The state information includes current state information for each content.

If a specific content is selected from the displayed state information, the method includes stopping execution of the background for the specific content, and displaying the specific content in the first zone of the network TV (S5307).

Although the description has been made for the respective drawings, a new embodiment can be implemented by combination of the embodiments described with reference to the drawings. Design of a recording medium that can be read from a computer that includes programs for implementing the methods disclosed herein, including those illustrated in FIG. 52 and FIG. 53 are provided.

Figure 54:
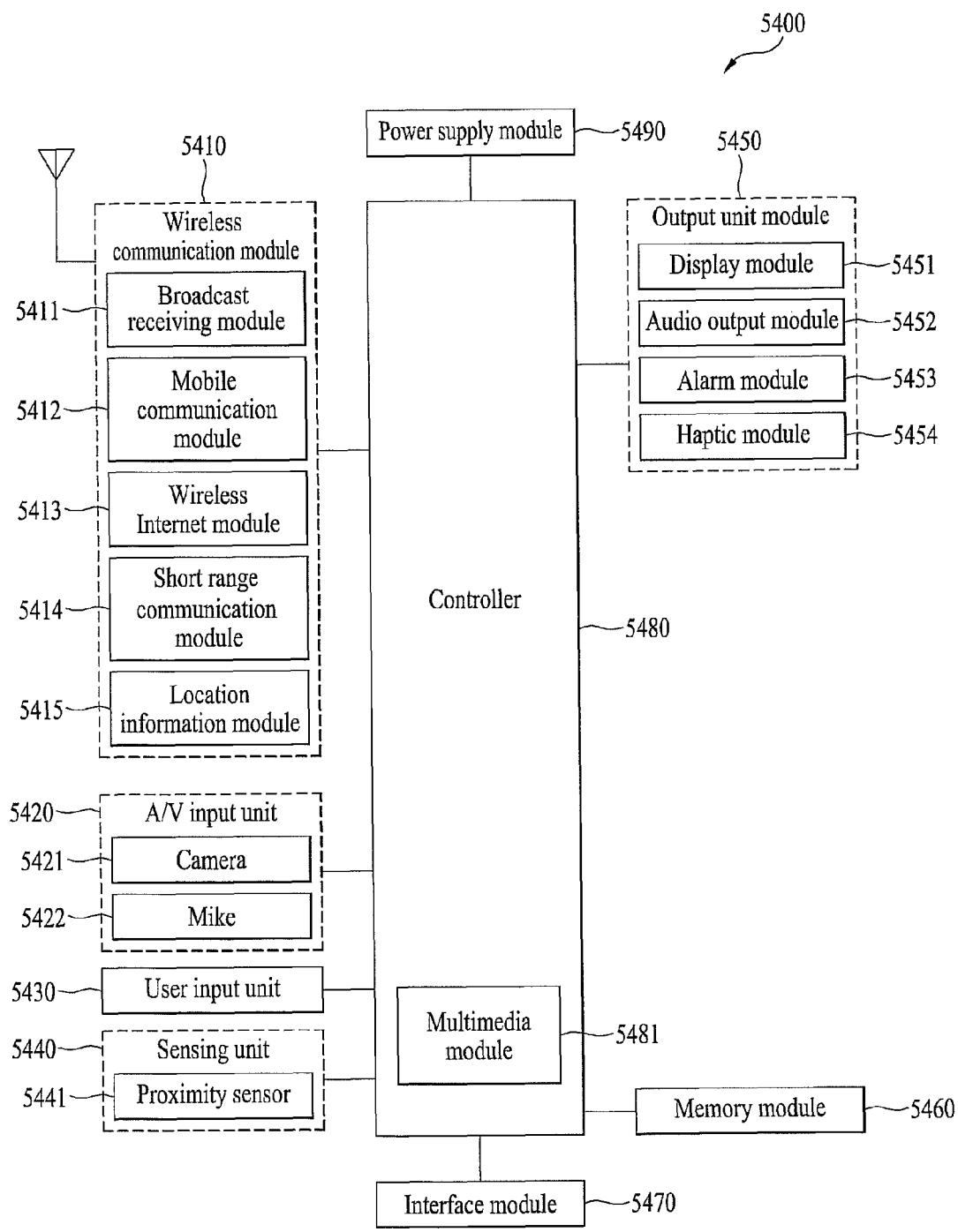
FIG. 54 is a block diagram illustrating a mobile terminal according to one embodiment of the present invention.

FIG. 54 is a block diagram illustrating a mobile terminal according to one embodiment of the present invention. Hereinafter, a block diagram of a mobile terminal according to one embodiment of the present invention will be described with reference to FIG. 54.

As illustrated in FIG. 54, a mobile terminal 5400 according to one embodiment of the present invention includes a wireless communication module 5410, an audio/video (A/V) input module 5420, a user input module 5430, a sensing module 5440, an output module 5450, a memory module 5460, an interface module 5470, a controller 5480, and a power supply module 5490. The modules illustrated in FIG. 54 are not necessarily required. Accordingly, a mobile terminal provided with modules more than or less than those illustrated in FIG. 54 may be achieved.

Hereinafter, the aforementioned modules will be described in due order.

The wireless communication module 5410 can include one or more modules that enable wireless communication between the mobile terminal 5400 and the wireless communication system or between the mobile terminal 5400 and the network where the mobile terminal 5400 is located. For example, the wireless communication module 5410 can include a broadcast receiving module 5411, a mobile communication module 5412, a wireless Internet module 5413, a short range communication module 5414, and a location information module 5415.

The broadcast receiving module 5411 receives a broadcast signal and/or broadcast information from an external broadcast management server through a broadcast channel.

The broadcast channel can include a satellite channel and a terrestrial channel.

The broadcast management server may mean either a server that generates and transmits a broadcast signal and/or broadcast information, or a server that receives a previously generated broadcast signal and/or broadcast information and transmits it to the terminal. The broadcast signal can include a data broadcast signal combined with a TV broadcast signal or radio broadcast signal as well as the TV broadcast signal, the radio broadcast signal and the data broadcast signal.

The broadcast information may mean information related to a broadcast channel, a broadcast program or a broadcast service provider. The broadcast information may be provided through a mobile communication network. In this case, the broadcast information can be received by the mobile communication module 5412.

The broadcast information can exist in various forms. For example, the broadcast information can exist in the form of EPG (Electronic Program Guide) of DMB (Digital Multimedia Broadcasting) or ESG (Electronic Service Guide) of DVB-H (Digital Video Broadcast-Handheld).

The broadcast receiving module 5411 can receive a digital broadcast signal by using a digital broadcast system such as DMB-T (Digital Multimedia Broadcasting-Terrestrial), DMB-S (Digital Multimedia Broadcasting-Satellite), Media-FLO (Media Forward Link Only), DVB-H (Digital Video Broadcast-Handheld), and ISDB-T (Integrated Services Digital Broadcast-Terrestrial). The broadcast receiving module 5411 may be configured to conform to another broadcast system as well as the aforementioned digital broadcast systems.

The broadcast signal and/or the broadcast information received through the broadcast receiving module 5411 can be stored in the memory module 5460.

The mobile communication module 5412 transmits and receives a radio signal to and from at least one of a base station, an external terminal and a server on the mobile communication network. The radio signal can include an audio call signal, a video call signal, or various data based on transmission and reception of text/multimedia messages.

The wireless Internet module 5413 means a module for wireless Internet access, and may be stored inside or outside the mobile terminal 5400. WLAN (Wireless LAN)(Wi-Fi), Wibro (Wireless broadband), Wimax (World Interoperability for Microwave Access), HSDPA (High Speed Downlink Packet Access), etc. can be used for wireless Internet technology.

The short range communication module 5414 means a module for short range communication. Bluetooth, RFID (Radio Frequency Identification), infrared Data Association (IrDA), UWB (Ultra Wideband), ZigBee, etc. can be used for short range communication.

The location information module 5415 is a module for acquiring the location of the mobile terminal, and its example includes a GPS (Global Position System) module.

Referring to FIG. 54, the A/V (Audio/Video) input module 5420 is intended for input of audio signal or video signal, and its examples includes a camera 5421 and a mike 5422. The camera 5421 processes a picture image frame such as a still image or moving picture image obtained by an image sensor in a video call mode or camera mode. The processed picture image frame can be displayed in the display module 5451.

The picture image frame processed by the camera 5421 may be stored in the memory module 5460 or may be transmitted to the outside through the wireless communication module 5410. Two or more cameras 5421 may be provided depending on the use condition.

The mike 5422 receives an external audio signal through a microphone in a call mode or recording mode, a voice recognition mode, etc., and processes the received signal to electric audio data. The processed audio data can be output to the base station for wireless communication through the wireless communication module 5412 in the call mode. Various noise removal algorithms can be configured for the mike 5422 to remove noise occurring when the mike receives the external audio signal.

The user input module 5430 generates input data for allowing the user to control the operation of the terminal. The user input module 5430 can include a key pad dome switch, touch pad (static pressure/power failure), a jog wheel, and a jog switch.

The sensing module 5440 senses the current state of the mobile terminal 5400, such as the switching state of the mobile terminal 5400, the location of the mobile terminal 5400, information as to whether the user has contacted the mobile terminal, a direction of the mobile terminal, and acceleration/deceleration of the mobile terminal, and generates a sensing signal for controlling the operation of the mobile terminal 5400. For example, if the mobile terminal 5400 is a slide phone type, the sensing module 5440 can sense whether the slide phone has been opened or closed. Also, the sensing module 5440 may sense whether the power supply module 5490 has supplied the power or whether the interface module 5470 has been coupled to the external device. In the mean time, the sensing module 5440 can include a proximity sensor 5441.

The output module 5450 is intended to generate the output related to light sense, hearing sense, or tactile sense, and its examples include a display module 5451, an audio output module 5452, an alarm module 5453, and a haptic module 5454.

The display module 5451 displays (outputs) information processed by the mobile terminal 5400. For example, if the mobile terminal 5400 is in the call mode, the display module 5451 displays UI (User Interface) or GUI (Graphic User Interface) related to call. If the mobile terminal is in the video call mode or camera mode, the display module 5451 displays the taken image or/and the received image, or UI and GUI.

The display module 5451 can include at least one of a liquid crystal display (LCD), a thin film transistor-liquid crystal display (TFT LCD), an organic light-emitting diode (OLED), a flexible display, and a 3D display.

Some of the displays can be configured in a transparent type or a light-transmitting type, through which the outside can be viewed. This type display can be referred to as a transparent display, and its example includes a TOLED (Transparent OLED). The display module can be configured in a rear structure or a light-transmitting structure. According to this structure, the user can view an object located at the rear of a body of the terminal through a zone occupied by the display module 5451 of the body of the terminal.

Two or more display modules 5451 can exist depending on the structure of the mobile terminal 5400. For example, the mobile terminal 5400 may be provided with a plurality of display modules arranged to be spaced apart from one another or arranged to form a single body on one surface. Alternatively, the mobile terminal 5400 may be provided with a plurality of display modules arranged on different surfaces.

If the display module 5451 and a sensor (hereinafter, referred to as 'touch sensor') sensing a touch action configure a mutual layer structure (hereinafter, referred to as 'touch screen'), the display module 5451 may be used as an input device in addition to the output device. Examples of the touch sensor include a touch film, a touch sheet, and a touch pad.

The touch sensor can be configured to convert pressure applied to a specific zone of the display module 5451 or electrostatic capacity occurring in a specific zone of the display module 5451 to an electric input signal. The touch sensor can be configured to detect even the pressure during touch as well as the touched location and the touched area.

If there is the touch pressure on the touch sensor, signal(s) corresponding to the touch pressure are transmitted to a touch controller. The touch controller processes the signal(s) and then transmits data corresponding to the processed signals to the controller 5480. As a result, the controller 5480 can identify the touched zone of the display module 5451.

Referring to FIG. 54, the proximity sensor 5441 can be arranged in an inner zone of the mobile terminal covered by the touch screen or near the touch screen. The proximity sensor 5441 means a sensor that senses the presence of an object approaching a predetermined detection surface or an object existing near the touch screen without mechanical contact by using a force of electric field or infrared rays. The proximity sensor has a lifespan longer than that of a contact sensor and is used more widely than the contact sensor.

Examples of the proximity sensor include a light-transmitting photoelectric sensor, a direct reflective type photoelectric sensor, a mirror reflective photoelectric sensor, a high frequency oscillating proximity sensor, an electrostatic capacity type proximity sensor, a magnetic type proximity sensor, and an infrared proximity sensor. If the touch screen is the electrostatic type, the proximity sensor is configured to detect proximity of the pointer by using change of the electric field based on proximity of the pointer. In this case, the touch screen (touch sensor) may be regarded as the proximity sensor.

Hereinafter, for convenience of description, if it is recognized that the pointer is approaching the touch screen without contacting the touch screen, it is referred to as "proximity touch". If the pointer is actually contacted on the touch screen, it is referred to as "contact touch". If the location where the pointer is approaching on the touch screen means the location where the pointer vertically corresponds to the touch screen when the pointer is approaching on the touch screen.

The proximity sensor senses a proximity touch operation and proximity touch patterns (for example, proximity touch distance, proximity touch direction, proximity touch speed, proximity touch time, proximity touch location, proximity touch motion state, etc.). Information corresponding to the sensed proximity touch operation and the proximity touch patterns can be output on the touch screen.

The audio output module 5452 can output audio data received from the wireless communication module 5410 or stored in the memory module 5460 in a call signal reception mode, a call mode, a recording mode, an audio recognition mode, a broadcast receiving mode, etc. The audio output module 5452 may output an audio signal related to functions (for example, call signal receiving sound, message receiving sound, etc.) performed by the mobile terminal 5400. This audio output module 5452 may include a receiver, a speaker, and a buzzer.

The alarm module 5453 outputs a signal for notifying event occurrence of the mobile terminal 5400. Examples of the event occurring in the mobile terminal 5400 include call signal reception, message reception, key signal input, and touch input. The alarm module 5453 may output a signal for notifying event occurrence in the form of oscillation other than a video signal or audio signal. Since the video signal or audio signal may be output through the display module 5451 or the audio output module 5452, the display module 5451 and the audio output module 5452 may be regarded as parts of the alarm module 5453.

The haptic module 5454 generates various tactile effects that can be felt by the user. An example of the tactile effect generated by the haptic module 5454 includes oscillation. Strength and patterns of oscillation generated by the haptic module 5454 can be controlled. For example, the haptic module 5454 may output different kinds of oscillation in combination or in due order.

The haptic module 5454 can generate various tactile effects such as arrangement of pins that perform a vertical movement to a contact skin surface, a jet force or suction force of the air through a jet hole or suction hole, skimming along the skin surface, contact of electrode, effect of a stimulus such as static electricity, and effect of reproduction of cooling or heating based on an element that can absorb or generate heat.

The haptic module 5454 can transfer a tactile effect through direct contact and allow the user to feel a tactile effect through a sensory organ such as finger or arm. Two or more haptic modules 5454 may be provided depending on the structure of the mobile terminal 5400.

The memory module 5460 can store a program for the operation of the controller 5480, and may temporarily input/output data (for example, phone book, message, still image, moving picture, etc.). The memory module 5460 can store data on oscillation and audio of various patterns output during touch input on the touch screen.

The memory module 5460 can include at least one type of a flash memory type, a hard disk type, a multimedia card micro type, a card type memory (for example, SD or XD memory), a Random Access Memory (RAM), a Static Random Access Memory (SRAM), a Read-Only Memory (ROM), EEPROM (Electrically Erasable Programmable Read-Only Memory), PROM (Programmable Read-Only Memory), a magnetic memory, a magnetic disk, and an optical disk. The mobile terminal 5400 may be operated in connection with a web storage that performs a storage function of the memory module 5460 on the Internet.

The interface module 5470 serves as a path with all external devices connected to the mobile terminal 5400. The interface module 5470 receives data from the external device or is supplied with the power from the external device, and then transmits the data or the power to each module of the mobile terminal 5400 or allows the data in the mobile terminal 100 to be transmitted to the external device. For example, the interface module 5470 may include a wire/wireless headset port, an external charger port, a wire/wireless data port, a memory card port, a port for connecting a device provided with an identification module, an audio input/output (I/O) port, a video I/O port, and an earphone port.

The identification module is a chip that stores various kind of information for authenticating the use authority of the mobile terminal 5400, and can include a User Identity Module (UIM), a Subscriber Identity Module (SIM), and a Universal Subscriber Identity Module (USIM). The device (hereinafter, referred to as 'identification device') provided with the identification module can be manufactured in the form of a smart card. Accordingly, the identification device can be connected with the mobile terminal 5400 through the port.

When the mobile terminal 5000 is connected with an external cradle, the interface module may serve as a path through which the power from the cradle is supplied to the mobile terminal 5400, or may serve as a path through which various command signals input from the cradle by the user are transmitted to the mobile terminal. The various command signals or the power input from the cradle may be operated as a signal for recognizing that the mobile terminal has been exactly mounted on the cradle.

The controller 5480 generally controls the overall operation of the mobile terminal. For example, the controller 5480 performs control and processing related to voice communication, data communication, and video communication. The controller 5480 may include a multimedia module 5481 for playing multimedia. The multimedia module 5481 may be provided in the controller 5480, or may be provided separately from the controller 5480.

The controller 5480 can perform pattern recognition processing for recognizing writing input or drawing input performed on the touch screen as text and image, respectively.

The power supply module 5490 supplies the power required for the operation of each module through the external power and internal power applied under the control of the controller 5480.

Various embodiments described herein can be implemented in a recording medium by a computer or similar device using various means, for example, software, hardware, or their combination.

If the embodiments are implemented by hardware, the embodiments can be implemented by at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing other functions. In some case, the embodiments described herein can be implemented by the controller 5480.

If the embodiments are implemented by software, the embodiments including the procedures and functions described herein can be implemented by separate software modules. Each of the software modules can perform one or more functions or operations described herein. For example, a software code can be implemented by a software application written in a proper program language. The software code can be stored in the memory module 5460, and may be executed by the controller 5480.

Figure 55:
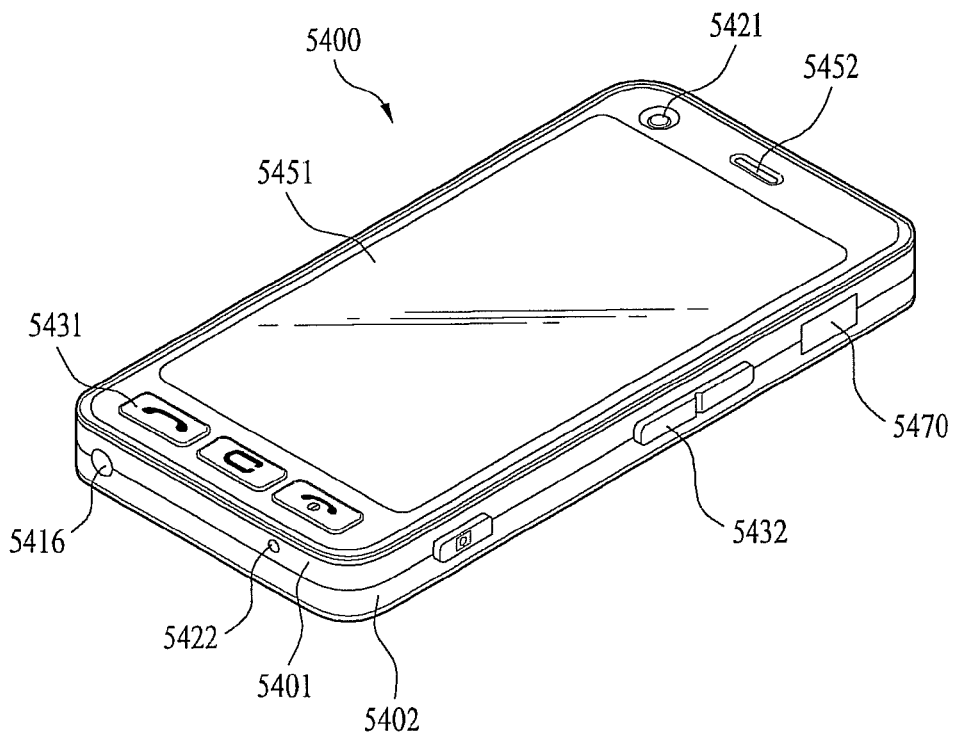
FIG. 55 is a front perspective view illustrating a mobile terminal according to one embodiment of the present invention.

FIG. 55 is a front perspective view illustrating a mobile terminal according to one embodiment of the present invention. Hereinafter, the front perspective view of the mobile terminal according to one embodiment of the present invention will be described with reference to FIG. 55.

As illustrated in FIG. 55, the mobile terminal 5400 includes a bar type terminal body. However, it is to be understood that the present invention is not limited to the bar type terminal body and various modifications can be made in the terminal body of the mobile terminal of the present invention. For example, the terminal body of the mobile terminal 5400 according to the present invention can be applied to various structures such as a slide type, a folder type, a swing type, and a swivel type, in which where two or more bodies are coupled to each other in relative movement.

The terminal body includes a case (casing, housing, cover, etc.) constituting appearance. In this embodiment, the case can be divided into a front case 5401 and a rear case 5402. Various electronic parts are built in a space formed between the front case 5401 and the rear case 5402. At least one intermediate case may additionally be arranged between the front case 5401 and the rear case 5402.

The cases may be formed by injection molding of a synthetic resin, or may be formed to have a metal material such as stainless steel (STS) or Ti.

The display module 5451, the audio output module 5452, the camera 5421, the user input modules 5430/5431, 5432, the mike 5422, and the interface 5470 can be arranged in the terminal body, mainly the front case 5401.

The display module 5451 occupies most of a main surface of the front case 5401. The audio output module 5451 and the camera 5421 are arranged at a region adjacent to one of both ends of the display module 5451, and the user input module 5431 and the mike 5422 are arranged at a region adjacent to the end of the display module 5451. The user input module 5432 and the interface module 5470 can be arranged at sides of the front case 5401 and the rear case 5402.

The user input module 5430 is manipulated to receive a command for controlling the operation of the mobile terminal 5400, and can include a plurality of manipulation units 5431 and 5432. The manipulation units 5431 and 5432 may be referred to as a manipulation portion, and can be used for all manners only if the user can manipulate them with a tactile feeling (tactile manner).

Contents input by the first and second manipulation units 5431 and 5432 can be set variously. For example, the first manipulation unit 5431 can receive a command such as start, end, scroll, etc., and the second manipulation unit 5432 can receive a command such as size control of the audio output from the audio output module 5452 or conversion of the display module 5451 to a touch recognition mode.

Figure 56:
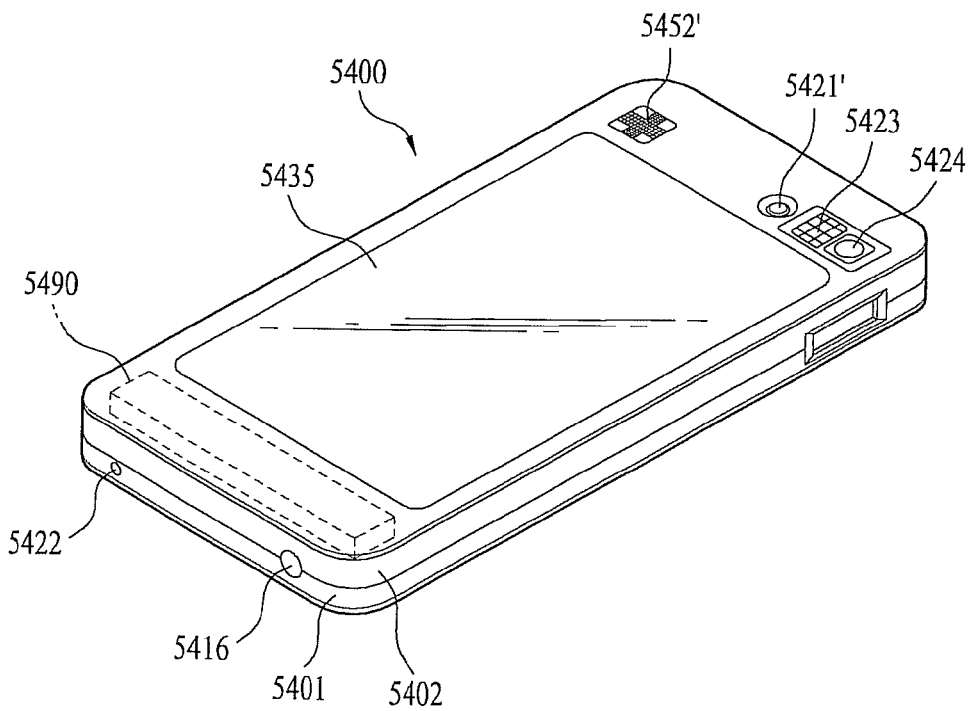
FIG. 56 is a rear perspective view illustrating a mobile terminal according to one embodiment of the present invention.

FIG. 56 is a rear perspective view illustrating a mobile terminal according to one embodiment of the present invention. Hereinafter, the rear perspective view of the mobile terminal according to one embodiment of the present invention will be described with reference to FIG. 56.

FIG. 56 is a rear perspective view of the mobile terminal illustrated in FIG. 55.

As illustrated in FIG. 56, the rear surface of the terminal body, that is, the rear case 5402 can additionally be provided with a camera 5421'. The camera 5421' has a picture-taking direction substantially contrary to that of the camera 5421 (see FIG. 55), and could be a camera having pixels different from those of the camera 5421.

For example, it is preferable that the camera 5421 takes a face of the user during video communication and thus has low pixels to transmit the taken face to the other user without any problem, and the camera 5421' has high pixels as it takes a general subject and is not likely to immediately transmit the taken subject to the user. The cameras 5421 and 5421' may be provided in the terminal body rotatably or to enable pop-up.

A flash 5423 and a mirror 5424 are additionally arranged to adjoin the camera 5421'. The flash 5423 emits light towards the subject if the camera 5421' takes the subject. The mirror 5424 allows the user to look his(her) face if the user desires to take himself(herself) (self picture-taking) using the camera 5421'.

An audio output module 5452' may be arranged on the rear surface of the terminal body. The audio output module 5452' may implement a stereo function together with the audio output module 5452 (see FIG. 55), and may be used to implement a speaker phone mode during communication.

In addition to an antenna for communication, an antenna 5416 for receiving a broadcast signal may additionally arranged at a side of the terminal body. The antenna 5416 constituting a part of the broadcast receiving module 5411 (see FIG. 54) may be arranged to be ejected from the terminal body.

The terminal body is provided with the power supply module 5490 that supplies the power to the mobile terminal 5400. The power supply module 5490 may be built in the terminal body, or may be configured detachably from the outside of the terminal body.

The rear case 5402 may additionally be provided with a touch pad 5435 for sensing touch. The touch pad 5435 may be configured in a light-transmitting type like the display module 5451. In this case, if the display module 5451 is configured to output visual information from both sides, the visual information may be recognized even through the touch pad 5435. The information output from both sides may be controlled by the touch pad 5435. Unlike this, the touch pad 5435 may additionally be provided with a display, whereby the touch screen may be arranged on the rear case 5402.

Figure 57:
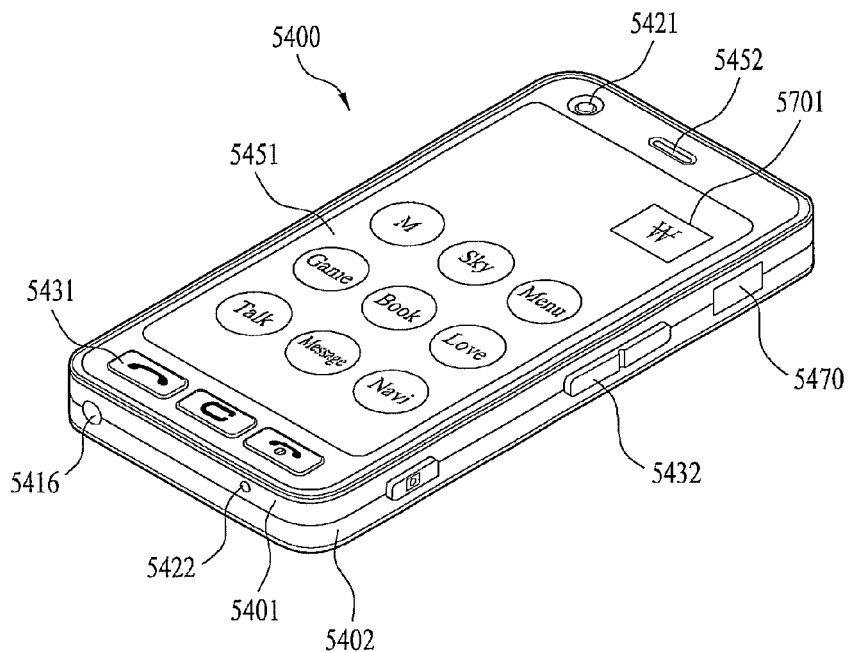
FIG. 57 is a diagram illustrating a screen of a mobile terminal, in which a monitoring indicator according to one embodiment of the present invention is displayed.

FIG. 57 is a diagram illustrating a screen of a mobile terminal, in which a monitoring indicator according to one embodiment of the present invention is displayed. Hereinafter, the screen of the mobile terminal, in which a monitoring indicator according to one embodiment of the present invention is displayed, will be described with reference to FIG. 57.

The description of the same reference numerals as those of FIG. 55 will be omitted in FIG. 57.

As illustrated in FIG. 57, the display module 5451 is designed to output a monitoring indicator 5701 together with applications that can be used by the user. Since the same description as that made with reference to FIG. 1 to FIG. 53 can be applied to the monitoring indicator 5701, the repeated description will be omitted. Accordingly, it is advantageous in that the user can more easily identify the current state of the mobile terminal which the user uses currently.

Figure 58:
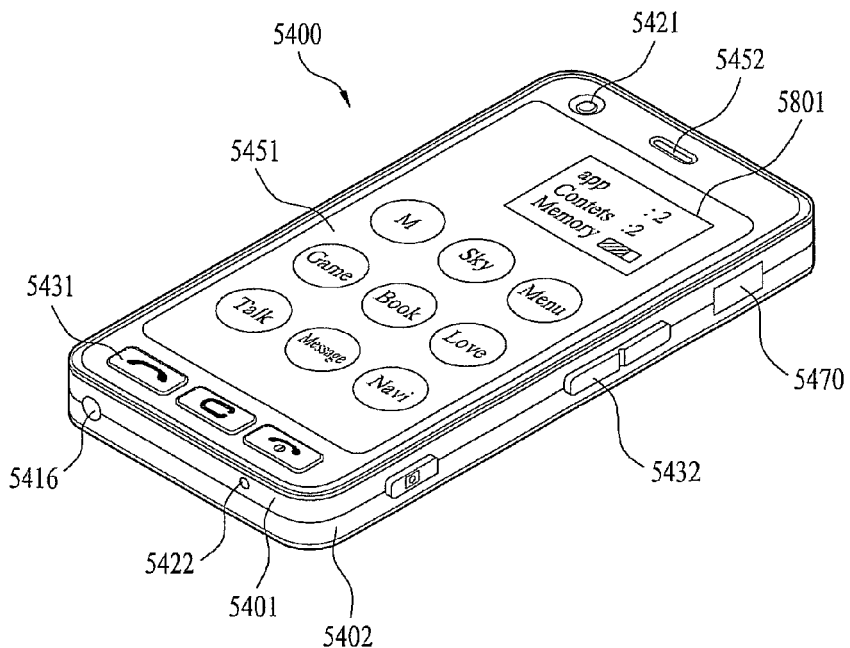
FIG. 58 is a diagram illustrating a screen of a mobile terminal, in which a monitoring indicator according to another embodiment of the present invention is displayed.

FIG. 58 is a diagram illustrating a screen of a mobile terminal, in which a monitoring indicator according to another embodiment of the present invention is displayed. Hereinafter, the screen of the mobile terminal, in which a monitoring indicator according to another embodiment of the present invention is displayed, will be described with reference to FIG. 58.

The description of the same reference numerals as those of FIG. 55 will be omitted in FIG. 58.

As illustrated in FIG. 58, the display module 5451 is designed to output a monitoring indicator 5801 together with applications that can be used by the user. As compared with FIG. 57, the monitoring indicator 5801 is characterized in that the number of applications currently in service, the number of contents currently in service, and the memory use state are displayed in more detail.

Moreover, since the same description as that made with reference to FIG. 1 to FIG. 53 can be applied to the monitoring indicator 5801, the repeated description will be omitted. Accordingly, it is advantageous in that the user can identify and access the applications and contents currently in service, and the memory state more easily.

Figure 59:
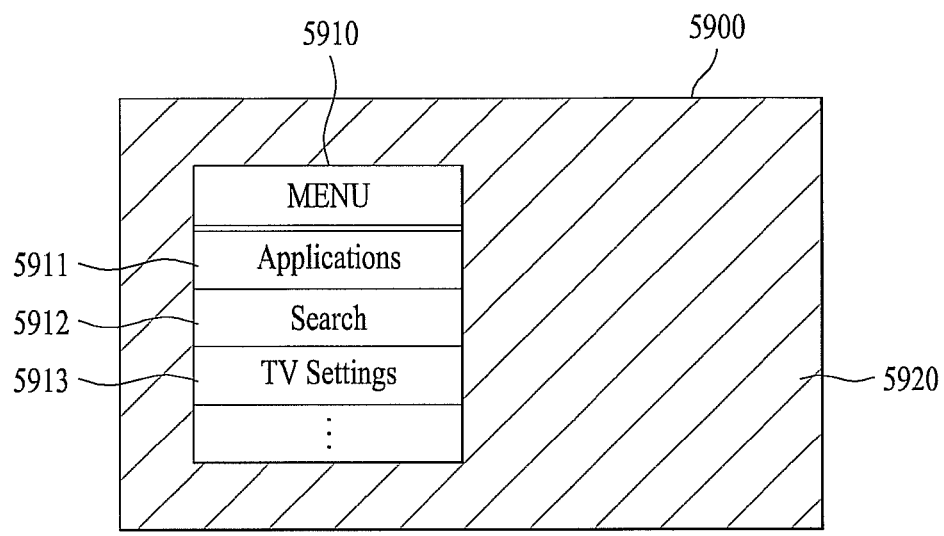
FIG. 59 is a diagram illustrating a first screen that displays monitoring services according to one embodiment of the present invention.
Figure 60:
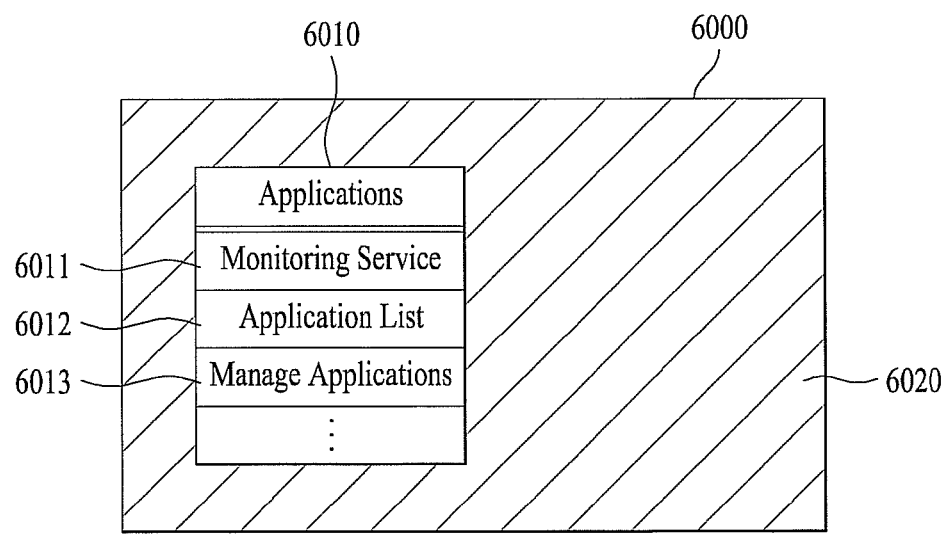
FIG. 60 is a diagram illustrating a second screen that displays monitoring services according to one embodiment of the present invention.
Figure 61:
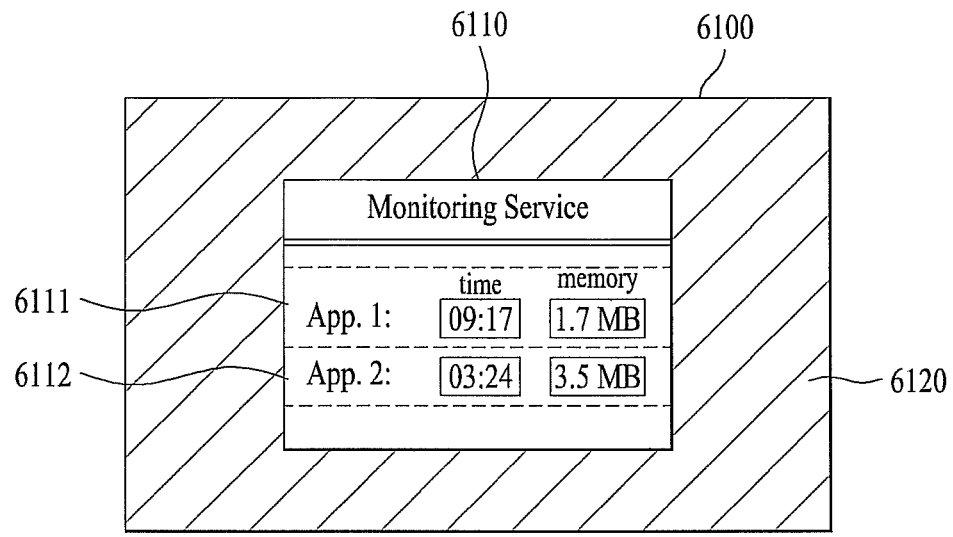
FIG. 61 is a diagram illustrating a third screen that displays monitoring services according to one embodiment of the present invention.
Figure 62:
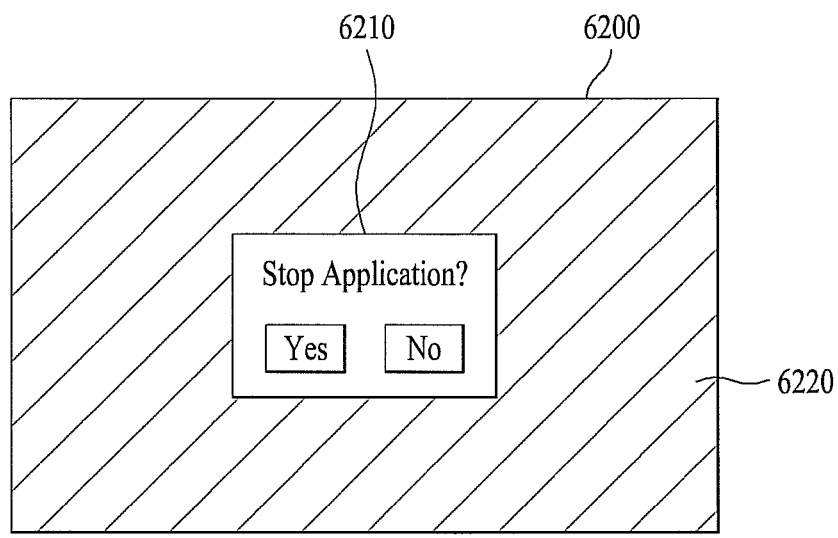
FIG. 62 is a diagram illustrating a fourth screen that displays monitoring services according to one embodiment of the present invention.

FIG. 59 is a diagram illustrating a first screen that displays monitoring services according to one embodiment of the present invention, FIG. 60 is a diagram illustrating a second screen that displays monitoring services according to one embodiment of the present invention, FIG. 61 is a diagram illustrating a third screen that displays monitoring services according to one embodiment of the present invention, and FIG. 62 is a diagram illustrating a fourth screen that displays monitoring services according to one embodiment of the present invention. Hereinafter, a process of a monitoring service according to one embodiment of the present invention will be described with reference to FIG. 59 to FIG. 62.

First of all, as illustrated in FIG. 59, a multifunctional display device 5900 (for example, network TV) according to one embodiment of the present invention serves to identify a first zone 5910 displaying a menu screen from a second zone 5920 displaying a black screen. In particular, the multifunctional display device can be designed such that its function is performed by the aforementioned OSD generator.

Moreover, the first zone 5910 displaying a menu screen includes a plurality of items that can be selected. For example, the first zone 5910 includes a first item 5911 related to applications, a second item 5912 related to search, and a third item 5913 related to TV settings.

If the first item 5911 is selected, the screen illustrated in FIG. 59 is switched to the screen illustrated in FIG. 60. In other words, as illustrated in FIG. 60, a multifunctional display device 6000 according to one embodiment of the present invention serves to identify a first zone 6010 displaying applications from a second zone 6020 displaying a black screen. In particular, the multifunctional display device can be designed such that its function is performed by the aforementioned OSD generator.

Also, the first zone 6010 that displays applications includes a plurality of items that can be selected. For example, the first zone 6010 includes a first item 6011 related to monitoring services, a second item 6012 related to an application list, and a third item 6013 related to application management. In particular, the first item 6011 corresponds to the aforementioned monitoring indicator, and if the first item 6011 is selected, detailed information related to application currently in service is displayed.

If the first item 6011 is selected, the screen illustrated in FIG. 60 is switched to the screen illustrated in FIG. 61. In other words, as illustrated in FIG. 61, a multifunctional display device 6100 according to one embodiment of the present invention serves to identify a first zone 6110 displaying monitoring services from a second zone 6120 displaying a black screen. In particular, the multifunctional display device can be designed such that its function is performed by the aforementioned OSD generator.

Also, the first zone 6110 that displays monitoring services includes a plurality of items that can be selected. For example, the first zone 6110 includes status information 6111 of a first application which is running, and status information 6112 of a second application which is running. The status information includes information on a total of hours for which application is executed, and information on capacity of a memory which is used.

If the first item 6111 is selected, the screen illustrated in FIG. 61 is switched to the screen illustrated in FIG. 62. In other words, as illustrated in FIG. 62, a multifunctional display device 6200 according to one embodiment of the present invention serves to identify a first zone 6210 identifying whether to stop a specific application from a second zone 6220 displaying a black screen. In particular, the multifunctional display device can be designed such that its function is performed by the aforementioned OSD generator.

Accordingly, if "YES" is selected from the first zone 6210 to stop a specific application, the specific application currently in service is automatically stopped. The aforementioned description in respect of FIG. 59 to FIG. 62 may be achieved with reference to FIG. 1 to FIG. 58. In this case, it is advantageous in that the user can more quickly identify and stop the application currently in service.

Various modifications can be made in the aforementioned embodiments applied to the network TV and the method for controlling the network TV. For such various modifications, all or some of the embodiments may selectively be configured in combination.

The method for controlling the network TV according to one or more embodiments described herein can be implemented in a recording medium, which can be read by a processor provided in the network TV, as a code that can be read by the processor. The recording medium that can be read by the processor includes all kinds of recording media in which data that can be read by the processor are stored.

Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor can be stored and implemented in a distributive mode.

One or more embodiments described herein relate to a method for processing data for monitoring service in a network TV and the network TV.

One or more embodiments also provide a network TV and a method for controlling the network TV, which can improve convenience in use of a user.

One or more other embodiments provide a network TV and a method for controlling the network TV, which can provide various user interfaces.

One or more other embodiments provide a solution for allowing a user to use various applications of a network TV under a proper consumption condition or optimized use condition.

One or more other embodiments provide a network TV and a method for controlling the network TV, in which even though a plurality of applications are executed in the network TV, a user can reduce unwanted consumption by identifying execution information on each application, and as the use condition that can allow the user to use the network TV under the optimized system is provided to the user, convenience of the user can be improved.

In accordance with one embodiment, a method for controlling a network TV for processing data for a monitoring service comprises receiving broadcast data through a broadcast network, the broadcast data including audio data and video data, demultiplexing the audio data and the video data of the received broadcast data, decoding the demultiplexed audio data, decoding the demultiplexed video data, receiving at least one or more contents through an Internet network, controlling the received contents to be executed in a background type, collecting state information on the at least one or more contents executed in the background type, generating a monitoring indicator corresponding to the collected state information, and displaying the generated monitoring indicator in a second zone of the network TV while displaying the decoded video data in a first zone of the network TV.

In accordance with one embodiment, a network TV for processing data for a monitoring service includes a broadcast interface receiving broadcast data through a broadcast network, the broadcast data including audio data and video data, a demultiplexer demultiplexing the audio data and the video data of the received broadcast data, an audio decoder decoding the demultiplexed audio data, a video decoder decoding the demultiplexed video data, an Internet interface receiving at least one or more contents through an Internet network, a first controller controlling the received contents to be executed in a background type, a collector collecting state information on the at least one or more contents executed in the background type, a generator generating a monitoring indicator corresponding to the collected state information, a second controller controlling a display module to display the decoded video data in a first zone of the network TV and display the generated monitoring indicator in a second zone of the network TV, and a speaker outputting the decoded audio data.

In accordance with one embodiment, states of various contents operated on the network TV can easily be checked.

According to another embodiment, a solution for an OSD that can monitor states of various contents at the same time while minimizing interruption on a general broadcast screen.

According to another embodiment, unnecessary cost caused by contents operated as background although not recognized by the user can be prevented from being consumed, and throughput of the network TV can be prevented from being deteriorated temporarily.

According to another embodiment, a multifunctional display device, comprises a display; a storage device to store data; a tuner to receive a broadcast signal; a network interface to receive packet data; an input interface to receive signals from a wireless remote controller; and a processor to control display of first information that includes visual information and second information corresponding to display of monitoring information. The visual information and second information are displayed simultaneously, the monitoring information provides an indication of status of one or more applications executed at a same time the visual information is displayed, and the visual information corresponds to one of content provider, broadcast signal, or website information.

The second information may include an icon, and the monitoring information is displayed when the icon is selected. The detailed information may correspond to the status of the one or more applications is displayed when the icon is selected.

The icon may be selected by placing a cursor on the icon, selection of the icon causing the monitoring information to be automatically displayed. Alternatively, the icon may be selected based on receipt of a selection signal from the remote controller.

The monitoring information may be displayed on a different screen from the icon when the icon is selected, and a preview of the monitoring information may be displayed on a same screen as the icon when the icon is selected.

The status condition may correspond to a condition of a storage device used for execution of the one or more applications. The condition of the storage device may include a remaining storage capacity of the storage device. Also, a color of the second information may provide an indication of the remaining storage capacity of the storage device.

The second information is displayed in at least a first color when the storage capacity is above a threshold value and is displayed in at least a second color when the storage capacity is below the threshold value.

The status condition may also correspond to billing for execution of the one or more applications, or the status condition may correspond to a number of times the one or more applications have been executed.

The processor may also control display of an indicator for controlling an appearance of display of the second information, and the monitoring information may provide an indication of a number of the one or more applications being executed and an amount of remaining storage capacity. The first information and the monitoring information is displayed simultaneously.

In addition, the visual information includes a home screen which includes a broadcast area, an application area, and a contents area. Also, the processor may cause warning information to be displayed when a condition of the status requires automatic termination of execution of the one or more applications.

According to another embodiment, a multifunctional display device comprises: a display; a storage device to store data; a tuner to receive a broadcast signal; a network interface to receive packet data; an input interface to receive signals from a wireless remote controller; and a processor to control display of a first information area, a second information area, and a monitoring indicator. The first and second information areas and the monitoring indicator are simultaneously displayed on a same screen.

Also, when the monitoring indicator is selected, detailed information of monitoring information is displayed corresponding to the first and second information areas, the monitoring information indicating status and a number of applications currently executed. The first information area includes information received through the network interface and the second information area includes information received through the tuner.

According to another embodiment, an information management method comprises simultaneously displaying a first information area, a second information area, and a monitoring indicator on a same screen of a display device; and displaying detailed monitoring information when the monitoring indicator is selected, the detailed monitoring information corresponding to the first and second information areas and indicating status and a number of applications currently executed, wherein the first information area includes information received through a network interface and the second information area includes information received through a tuner of the display device.

According to another embodiment, a computer-readable multifunctional apparatus for monitoring status of a number of applications comprises a display; storage device to store data; a tuner to receive a broadcast signal; a network interface to receive packet data; an input interface to receive signals from a wireless remote controller; a processor to control display of a first information area generated by an on-screen display (OSD) generator and a second information area that includes at least one category, wherein the first information and second information areas are simultaneously displayed on a same screen.

When a category is selected, detailed information is displayed, the detailed information including a condition of a storage device used for execution of one or more applications currently being executed, and wherein the second information area is overlaid on the first information area.

The detailed information may further comprise information indicative of a running time for execution of the one or more applications, and the processor may control display of a monitoring indicator which is at least partially transparent. Moreover, the condition of the storage device includes a storage capacity of the storage device used for execution of the one or more applications.

Herein, the suffixes 'module' and 'unit' for the elements used in the following description are given or used in common by considering facilitation in writing this disclosure only but fail to have meanings or roles discriminated from each other.

A display device as described in this specification may be an intelligent display device additionally provided with, for example, a computer support function in addition to a broadcasting receiving function. The display device can be provided with a more convenient interface such as a manual input unit, a touch screen and a spatial remote controller, in accordance with additional Internet function in addition to a basic broadcasting receiving function.

Also, the device enables e-mailing, web browsing, banking or games by accessing Internet or computer in accordance with the support of wire or wireless Internet function. For these various functions, a standardized general-purpose operating system (OS) can be used. Accordingly, since the display device disclosed herein can freely be provided with or delete various applications on a general-purpose OS kernel, it may perform user-friendly various functions. More detailed examples of the display device include network TV, HBBTV, smart TV. The display device may be applied to a smart phone as the case may be. Also, the term, "contents" disclosed herein is the general term for digital information, which is provided through various wire and wireless communication networks and can be used through a display device, and its contents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with the features of one or more other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A television for displaying a detailed information window, comprising:
   a tuner to receive a broadcast signal having audio and video data;
   a video decoder to decode the video data included in the broadcast signal;
   a display module to output the decoded video data;
   a network interface to receive a signal for at least one application through a network, wherein the at least one application to help a user to perform a specific task;
   a runtime module to collect status information on each of the received at least one application, wherein the status information is calculated based on both the television's ability and the application's capacity;
   a user interface to receive a command signal for requesting a detailed information window;
   an on-screen display (OSD) generator to generate graphic data indicating the detailed information window based on the collected status information, wherein the window lists at least one option corresponding to the at least one application; and
   a controller configured to control the display module to display monitoring services including the graphic data generated by the OSD generator in a first zone, to display a black screen in a second zone, and to stop execution of an application running in the background after a specific application within the first zone is selected.

2. The television of claim 1, wherein the status information corresponds to a condition of a storage device during execution of the multiple applications.

3. The television of claim 2, wherein the condition of the storage device includes a remaining storage capacity of the storage device.

4. The television of claim 1, wherein the television corresponds to at least one Hybrid Broadcast Broadband Television (HBBTV).

5. The television of claim 4, wherein the display module displays warning information on using history of paid applications regardless of receiving the command signal while outputting the decoded video data, wherein the warning information is superimposed over the video data on the display module.

6. The television of claim 5, wherein the warning information has either variable color graphic data or transparency graphic data depending on the using history of paid applications.

7. The television of claim 3, wherein the display module displays a warning information on the remaining memory capacity of the storage device regardless of receiving the command signal while outputting the decoded video data, wherein the warning information is superimposed over the video data on the display module.

8. The television of claim 7, wherein the warning information has either variable graphic data or transparency graphic data depending on the remaining memory capacity of the storage device.

* * * * *